United States Patent [19]
Ochiai et al.

[11] Patent Number: 5,400,307
[45] Date of Patent: Mar. 21, 1995

[54] MAGNETO-OPTICAL RECORDING MEDIUM WITH STACKED LAYER STRUCTURE

[75] Inventors: Yoshitaka Ochiai; Shunichi Hashimoto; Koichi Aso, all of Kanagawa, Japan

[73] Assignee: Sony Corporation, Tokyo, Japan

[21] Appl. No.: 264,258

[22] Filed: Jun. 22, 1994

Related U.S. Application Data

[63] Continuation of Ser. No. 995,941, Dec. 18, 1992, which is a continuation of Ser. No. 237,001, Aug. 26, 1988.

[30] Foreign Application Priority Data

| | | | |
|---|---|---|---|
| Aug. 26, 1987 | [JP] | Japan | 62-211569 |
| Oct. 15, 1987 | [JP] | Japan | 62-260111 |
| Dec. 29, 1987 | [JP] | Japan | 62-335308 |
| Dec. 29, 1987 | [JP] | Japan | 62-335316 |
| Jul. 19, 1988 | [JP] | Japan | 63-178133 |
| Jul. 19, 1988 | [JP] | Japan | 63-178135 |

[51] Int. Cl.⁶ .................................................. G11B 7/24
[52] U.S. Cl. ........................................ 369/13; 369/288
[58] Field of Search ................... 369/13, 288, 14; 360/114, 59, 131; 365/122; 428/694, 900

[56] References Cited

U.S. PATENT DOCUMENTS

| | | | |
|---|---|---|---|
| 3,150,939 | 9/1964 | Wenner | 29/195 |
| 3,479,156 | 11/1969 | Ginder | 29/183.5 |
| 4,226,681 | 10/1980 | Shirahata et al. | 204/38 |
| 4,239,835 | 12/1980 | Iijima et al. | 428/611 |
| 4,587,176 | 5/1986 | Carcia | 428/694 |
| 4,657,814 | 4/1987 | Asai et al. | 428/329 |
| 4,678,721 | 7/1987 | den Broeder et al. | 428/607 |
| 4,789,606 | 12/1988 | Yamada et al. | 428/900 |
| 4,833,020 | 5/1989 | Shiroishi et al. | 428/336 |

FOREIGN PATENT DOCUMENTS

| | | |
|---|---|---|
| 60-40543 | 3/1985 | Japan . |
| 60-243842 | 3/1985 | Japan . |
| 61-54059 | 3/1986 | Japan . |
| 61-196443 | 8/1986 | Japan . |

*Primary Examiner*—Hoa T. Nguyen
*Attorney, Agent, or Firm*—Hill, Steadman & Simpson

[57] ABSTRACT

A magneto-optical recording medium is disclosed in which a magneto-optical recording layer is formed by alternately stacking Co layers and Pt and/or Pd layers, and having a total thickness between 50 and 800 Å.

16 Claims, 45 Drawing Sheets

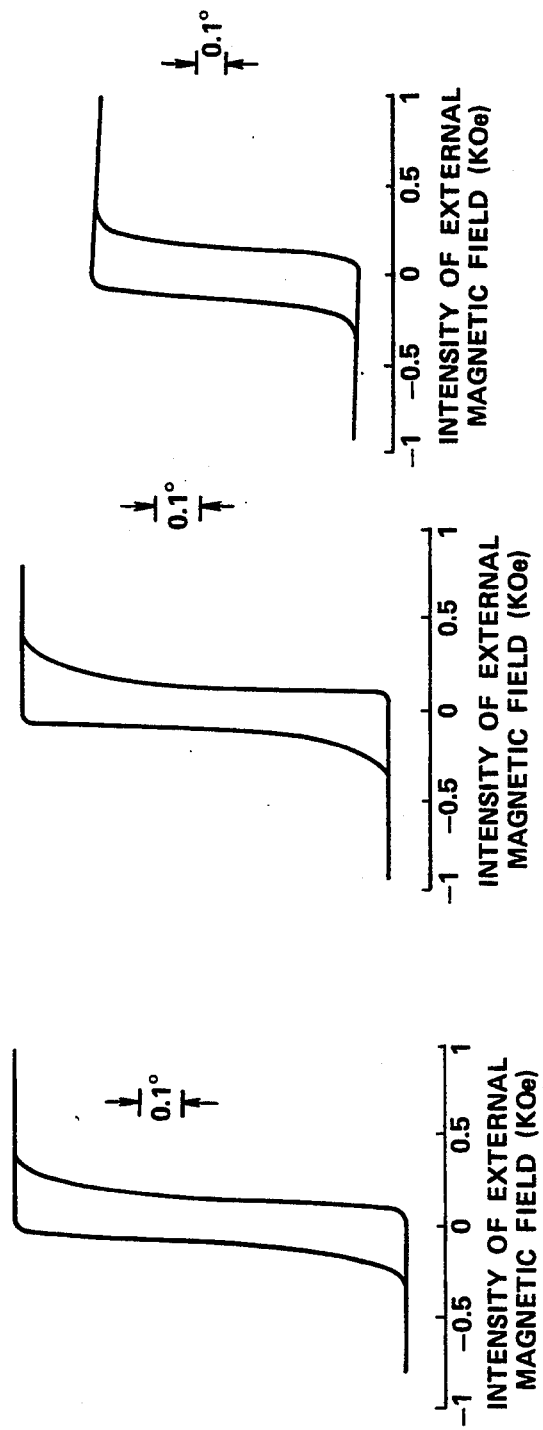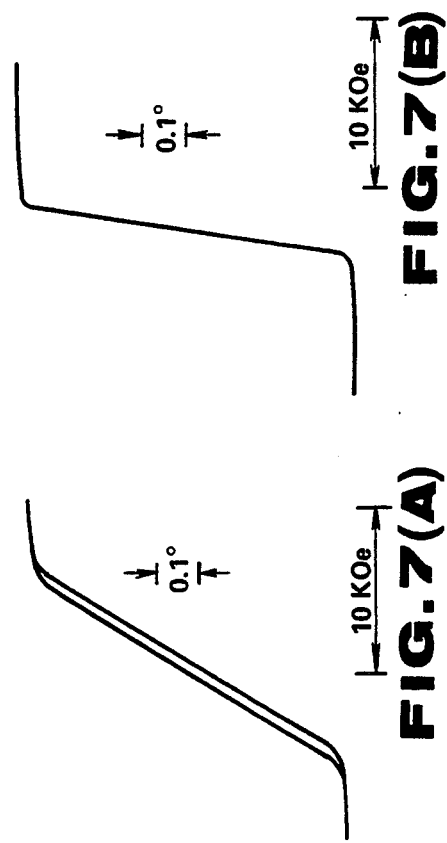

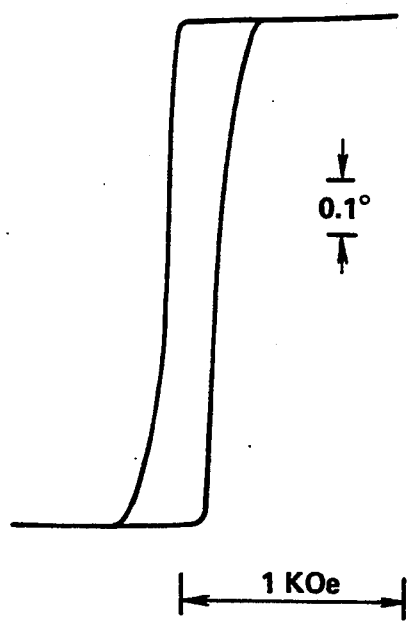
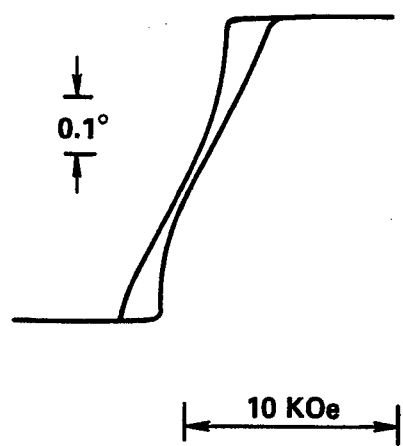
FIG.14 (A)  FIG.14 (B)

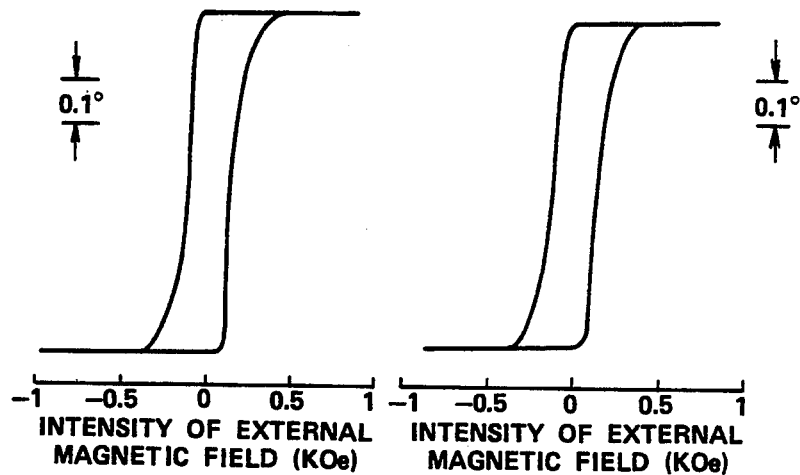
FIG.16(A) FIG.16(B)
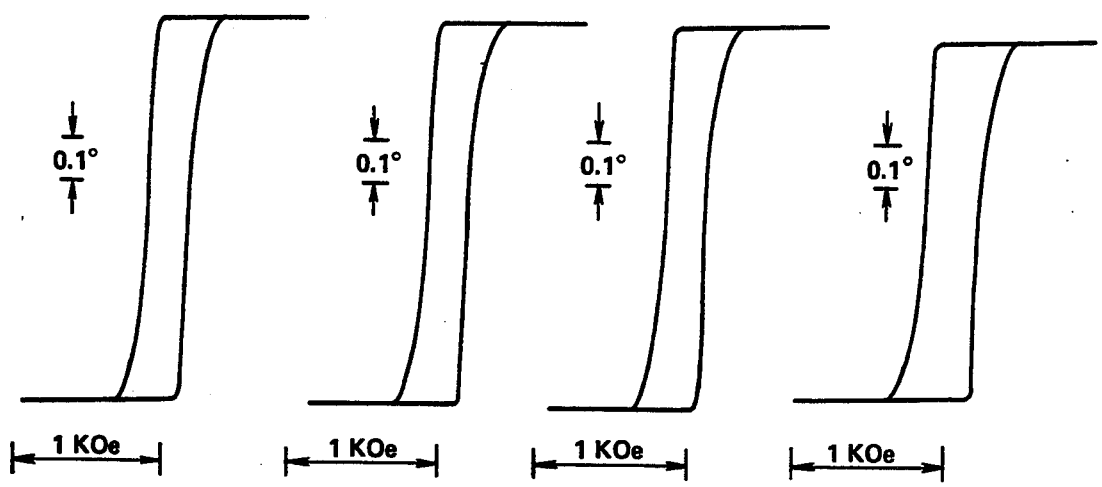
FIG.17(A) FIG.17(C)
FIG.17(B) FIG.17(D)

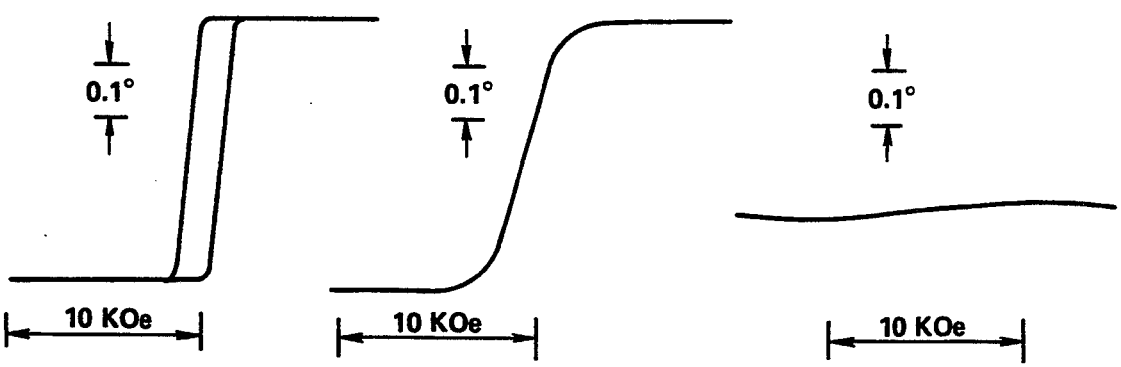
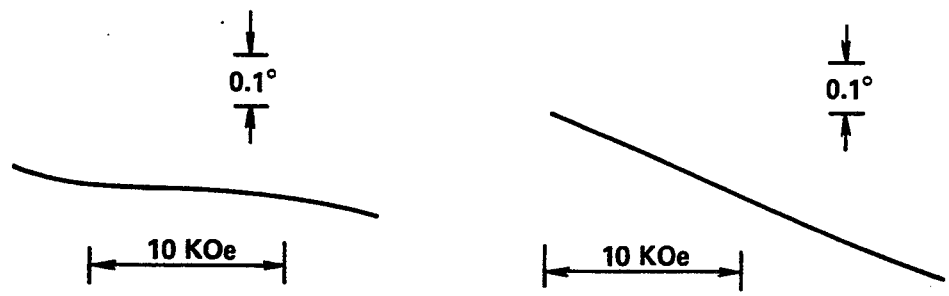
FIG.18(A)  FIG.18(B)  FIG.18(C)
FIG.18(D)  FIG.18(E)

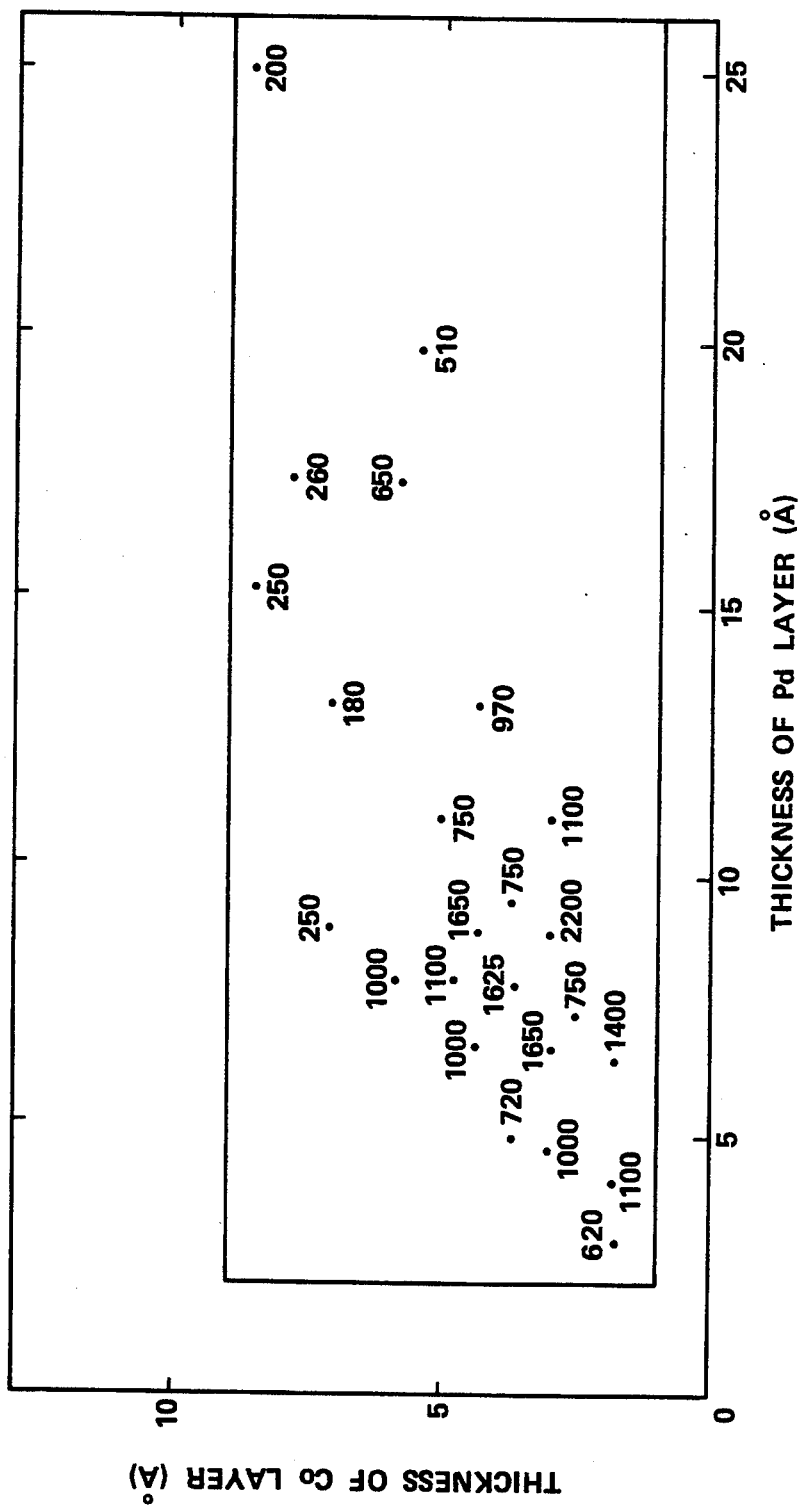

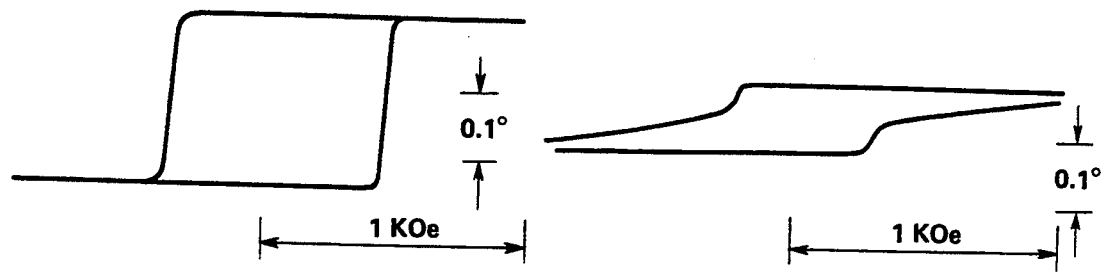
FIG.27(A)  FIG.27(B)
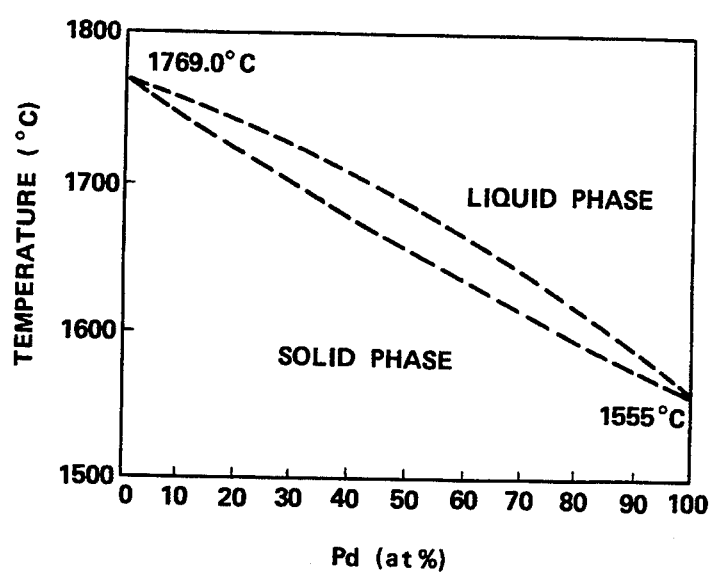
FIG.28

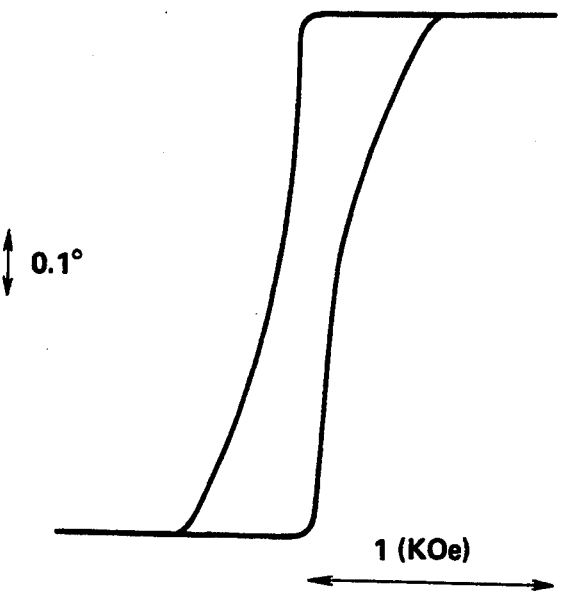
FIG. 31(A)  ↕ 0.1°
1 (KOe)
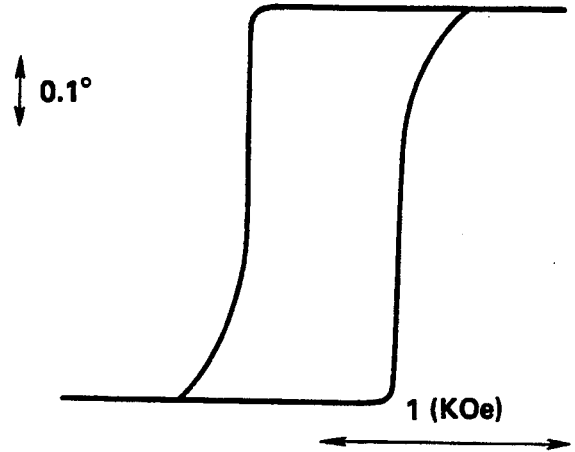
↕ 0.1°
FIG. 31(B)
1 (KOe)
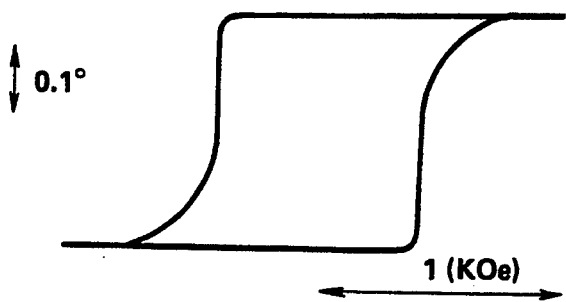
↕ 0.1°
FIG. 31(C)
1 (KOe)

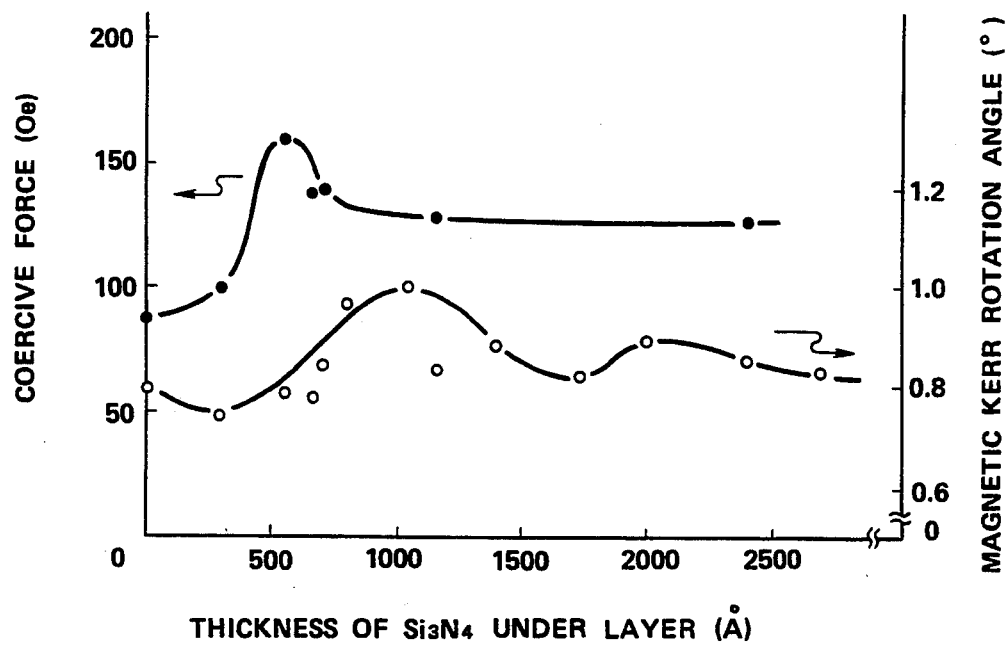
FIG. 35
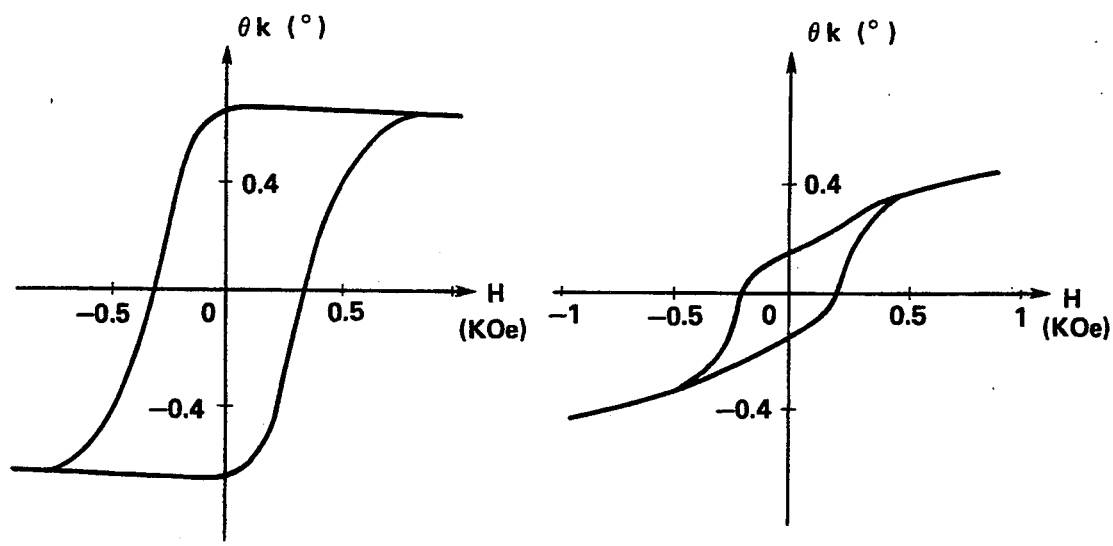
FIG. 36(A)　　FIG. 36(B)

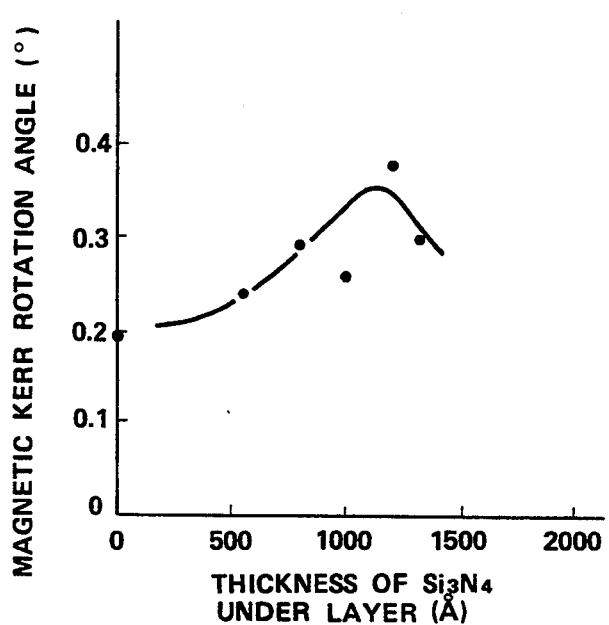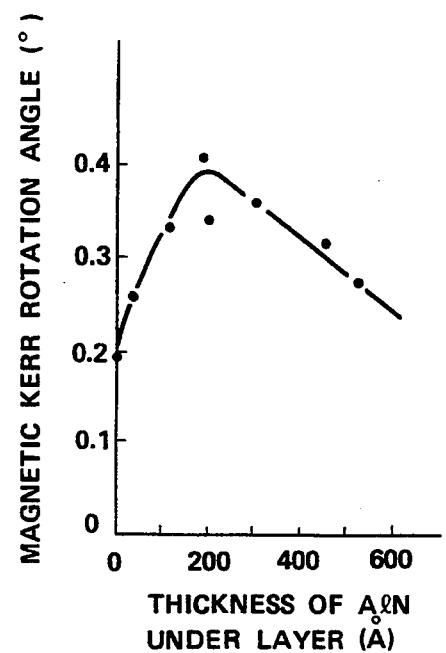
FIG. 47
FIG. 48
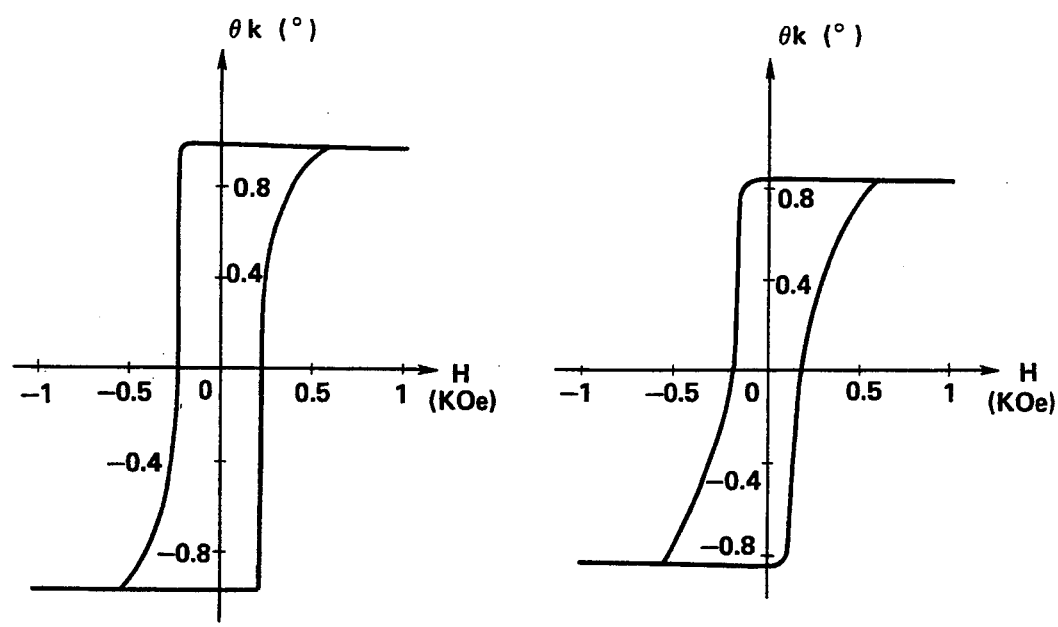
FIG. 49(A)
FIG. 49(B)

MAGNETO-OPTICAL RECORDING MEDIUM WITH STACKED LAYER STRUCTURE

This is a continuation of application Ser. No. 07/995,941, filed Dec. 18, 1992, which was a continuation of U.S. Ser. No. 07/237,001, filed Aug. 26, 1998, and now abandoned.

BACKGROUND OF THE INVENTION

1. Field of the Invention

This invention relates to a magneto-optical recording medium taking advantage of the magneto-optical effect to record or reproduce the information by the laser beam or the like. More particularly, it relates to a magnet-optical recording medium making stable maintenance of the magneto-optical characteristics possible while suppressing corrosion or eroded pit formation.

2. Description of the Prior Art

In recent years, as the rewritable high density recording system, attention has been generally directed to a magneto-optical recording system recording and/or reproducing the informantion with, for example, a semiconductor laser light beam.

As typical of the recording material for the magneto-optical recording system, an amorphous alloy consisting of a combination of rare earth elements, such as Gd, Tb or Dy and transition metal elements, such as Fe, Co or Ni, has been employed. However, the rare earth elements or Fe making up the amorphous alloy tend to be oxidized readily and are easily combined with oxygen in air to form oxides. When the oxidation proceeds to the stage of corrosion or eroded pit formation, signal dropout will be caused. On the other hand, when the rare earth metals undergoes selective oxidation, the C/N ratio will be deteriorated with the decrease in coercivity and the residual magnetic Kerr rotation angle. These problems cannot be avoided iso long as the rare earth metals are used.

Such corrosion or eroded pit formation can be prevented from occurring by adding inert elements such as Pt, Pd or Co or elements capable of forming passivated films, such as Ti, Cr or Al, to the amorphous alloy thin film, and the favorable effect of such addition is confirmed in the case of a layer of a larger thickness. However, Unfortunately, the use of the aforementioned addition elements results frequently in the lowering of the magnetic Kerr rotation angle, while the desired effect is not attained with the thickness of the layer of not larger than 500 Å, such that a protective film or films need be employed simultaneously.

For practical application of the magneto-optical recording medium, it is essential not only to increase the aforementioned magnetic Kerr rotation angle, but to increase coercivity and the rectangular ratio of the magnetic Kerr loop. The rectangular ratio herein means the ratio between the residual magnetic Kerr rotation angle $\theta_k^r$ and the saturation magnetic Kerr rotation angle $\theta_k^s$. The value of the ratio closer to unity is more favorable. Recent researches have revealed that the rectangular ratio is intimately related with the monoaxial anisotropic energy of the recording layer, such that, the closer the ratio to unity, the sharper the form of the write bit owing to the increased monoaxial anisotropic energy or to the decreased dispersion of the anisotropic energies, resulting in the improved C/N ratio at read-out information.

On the other hand, the Co-Pt or Co-Pd type material, employing noble metals such as Pt or Pd in place of the rare earth elements, is superior in corrosion resistance, and expected to be used as, for example, the recording material for the magnetic recording medium.

However, in these Co-Pt or Co-Pd type materials, as reported in the "Journal of Magnetism and Magnetic Materials", Vol 66, pages 351 to 355, 1987, only perpendicular magnetic anisotropy has been found to exist for the layer thickness as large as about 2000 Å, while it has not been tried to apply the material to the magneto-optical recording medium.

SUMMARY OF THE INVENTION

The present invention has been proposed in view of the above mentioned prior-art state, and is aimed to provide a magneto-optical recording medium employing noble metal elements in place of the rare earth elements for effectively suppressing corrosion or eroded pit formation while assuring stable maintenance of the magneto-optical properties.

As a result of our eager researches into accomplishing the above object, the present inventors have found that a multi layered film obtained by alternately stacking a Co-layer, a Pt-layer and/or a Pd layer, each being of a predetermined thickness exhibits superior magneto-optical properties in the extremely thin total thickness range, the multi layered film may be employed for magneto-optical recording, and that the magneto-optical properties may be improved by simultaneously using base coat or layer formed of a specified metal or dielectric material. Such finding has led to fulfilment of the present invention.

Thus, according to the first aspect of the present invention there is provided a magneto-optical recording medium which comprises a multi layered film formed by alternately stacking of the Co layer, the Pt layer and/or the Pd layer as the recording layer and the recording layer has the total thickness ranging from 50 to 800 Å.

According to the second aspect of the present invention, there is provided a magneto-optical recording medium which comprises a multi layered film formed by alternately stacking of the Co layer, Pt layer and/or the Pd layer as the recording layer, the recording layer has the total thickness of 50 to 800 Å and an under layer film is provided adjacent to the recording layer which is at least one of Cu, Rh, Pd, Ag, W, Ir, Pt and Au.

According to the third aspect Of the present invention, there is provided a magneto-optical recording medium which comprises a multi layered film formed by alternately stacking of the Co layer, Pt layer and/or the Pd layer is used as the recording layer, and in that the recording layer is formed on the substrate with the interposition of a dielectric or layer.

The magneto-optical recording medium having the Co-Pt, Co-Pd or Co-Pt-Pd type multi layered film of the present invention is free of rare earth elements and hence superior in corrosion resistancy. Above all, optimum magneto-optical properties may be attained with the total film thickness of 50 to 800 Å.

Also, in the above described magneto-optical recording medium, an under layer formed of at least one of Cu, Rh, Pd, Ag, Gd, W, Ir, Pt and Au may be provided for improving coercivity.

In addition, a film of a dielectric material may be provided between the substrate and the Co-Pt, Co-Pd or Co-Pt-Pd type artificial lattice film for increasing the perpendicular magnetic anisotropic energy of the recording layer. Thus results in a sharper form of the written bit and the improved C/N ratio at read-out operation. When the thickness of the dielectric film is selected at an optimum value, increase in the magnetic Kerr rotation angle is also expected. Hence, the magneto-optical recording may be performed with a higher quality and a higher density.

BRIEF DESCRIPTION OF THE DRAWINGS

FIGS. 2 to 4 are diagrammatic sectional view showing modified exemplary constructions of the magneto-optical recording medium of the present invention wherein FIG. 2 shows an example of providing a metallic reflective layer on the recording layer, FIG. 3 an example of providing a dielectric layer on the recording layer and FIG. 4 an example of providing a dielectric layer and a metallic reflective layer on the recording layer in this sequence.

FIGS. 6A to 6C are characteristic diagrams showing typical magnetic Kerr rotation angle for typical Co-Pt type recording layer.

FIGS. 7A and 7B are characteristic diagrams showing magnetic Kerr loops of the Co-Pt type recording layer in which, for comparison with the FIGS. 6A to 6C above.

FIGS. 14A and 14B show magnetic Kerr loops showing the total thickness dependency of the magneto-optical properties of the recording layer.

FIGS. 16A and 16B are characteristic diagrams showing typical magnetic Kerr loops in the same accelerated degradation tests, wherein FIG. 16A shows the state before the layer is left under the above environment and FIG. 16B the state after 300 hours since the start of the accelerated degradation test.

FIGS. 17A to 17D are characteristic diagrams showing the magnetic Kerr loops for the case in which the same recording layer is allowed to stand in air or subjected to accelerated degradation tests under different conditions.

FIGS. 18A to 18E are characteristic curves for the case in which the typical recording layers containing the rare earth element Tb in place of Pt as a comparative example are allowed to stand in air or subjected to accelerated degradation tests.

FIG. 21 is a characteristic diagram showing the coercive force of a typical Co-Pd type recording layer.

FIGS. 27A and 27B show magnetic Kerr loops showing the total thickness dependency of the magneto-optical characteristics of the recording layers.

FIG. 28 is a phase diagram showing the full Pt/Pd binary system.

FIGS. 31A to 31C show magnetic Kerr loops showing the relation between the magneto-optical properties and the various thickness of the Pt under layer in the magneto-optical recording medium having the Co-Pt type multi layered metal film as the recording layer.

FIG. 35 is a characteristic diagram showing changes in the magnetic Kerr rotation angle and the coercive force caused with the thicknesses of the $Si_3N_4$ under layer in the same magneto-optical recording medium.

FIGS. 36A and 36B show magnetic Kerr loops showing changes in the magneto-optical characteristics caused with the presence or absence of the $Si_3N_4$ under layer in the same magneto-optical recording medium in the magneto-optical recording medium having a Co-Pt type multi layered film formed on a polycarbonate substrate.

FIGS. 39A to 39D show magnetic Kerr loops showing magneto-optical properties of the magneto-optical recording medium having a Co-Pt type multi layered film is formed on a glass substrate through the interposition of the other nitride dielectric materials, wherein FIGS. 39A to 39C show the case in which a 480 Å thick ZrN under layer, a 40 Å thick BN under layer and a 700 Å AlN under layer are provided, respectively and FIG. 39D shows the case in which the under layer is not provided as a comparative example.

FIGS. 46A to 46D show magnetic Kerr loops showing magneto-optical properties of the magneto-optical recording medium haivng a Co-Pd type multi layered film formed on a glass substrate through the interpositon of a under layer of the other nitride dielectric materials, wherein FIGS. 46A to 46C show the cases wherein a 1300 Å $Si_3N_4$ under layer, a 300 Å thick AlN under layer, a 1200 Å A BN under layer are provided, respectively and FIG. 46D shows the case wherein a under layer is not provided, as a comparative example.

FIG. 47 is a characteristic diagram showing changes in the magnetic Kerr rotation angle with the thickness of the $Si_3N_4$ under layer in the same magneto-optical recording medium.

FIG. 48 is a characteristic diagram showing changes in the magnetic Kerr rotation angle caused with the thickness of the AlN under layer in the same magneto-optical recording medium.

FIGS. 49A and 49B show magnetic Kerr curves showing changes in the magneto-optical properties caused by the presence or absence of the $Ta_2O_5$ under layer in the magneto-optical recording medium having the Co-Pt type artificial lattice film formed on a glass substrate, wherein FIG. 49A shows the case wherein a 200 Å $Ta_2O_5$ under layer is provided and FIG. 49B that wherein the $Ta_2O_5$ is not provided as a comparative example.

FIGS. 55A to 55D show magnetic Kerr loops showing magneto-optical characteristics of the magneto-optical recording medium having a Co-Pd type multi layered film formed on a glass substrate with the interposition of a under layer of the other oxide dielectric materials, wherein FIGS. 55A to 55C show the case wherein a 500 Å thick $SiO_2$ under layer, a 20 Å thick $Al_2O_3$ under layer and a 60 Å thick $Al_2O_3$ under layer are provided, respectively, and FIG. 55D shows the case wherein the under layer is not provided as a comparative example.

FIG. 57B being a medium having a substrate with a metal layer and a stack of first and second layers with each first layer being of Co alternately stacked with a second layer of either Pt or Pd; FIG. 57C being a medium with a substrate covered by a dielectric layer having a stack of first and second layers with each first layer of Co being alternately stacked with a second layer of either Pt or Pd; and FIG. 57D being a medium with a substrate having a stack of first layers of Co, second layers of Pt and Pd with the order of stacking being Co, Pd, Pt, Pd, Co.

DESCRIPTION OF THE PREFERRED EMBODIMENTS

Figure 1:
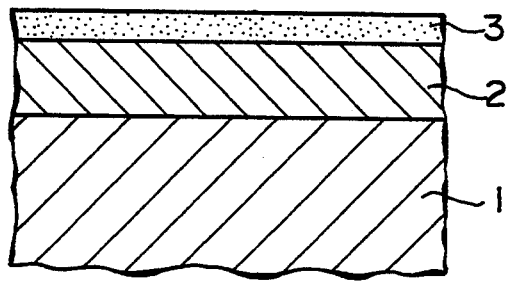
FIG. 1 is a diagrammatic sectional view showing the most basic arrangement of the magneto-optical recording medium of the present invention.

A multi layered film utilized as the recording layer in the magneto-optical recording medium of the present invention is a Co-Pt type multi layered film composed of Co layer and a Pt layer stacked alternately, a Co-Pd type artificial lattice film composed of Co layer and Pd layer stacked alternately, and a Co-Pt-Pd type multi layered film composed of Co layer, Pt layer and Pd stacked together.

In any case, it is preferred that the multi layered film, which is to be the recording layer, be of a total thickness ranging between 50 and 800 Å, because the magneto-optical properties including the magnetic Kerr angle or the coercive force are lowered outside the above defined range.

Above all, in the Co-Pt type multi layered film, it is more preferred that the Co layer be of a thickness ranging between 2 and 8 Å, the Pt layer be of a thickness ranging between 3 and 40 Å and the multi layered film be of the total thickness preferably ranging between 50 and 400 Å, since the magneto-optical properties are optimum within these ranges. Although the magneto-optical properties are exhibited outside these ranges, for example, for the film thickness not larger than 800 Å, the rectangular ratio is slightly lowered for the range above 400 Å.

Similarly, in the Co-Pd type multi layered film, the magneto-optical properties become optimum for the thickness of the Co layer ranging between 1 and 9 Å, the thickness of the Pd layer ranging between 2 and 40 Å and the total thickness ranging between 50 and 800 Å.

The above thickness ranges are set from the viewpoint of optimizing the magneto-optical properties. In any of the above three films, in-plane magnetization components are produced outside the above defined ranges to deteriorate the magneto-optical characteristics.

The Co-Pt-Pd type artificial lattice film may be formed by stacking the Co layer and the Pt-Pd alloy layer alternately, or by stacking the layers in the order of Co-Pt-Co-Pd or Co-Pt-Pd-Co.

Although it is most preferred that the interfaces or boundary surfaces of the metal surfaces making up each of multi layered films be smooth and flat, without the atoms of the different metals randomly existing together, so as to form a so-called super lattice structure, the boundary surfaces may also have a so-called modulated structure (composition modulated structure) in which the composition is fluctuated with a certain periodicity as a whole despite certain perturbances in the boundary surfaces.

The above multi layered film may also be formed by sputtering, vacuum deposition or molecular beam epitaxy (MBE).

In case of the two-component system, such as the Co-Pt or Co-Pd systems, each sputtering target need be provided for each of the component metals. When forming the aforementioned three-component type magneto-optical recording medium by sputtering, it may be formed by a simultaneous binary sputtering employing a Co target and a Pd target on which is placed a Pt chip, a simultaneous ternary sputtering employing Co-, Pd and Pt targets, or a simultaneous quaternary sputtering in which the respective metal layers are stacked in the order of Co-Pd-Pt-Pd- ... using the Co, Pt and Pd targets.

In case of the three-component system, such as the Co-Pt-Pd system, each evaporation source may be provided separately for each of the component metal, or a combined alloy evaporation source may be provided for a combination of Pt-Pd, or an evaporation source of the minor component metal may be superimposed on an evaporation source of the other metal.

The aforementioned multi layered films may be admixed with a variety of elements as additive elements for increasing heat stability or lowering the Curie temperature.

In this case, optimum additive elements and/or the amounts of addition of these elements will vary depending on the kinds of the multi layered film or of the metal layers.

For example, when the additive elements are added to a Co layer of a multi layered film composed of the Co layer and a Pt layer stacked together, it is preferred that the Co layer be shown by the formula $Co_{100-x} M_x$, wherein x stands for the amount of substitution in atomic percent and M stands for the additive element, and that the additive element be at least one of B, C, Al, Si, P, Ti, V, Fe, Ni, Cu, Ga, Ge, Zr, Nb, Mo, In, Sn, Sb, Gd, Tb, Dy and Ta. The optimum amount of substitution x will vary slightly from element to element and $0.1 \leq x \leq 7$ for M=Al, $0.1 \leq x \leq 14$ for M=Zr, $0.1 \leq x \leq 20$ for M=Si, Mo or Ta, $0.1 \leq x \leq 25$ for M=Fe, $0.1 \leq x \leq 30$ for M=B, C, Ti, V, Cu, Ga, Ge, Nb, In or Sn, $0.1 \leq x \leq 35$ for M=P, $0.1 < x < 40$ for M=Gd, Tb or Dy, $0.1 < x < 45$ for M=Sb and $0.1 \leq x \leq 70$ for M=Ni.

The lower limit for the amount of substitution x of the additive elements is 0.1 atomic percent. With the amount x less than this threshold value, the effect of lowering of the Curie point is not exhibited. The upper limit of the amounts of substitution x of the elements range from 7 to 40 atomic percent depending on the kinds of the additive elements. With the amount x larger than these values, the magneto-optical properties are occasionally deteriorated. Although it may be contemplated to add the aforementioned third element to the Pt layer to provide the composition of the Pt layer of $Pt_{100-x}M_x$, wherein x stands for the amount of substitution in atomic percent and M stands for the additive element, it should not be the improvement in the magneto-optical properties or heat stability but in the adjustment of the Curie point that is primarily aimed at on such an occasion. It is because addition of the third element to the Pt layer results in increasing the Curie point and lowering the magnetic Kerr rotation angle, although not without exceptions. The unlimitedly low Curie point however is not necessarily desired, from the standpoint of protecting the recording information, so that, when the Curie point of the recording layer is extremely low from the outset, it can be raised to a practical range by such means. The elements that can be added to the Pt layer include Cr, Mn, Co, Zn, Y, Rh, Ag, La, Nd, Sin, Eu, Ho, Hf, W, Ir, Au, Pb and Bi, in addition to the elements in common with the Co layer. The Pt layer may be replaced by Pd in any desired ratio.

When the additive element is added to the Co layer in the multi layered film composed of Co and Pd layers stacked together, it is preferred that the Co layer is shown by $Co_{100-x}M_x$, wherein x stands for the amount of substitution in atomic percent and M stands for the additive element and that the additive element be at least one of P, Ti, V, Ni, Ga, Ge, B, C, Al, Si, Fe, Cu, Zr, Nb, Mo, In, Sn, Sb, Ta and W. The optimum amount of addition x also varies with the kinds of the additive elements, such that $0.1 \leq x \leq 10$ for M=Zr, $0.1 \leq x \leq 12$ for M=P or Al, $0.1 \leq x \leq 20$ for M=Sn, Sb or W, $0.1 \leq x \leq 25$ for M=Ti, V, Ni, Ga, Ge or Nb, $0.1 \leq x \leq 30$ for M=B, C, Si, Fe, Cu, Mo or In and $0.1 \leq x \leq 40$ for M=Ta. The grounds of limitation are similar to those for the aforementioned Co-Pt base artificial lattice film.

It is also possible before formation of the above described multi layered film as the recording layer to form an under layer on a suitable substrate, such as glass, as by sputtering, vacuum deposition or MBE.

The materials for the under layer are roughly classified into a metal and a dielectric material. As the metal, at least one of Cu, Rh, Pd, Ag, Ir, Pt and Au having a face-centered cubic structure (fcc structure) and W having a body-centered cubic structure (bcc structure). The kinds of the elements exhibiting the most outstanding effect will differ slightly depending on the kinds of the recording layer formed on the under layer such that the under layer of Pd, Ag, W, Pt and Au and the under layer of Pd, Ag, Pt and Au may be used for the Co-Pt type recording layer and for the Co-Pd type recording layer, respectively. These elements may be used alone or as a combination of two or more elements.

The thickness of the under layer is preferably 5 to 5000 Å and more preferably 5 to 500 Å. The coercive force cannot be increased sufficiently with too small a thickness of the under layer, while the coercive force reaches saturation and hence a further favorable result cannot be expected with too large a thickness of the under layer. The under layer thickness is preferably 10 to 200 Å when the signals are read from the substrate side, that is, the under layer side, and 200 to 2000 Å when the signals are read from the multi layered film side.

The dielectric materials include oxide type compounds, such as $Al_2O_3$, $Ta_2O_5$, MgO, $SiO_2$, $Ti_2O_2$, $Fe_2O_3$, $ZrO_2$ or $Bi_2O_3$, nitride type compounds such as ZrNM, TiN, $Si_3N_4$, AlN, AlSiN, BN, TaN or NbN or oxide-nitride composite materials (so-called oxynitride compounds) when selected to an optimum thickness, this under layer has the effect of increasing the magnetic rotation Kerr angle by the interference effect (enhancement effect).

The substrate employed in the present invention may be formed of a material employed ordinarily as the substrate of the magneto-optical recording medium. As typical of the material may be mentioned glass, polycarbonate or polymethylmethacrylate (PMMA).

Figure 2:
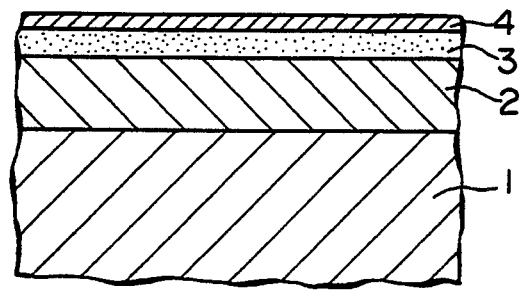
Figure 3:
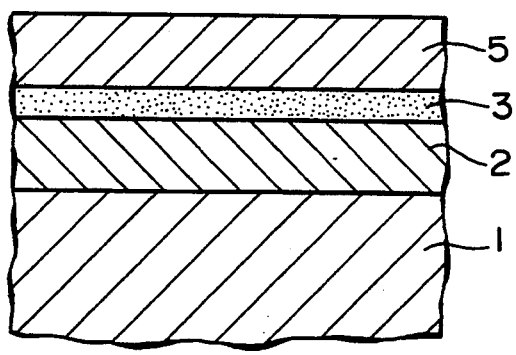
Figure 4:
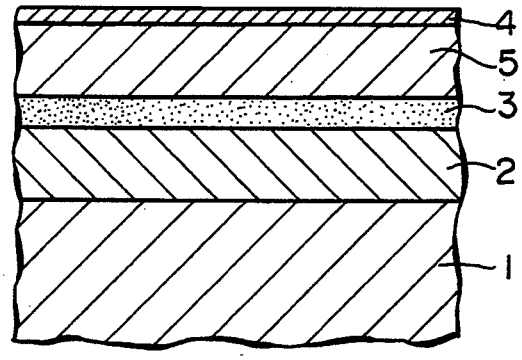

The basic arrangement of the magneto-optical recording medium is shown in FIG. 1. A recording layer 3 is formed on the substrate 1 via under layer 2 of metal or dielectric material. However, as shown in FIG. 2, it is practically more commonplace to provide a metal reflective layer 4, formed of Al, Au, Pt or Cu, for example, on the above recording layer 3. A second dielectric layer 5 may be additionally provided on the recording layer 3 for further improving magneto-optical properties, as shown in FIG. 3. The material of the dielectric layer 5 may be same as or different from that of the dielectric under layer 2. Alternatively, the metal reflecting layer 4 may be provided on the dielectric layer 5, as shown in FIG. 4. A metal under layer may further be interposed adjacent under the recording layer when the under layer 2 is formed of dielectric material.

Any writing method for writing on the recording layer of the magneto-optical recording medium as described hereinabove may be employed in addition to the light beam, such as a needle-shaped magnetic head, heat pen or electron beam, or the condition that such means are capable of supplying an energy necessary for producing inverted magnetic domain.

Thus, taking advantage of the fact that the Co-Pt or Co-Pd type multi layered thin metal film or the modulated structure thin metal film, the usage of which has so far been studied as the recording material of the magnetic recording medium, exhibits superior vertical magnetic anisotropy and magneto-optical properties in the reduced total thickness range not larger than 800 Å, the present invention has opened the way to apply the film in the magneto-optical recording medium.

The present invention also makes it possible to provide a under layer formed of at least one of Cu, Rh, Pd, Ag, W, Ir, Pt and Au in the magneto-optical recording medium, the recording layer of which is formed by the aforementioned superstructure or modulated structure thin metal film, for further improving the coercive force.

In addition, the present invention provides a dielectric under layer between the substrate and the recording layer composed of a Co-Pt, Co-Pd or Co-Pd-Pt type multi layered films to increase the energy of the perpendicular magnetic anisotropy of the recording layer. This results in a sharper form of the write bits and an improved C/N ratio during the read-out operation. Moreover, an increase in the magnetic Kerr rotation angle may be expected by selecting the thickness of the base coat to an optimum value. Hence, it becomes possible to achieve a magneto-optical recording of high quality and density.

Since the rare earth metals, the supply of which is thought to become more stringent, are not used in the multi layered film, the prospect, is that the magneto-optical recording medium will be supplied in future more stably and economically.

When the magneto-optical recording medium is used as a storage medium of a magneto-optical memory, such as a so-called beam addressable file memory, in which signals are written by a light beam and read by a magnetic Kerr effect of a read light beam, respectively, it is possible to realize a memory device having an extremely high density, a larger C/N ratio and a higher reliability for an extended time.

The present invention will be further explained by referring to the drawings.

First Embodiment

The present embodiment is concerned with a Co-Pt type magneto-optical recording medium, the recording layer of which is a metal film obtained upon alternately stacking Co and Pt layers in the form of a multi layered structure.

Co and Pt targets each 100 mm in diameter were placed in a chamber. A glass substrate was positioned facing to these targets and subjected to a simultaneous binary sputtering while being revolved at a predetermined speed of 6 to 60 rpm in an argon atmosphere of a prescribed gas pressure. A d.c. sputtering with a power of 0.2 to 1 A and 300 V was used for Co and a d.c. sputtering will a power of 0.2 to 1 A and 300 V or a RF sputtering with a power of 200 to 500 W was used for Pt. The Co and Pt layers were stacked alternately on the glass substrate to form a recording layer of a prescribed total thickness.

Figure 5:
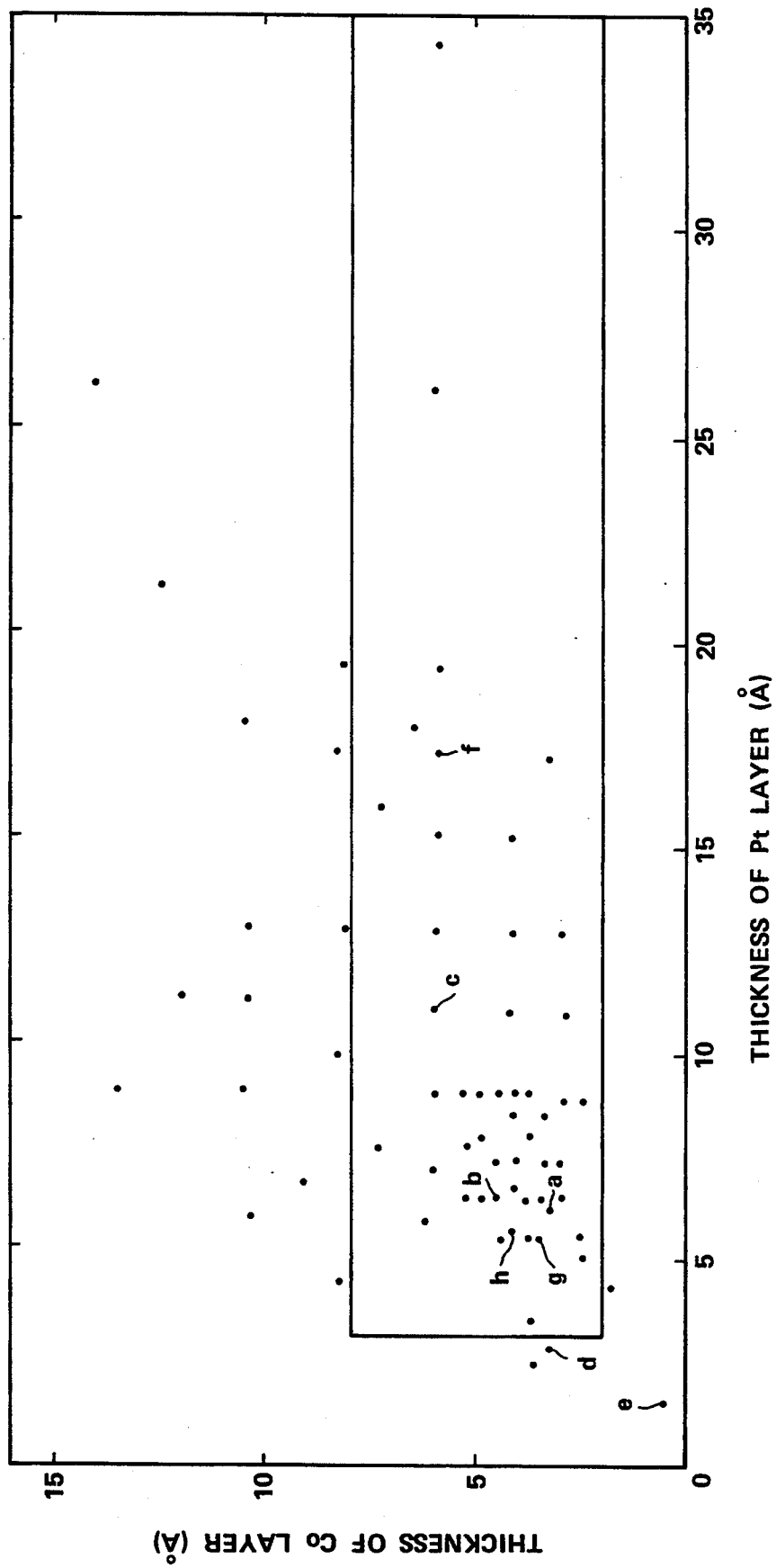
FIG. 5 is diagram showing the thicknesses of the Co layer and the Pt layer in the Co-Pt type recording layer.

FIG. 5 shows the thicknesses for the Co and Pt layers of each of the actually formed recording layers each having a total thickness of 100 Å. In this figure, the thickness of the Co layer in Å is plotted on the ordinate and the thickness of the Pt layer in Å is plotted on the abscissa. The thickness of 2.5 Å and the thickness of 2.8 Å correspond to the one atomic layer in Co and Pt, respectively. The dots in the figure represent the thickness of each atomic layer in each recording layer, whereas a frame in thick solid lines indicates the preferable range of the thickness for each layer. The small angle X-ray scattering has revealed that each recording layer has been turned into the multi layered metal film.

FIGS. 6A to 6C show the measured results of the magneto-optical effect for some of the recording layers included within the thick line frame in FIG. 5, from the side of the recording layer, using a polar Kerr measurement system at a wavelength of 780 nm. The recording layer are each formed to a total thickness of 100 Å at an argon gas pressure of 5 mTorr. FIGS. 6A, 6B and 6C show magnetic Kerr loops of the recording layer associated with a point a (Co=3.3 Å, Pt=6.2 Å), point b (Co=4.5 Å, Pt=6.3 Å) and a point c (Co=6 Å, Pt=11 Å), respectively. The magnetic Kerr rotation angle in degrees and the intensity of the external magnetic field in kOe are represented on the ordinate and the abscissa, respectively. It is seen from these figures that the rectangular ratio for each recording layer is equal to unity thus indicating that the recording layer has highly satisfactory magneto-optical characteristics. The rectangular ratio means the ratio of the residual magnetic Kerr rotation angle $\theta_k^r$ to the saturation magnetic Kerr rotation angle $\theta_k^s$ ($=\theta_k^r/\theta_k^s$). The closer the value of the ratio to unity, the better the C/N ratio at the time of reproduction.

For comparison, the recording layers having the thickness of the respective atomic layers not falling within the frames of the thick lines were also formed and the magneto-optical properties thereof were measured. The results are shown in FIG. 7A and 7B. FIG. 7A shows the magnetic Kerr loop of the recording layer associated with a point d (Co=3.3 Å, Pt=2.8 Å) and FIG. 7B the magnetic Kerr loop of the recording layer associated with a point e (Co=0.6 Å, Pt=17 Å). It is seen from these figures that each recording layer has a coercive force nearly equal to zero, such that it is unable to be used as the magneto-optical recording medium.

Figure 8:
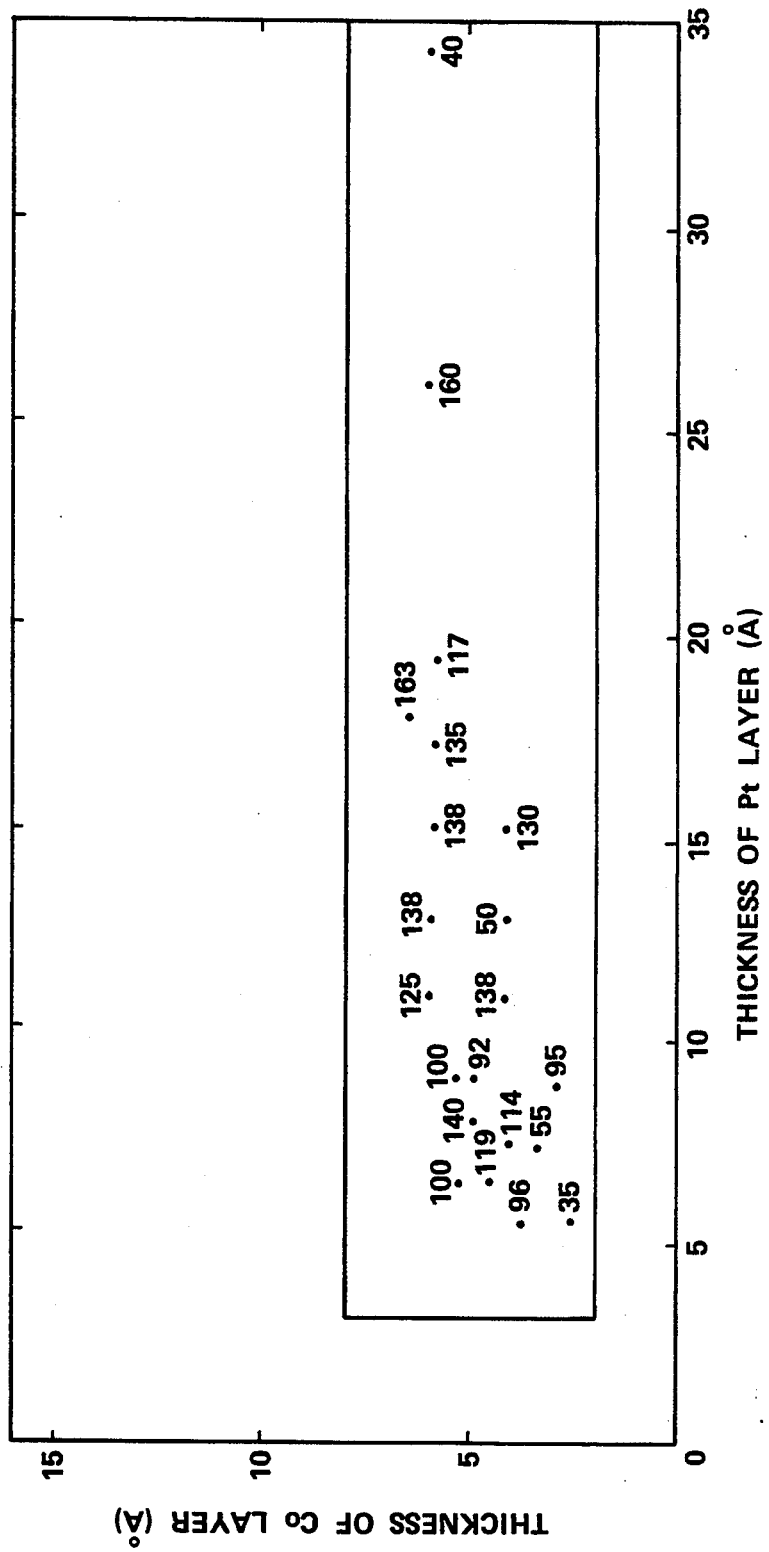
FIG. 8 is a characteristic diagram showing the coercivity of a typical Co-Pt type recording layer.
Figure 9:
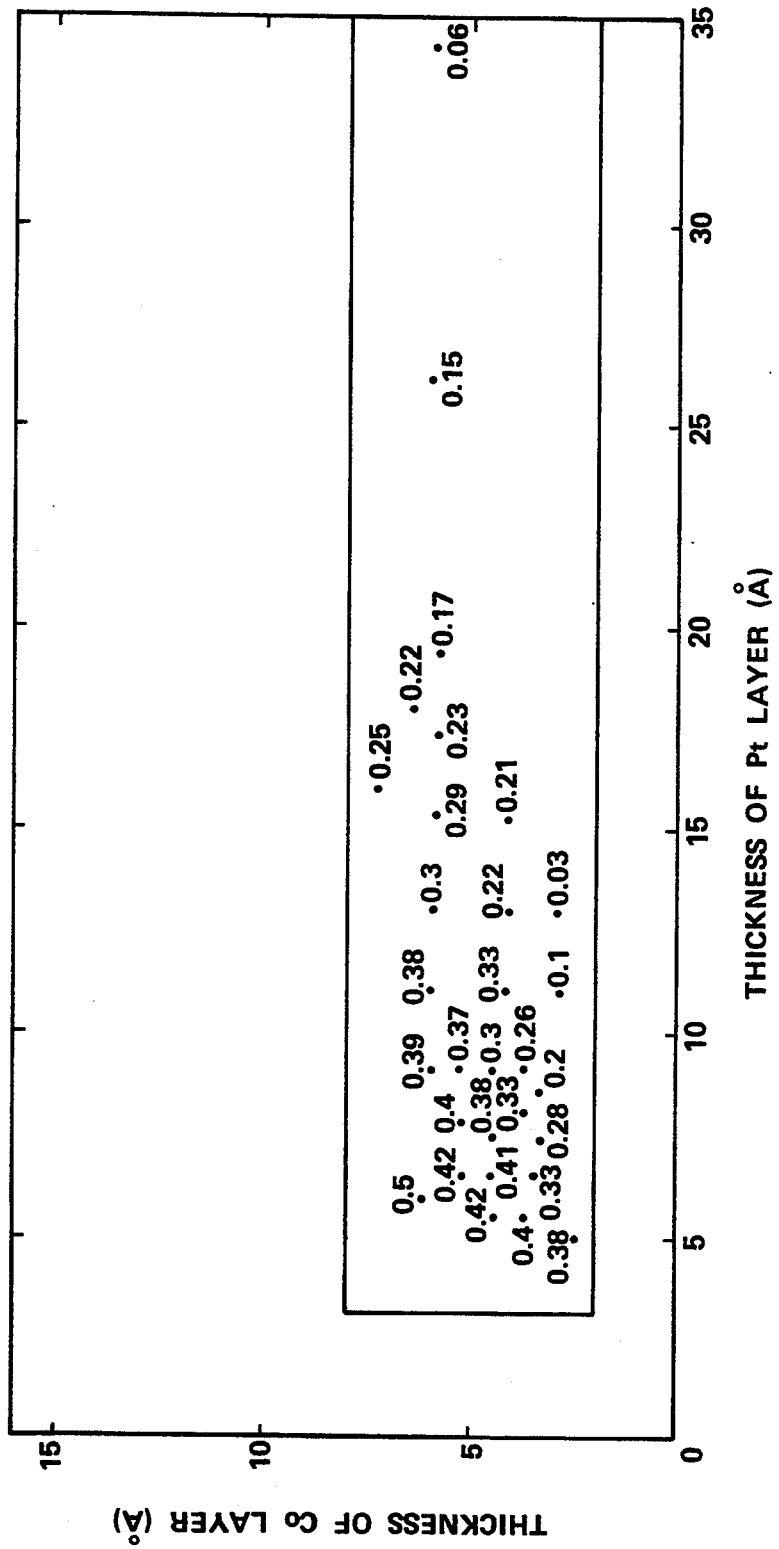
FIG. 9 shows a magnetic Kerr rotation angle a typical Co-Pt type recording layer.

Similar measurements were conducted on the other recording layers. FIGS. 8 and 9 show the coercive force as found from the magnetic Kerr loop and the magnetic Kerr rotation angle, respectively. It is seen from these figures that the coercive force amounts to several tens to 200 Oe and the magnetic Kerr rotation angle amounts to a larger value of 0.5 degrees at the maximum.

Figure 10:
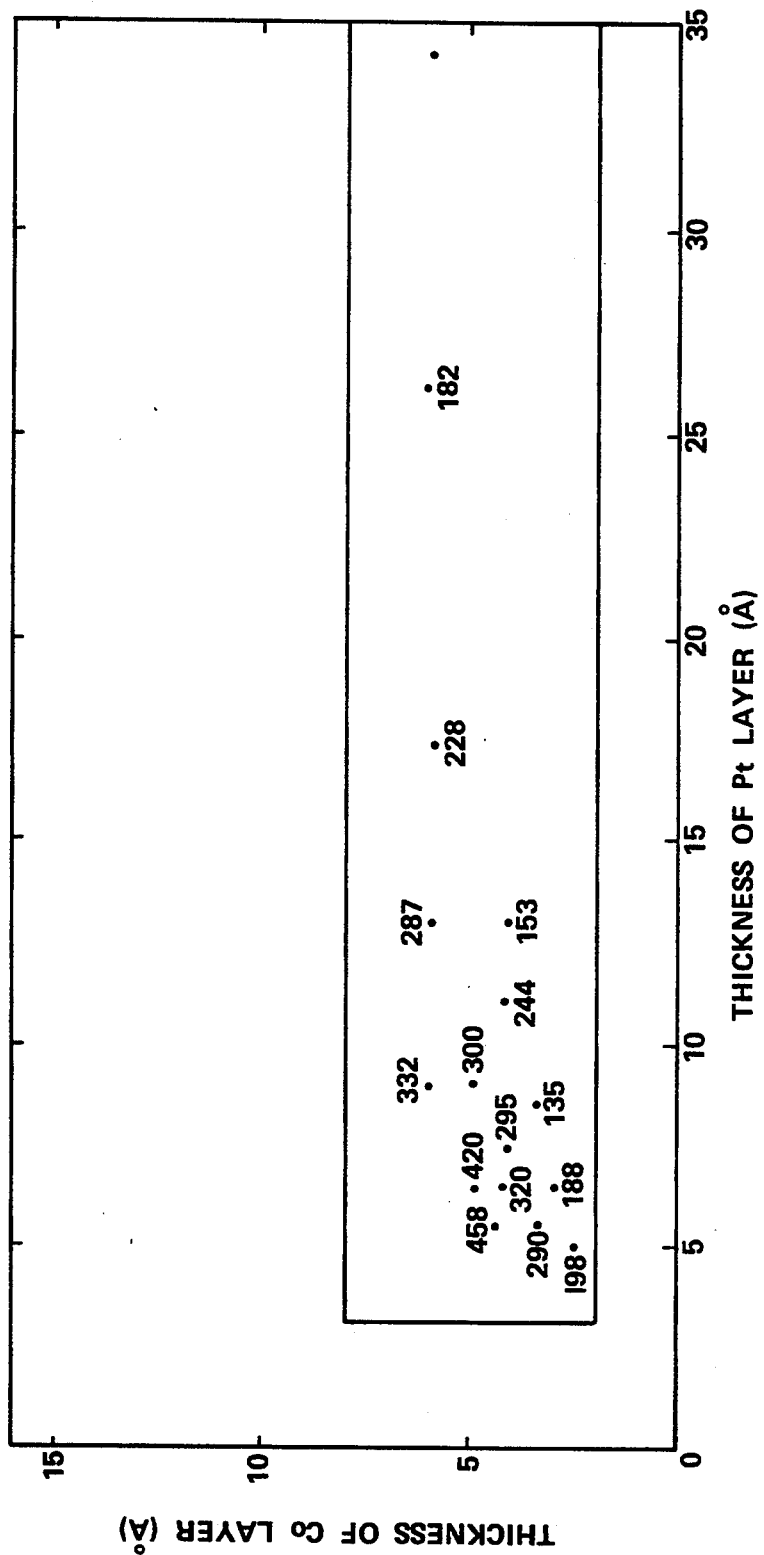
FIG. 10 shows the Curie point of a typical Co-Pt recording layer.

FIG. 10 shows the measured results of Curie point of several recording layers. The Curie point was found by a method in which the magneto-optical properties of the respective recording layers were measured in vacuum at the wavelength of 780 nm, then the magnetic field of 500 Oe was impressed and the temperature was increased simultaneously to find the temperature (° C) at which the magnetic Kerr rotation angle was equal to zero. It may be seen that the Curie point was distributed over a range of approximately 100° to 500° C. and that these recording layers can be used at a practical range of temperatures as the magneto-optical recording medium and can be set as desired in dependence upon the thickness of each atomic layer. Other species of elements may be optionally added to change the curie point.

Figure 11:
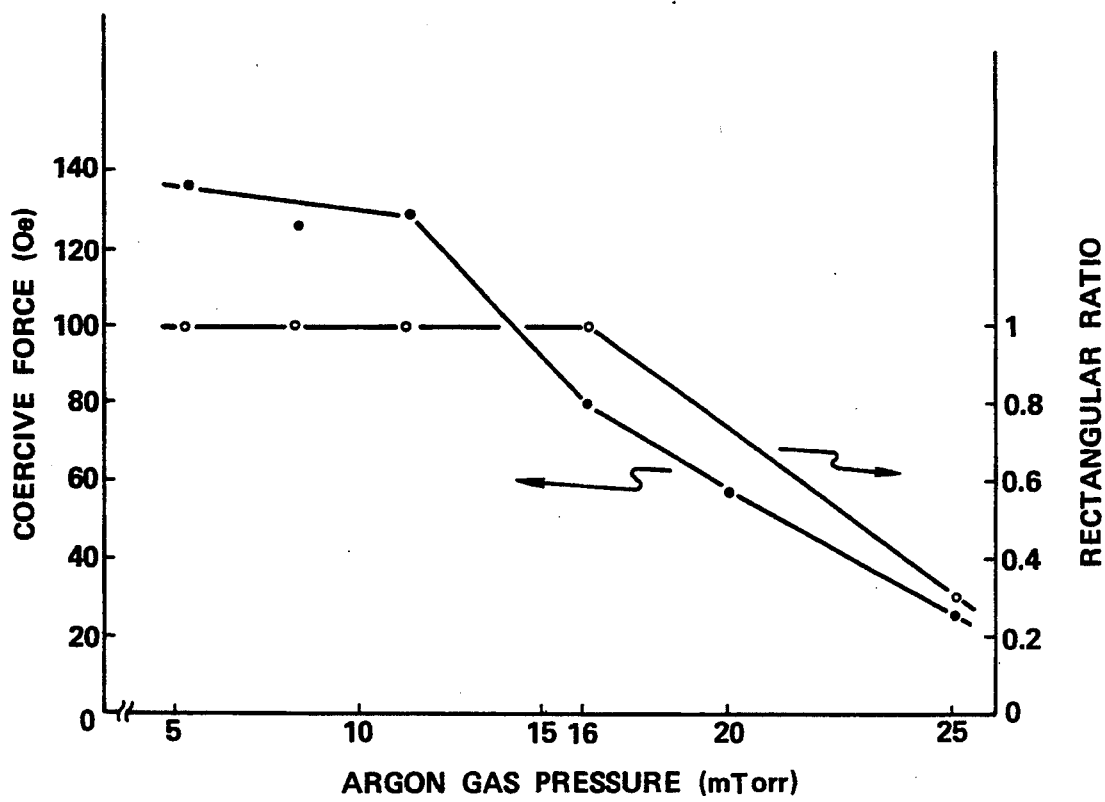
FIG. 11 is a characteristic diagram showing the argon gas pressure dependency of the coercive force and the rectangular ratio of a recording layer obtained by stacking a 6 Å Co layer and a 17.2 Å Pt layer.
Figure 12A:
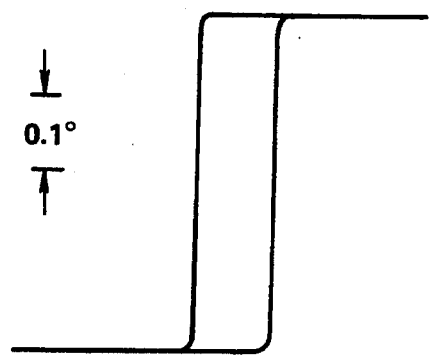
FIGS. 12A to 12C are characteristic diagrams showing magnetic Kerr loops for the same recording layer under typical argon gas pressures.
Figure 12B:
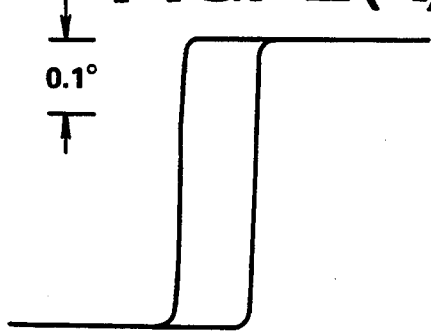
Figure 12C:
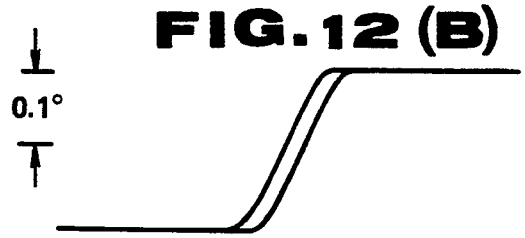

The state of the argon gas pressure dependency of the magneto-optical properties of the recording layer at the time of sputtering was then investigated. As an example, a number of recording layers each having a total thickness of 100 Å and having respective atomic layers each having a thickness shown by a point f in FIG. 5 (Co=6 Å, Pt=17.2 Å) were produced by sputtering at various different argon gas pressures, and the magneto-optical properties thereof were then measured to find the coercive force and the rectangular ratio. FIG. 11 shows the measured values plotted against the argon gas pressure. In the figure, the corcive force in Oe or the rectangular ratio is plotted on the ordinate and the argon gas pressure in mTorr is plotted on the abscissa. Black circle plottings indicate the coercive force and the while circle-plottings indicate the rectangular ratio, respectively. FIGS. 12A to 12C show magnetic Kerr loops under typical argon gas pressures. FIGS. 12A, 12B and 12C show the above loops for the argon gas pressures of 5, 11 and 25 mTorr, respectively. It is seen from FIGS. 11, 12A to 12C that the coercive force and the rectangular ratio descend abruptly from close to 11 mTorr and 16 mTorr, respectively, and that the satisfactory magneto-optical properties can be obtained at the argon gas pressure close to 5 mTorr.

Figure 26:
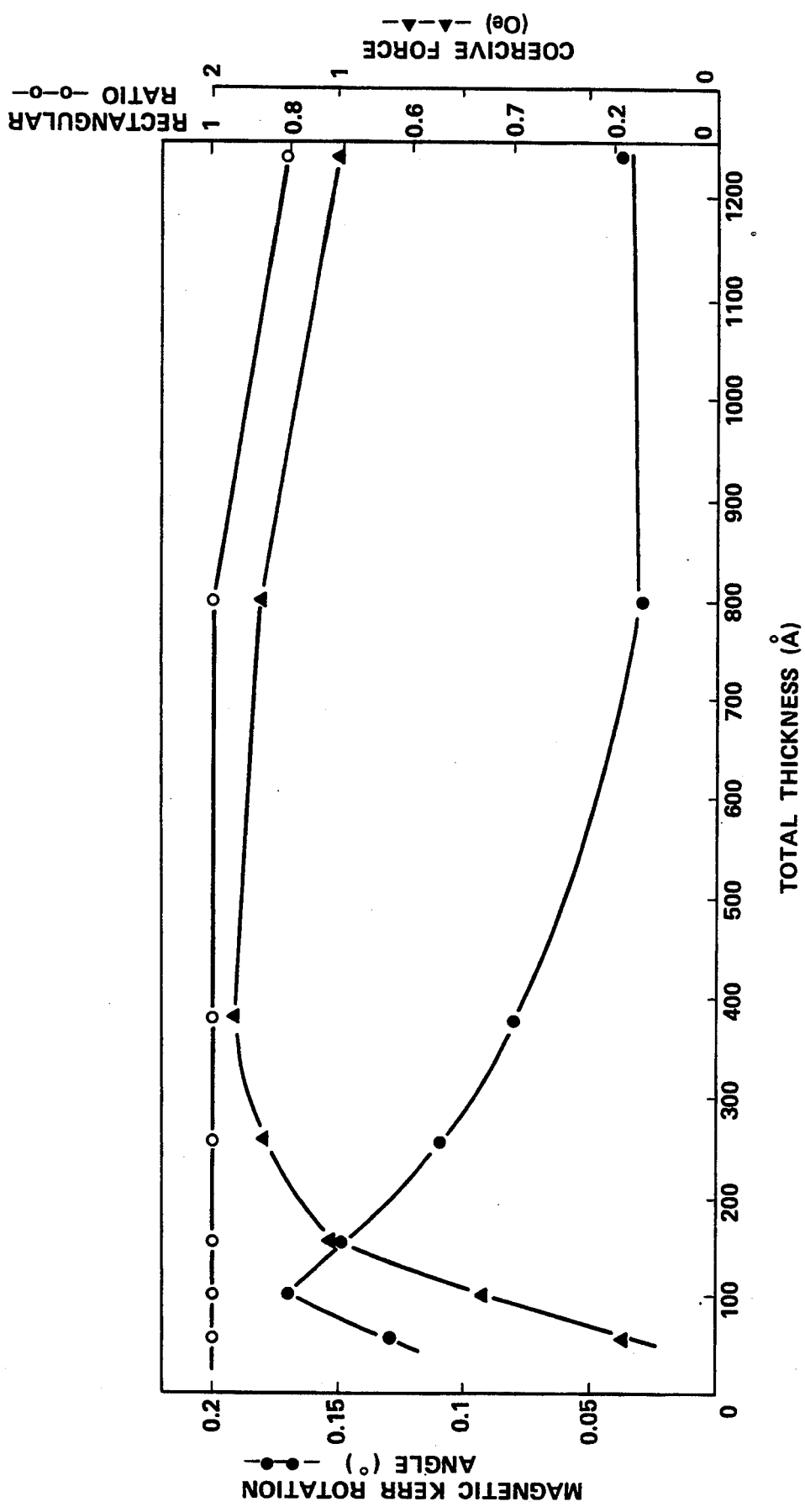
FIG. 26 is a graph showing the total film dependency of the magnetic Kerr rotation angle, rectangular ratio and the coercive force of the same recording layer.

The total thickness dependency of the magneto-optical properties of the same recording layer was then investigated. In consideration of the above test results, the argon gas pressure of 5 mtorr was need for sputtering. The results are shown in FIG. 26. In this figure, the magnetic Kerr rotation angle in degrees, rectangular ratio or the coercive force in Oe is plotted on the ordinate, the total thickness in Å is plotted on the abscissa. The black circle plottings indicate the magnetic Kerr rotation angle, the white circle plottings indicate the rectangular ratio and the black triangular plotting indicate the coercive force. It is seen from this figure that the rectangular ratio is lowered abruptly at close to 800 Å and that both the magnetic Kerr rotation angle and the coercive force are changed in the manner of presenting local maximum values. The total thickness for which the magnetic Kerr rotation angle presents a local maximum is generally in the range of from 80 to 150 Å, with the rotation angle remaining substantially flat for the total thickness larger than 800 Å. Hence, the value of the magnetic Kerr rotation angle shown in FIG. 9 may be roughly said to be a local maximum value.

The total thickness dependency of the magneto-optical properties of another test recording layer was checked from the magnetic Kerr loop. The results are shown in FIGS. 14A and 14B. Thus recording layer was produced at the argon gas pressure of 4 mTorr and has the thickness of each atomic layer thereof represented by a point g in FIG. 5 (Co=3.5 Å, Pt=5.4 Å). FIGS. 14A and 14B show the cases of the total thicknesses of 100 Å and 500 Å, respectively. It is seen from these figures that the magneto-optical properties of the recording layer of the total thickness of 100 Å are superior to those of the recording layer of the total thickness of 500 Å and thus in agreement with the above described tendency shown in FIG. 26.

The larger magnetic Kerr rotation angle at the extremely small layer thickness is characteristic of the magneto-optical recording medium of the present invention and is highly convenient in elevating the transfer rate or the recording density.

Figure 15:
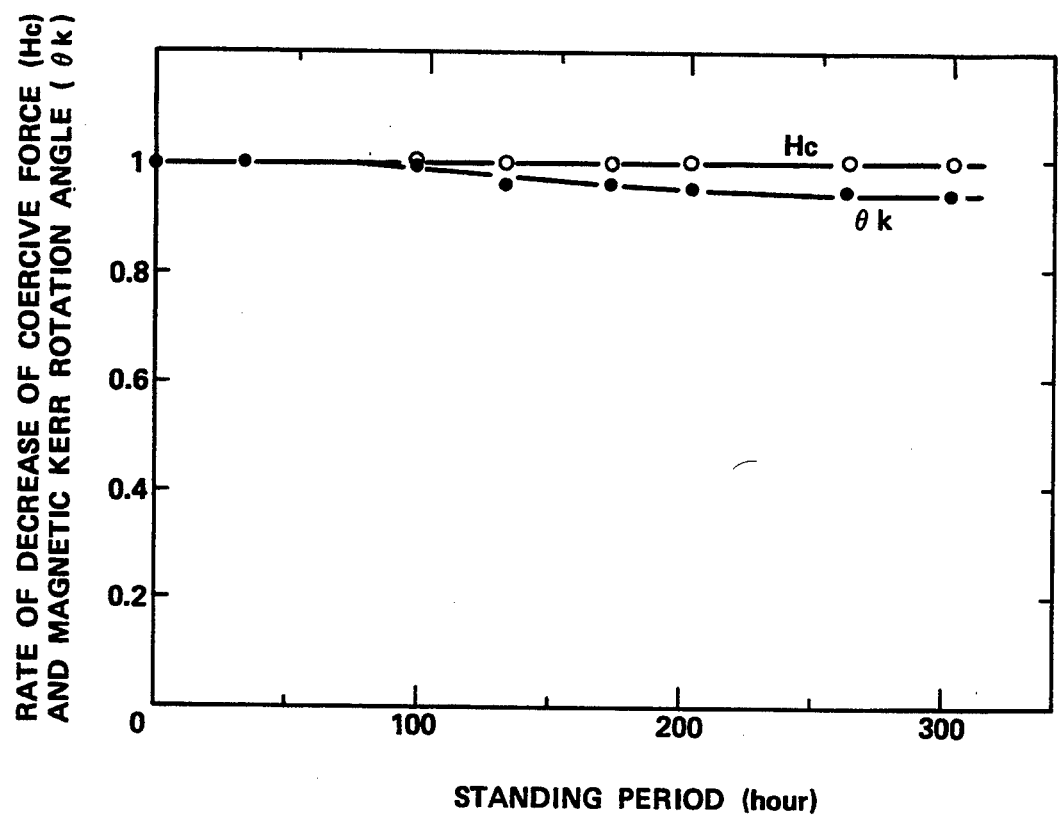
FIG. 15 is a characteristic diagram showing the results of accelerated degradation tests for a recording layer formed by stacking a 6 Å Co layer and a 11 Å Pt layer, said layer being left under the high temperature high humidity environment.

The corrosion resistance of the Co-Pt type recording layer was then investigated by accelerated degradation tests. The Co-Pt type recording layer of the total thickness of 100 Å, with the thickness of each atomic layer being indicated by a point c (Co=6 Å, Pt=11 Å) in FIG. 5, was allowed to stand for a predetermined time under a hot and wet environment with the temperature of 80° C. and the relative humidity (RH) of 75% in order to check for changes in the magneto-optical properties under these conditions. The results are shown in FIG. 15, in which the ordinate indicates the rate of decrease of the coercive force ($Hc_{(t)}/Hc_{(t=0)}$) or the rate of decrease of the magnetic Kerr rotation angle ($\theta_{K(t)}/\theta_{K(t=0)}$), the abscissa indicates the time the recording layer is allowed to stand in hours, the white circle plottings indicate the coercive force and the black circle plottings indicate the magnetic Kerr rotation angle. It is noted that the rate of decrease of the coercive force indicates the ratio of the coercive force after the recording layer is allowed to stand for a predetermined time interval Hc(t) to the coercive force before it is allowed to stand Hc(t=0), whereas the rate of decrease of the magnetic Kerr rotation angle indicates the ratio of the magnetic Kerr rotation angle after the recording layer is allowed to stand for a predetermined time $\theta_{K(t)}$ to that before it is allowed to stand $\theta_{K(t=0)}$ FIGS. 16A and 16B show typical magnetic Kerr loops in the present tests, wherein FIG. 16A shows the loop for the Co-Pt type recording layer before it is allowed to stand and FIG. 16B that for the same layer after it is allowed to stand for 300 hours. It is seen from figures that the recording layer allowed to stand for as long as 300 hours under the hot and wet environment undergoes degradation of the magneto-optical characteristics. practically not inconvenient and that the degradation almost unnoticeable when the recording layer is allowed to stand for less than 100 hours.

The Co-Pt type recording layer of the total thickness of 100 Å, with the thickness of each atomic layer being represented by a point a (Co=3.3 Å, Pt=6.2 Å) in FIG. 5, was subjected to accelerated degradation tests under different conditions. the results are shown in FIGS. 17A to 17D. FIGS. 17A, 17B, 17C and 17D show the magnetic Kerr curves of the respective recording layer before it is allowed to stand in air, after it is allowed to stand in air for one week, and after 5 hours and after 100 hours since the start of the accelarated degradation test under the hot and wet environment of the temperature of 80° C. and the RH of 90%, respectively. It is seen from these figures that the recording layer has a sufficiently high coercive force and a rectangular ratio close to unity and thus exhibits extremely stable magneto-optical properties, although the magnetic Kerr rotation angle is slightly lowered after 100 hours since the start of the accelerated degradation test.

For comparison, similar test were conducted on the recording layer containing Tb, a rare earth element, in place of Pt. The recording layer formed by alternately stacking Tb layer each of about one atomic layer and Co layers each of about two atomic layers until the total thickness is equal to 200 Å. The results are shown in FIGS. 18A to 18E. FIGS. 18A, 18B, 18C, 18D and 18E show the magnetic Kerr loops of each recording layer before it is allowed to stand in air, after it is allowed to stand in air for one week, and after 2, 5 and 30 hours since the start of the accelerated degradation tests under the hot and wet environment of the temperature of 80° C. and the RH of 90%. It is seen from these figures that the magneto-optical properties of the recording layer are significantly lowered after lapse of one week since it is allowed to stand in air and are almost completely lost after two hours since the start of the accelerated test.

Second Embodiment

The present embodiment is concerned with a Co-Pd type magneto-optical recording medium, the recording layer of which is a metal film obtained upon alternately stacking Co and Pd layers in the form of a multi layered structure.

Co and Pd targets, each 100 mm in diameter, were placed in a chamber. A glass substrate was positioned facing to these targets and subjected to a simultaneous binary sputtering while being revolved at a predetermined speed of 6 to 60 rpm in an argon atmosphere maintained at a prescribed gas pressure. A d.c. sputtering with a power of 0.2 to 1 A and 300 V was used for Co and a d.c. sputtering with a power of 0.2 to 1 A and 300 V or a RF sputtering with a power 200 to 500 W was used for Pd. The Co and Pd layers were stacked alternately on the glass substrate to form a recording layer or a prescribed total thickness.

Figure 19:
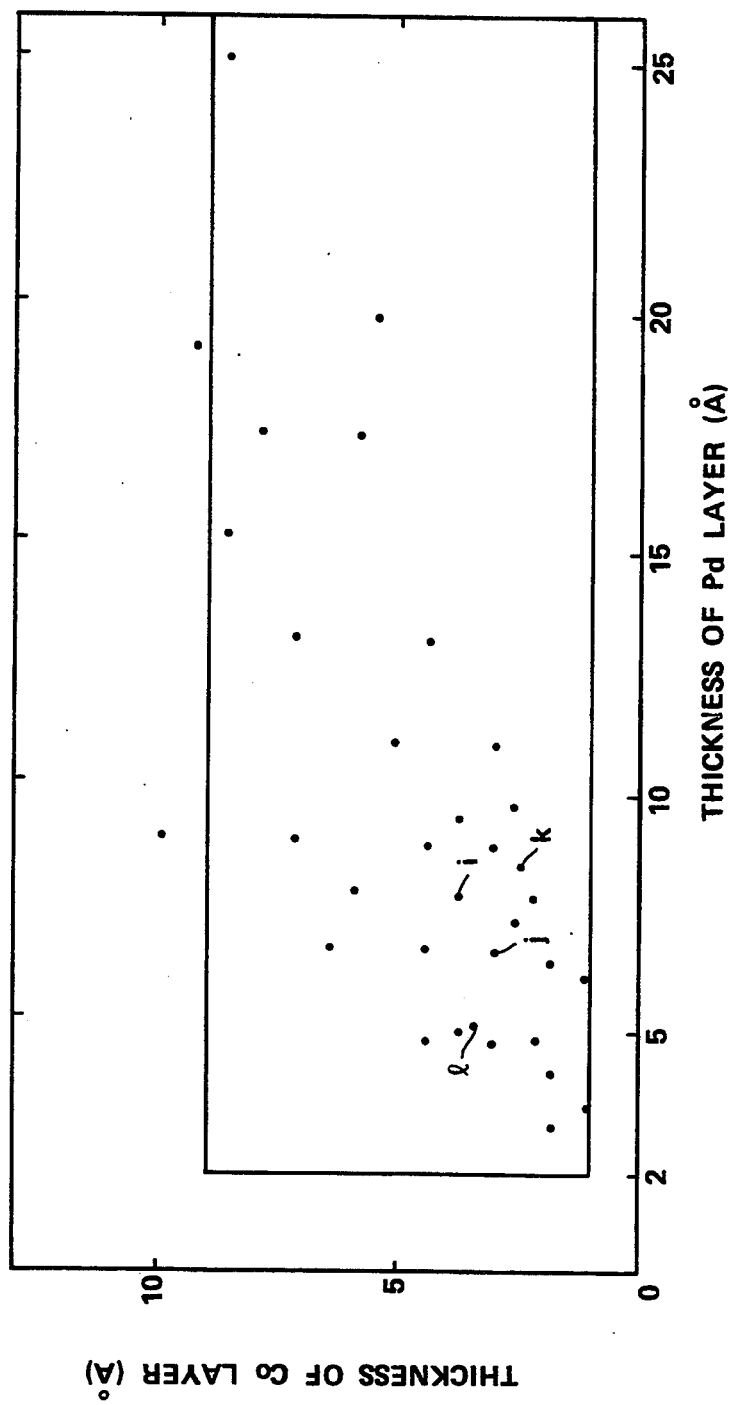
FIG. 19 is a diagram showing the thicknesses of the Co and Pd layers is the Co-Pd type recording layers.

FIG. 19 shows the thicknesses for the Co and Pd layers of each of the actually formed recording layers each having a total thickness of 100 Å. In this figure, the thickness of the Co layer in Å is plotted on the ordinate and that of the Pd layer in Å is plotted on the abscissa. The thickness of 2.5 Å and 2.8 Å correspond to the one atomic layer in Co and Pd, respectively. The dots in the figure represent the thickness of each atomic layer in each recording layer, whereas a frame in thick solid liner indicates the preferable range of thickness for each layer. The small angle X-ray diffraction has revealed that each recording layer has been turned into the multi layered metal film.

Figure 20A:
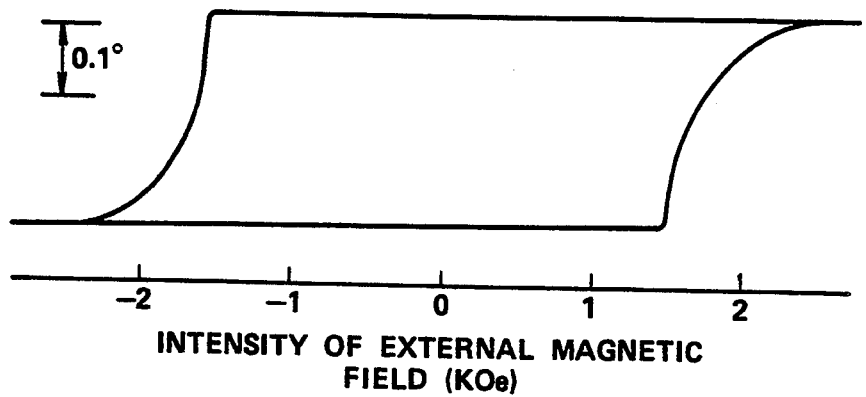
FIGS. 20A and 20B are characteristic curves showing the magnetic Kerr loops of the typical Co-Pd type recording layer.
Figure 20B:
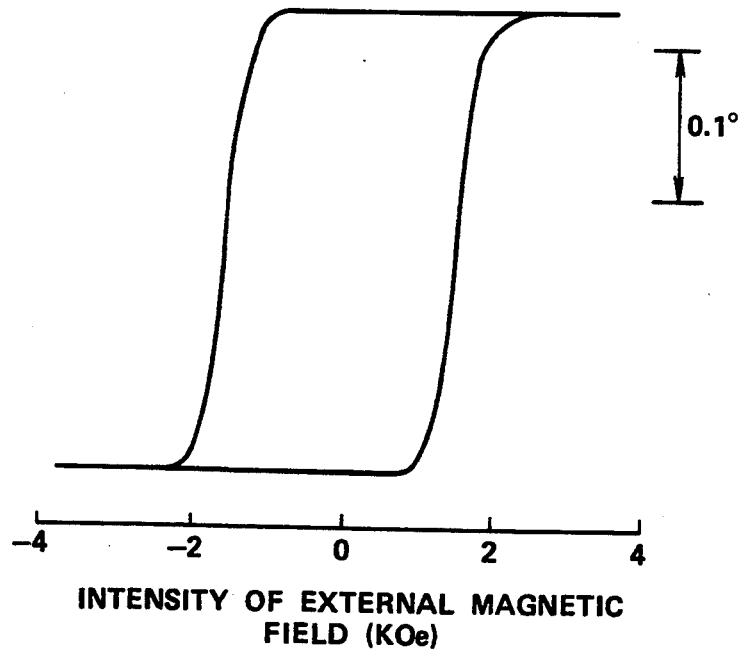

FIGS. 20A and 20B show the measured results, as measured from the side of the recording layer, of the magneto-optical effect for some of the recording layers included within the thick line frame in FIG. 5, using a polar Kerr measurement system at a wavelength of 780 nm. Each of the recording layers is formed to a total thickness of 150 Å at the argon gas pressure of 11 mTorr. FIGS. 20A and 21A show the magnetic Kerr loops of the recording layer associated with a point i (Co=3.8 Å, Pd=7.8 Å) and a point j (Co=3 Å, Pd=6.6 Å), respectively. As may be seen from these figures, the rectangular ratio of each recording layer is equal to unity, meaning that the recording layer has superior magneto-optical properties.

Figure 22:
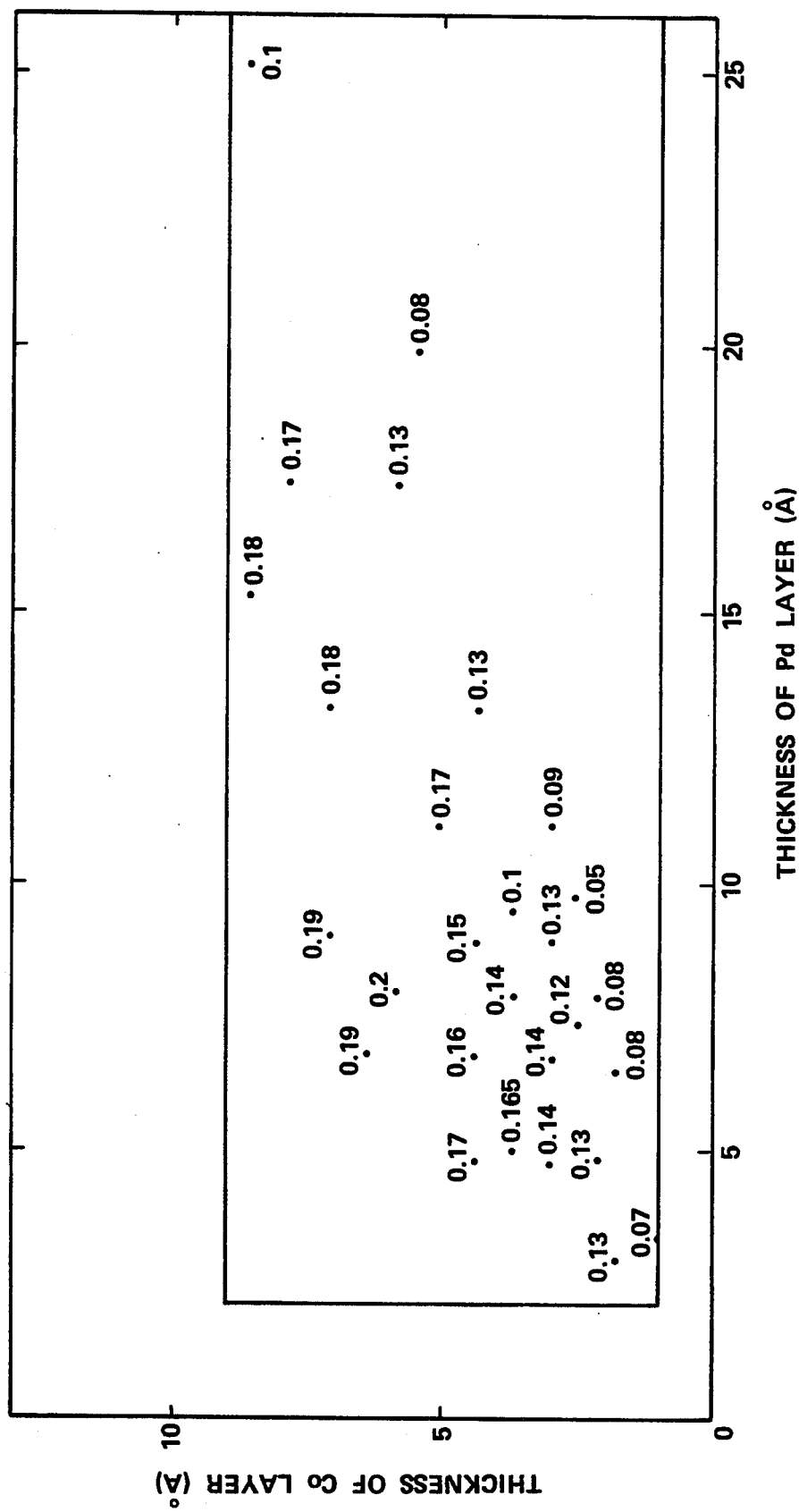
FIG. 22 is a characteristic diagram showing the magnetic Kerr rotation angle of the typical Co-Pd type recording layer.

Similar measurements were conducted on the other recording layers. FIGS. 21 and 22 show the coercive force as found from the magnetic Kerr loop and the magnetic Kerr rotation angle, respectively. It is seen from these figures that the coercive force amounts to several tens to 200 Oe and the magnetic Kerr rotation angle amounts to a larger value of 0.2 degree at the maximum.

Figure 23:
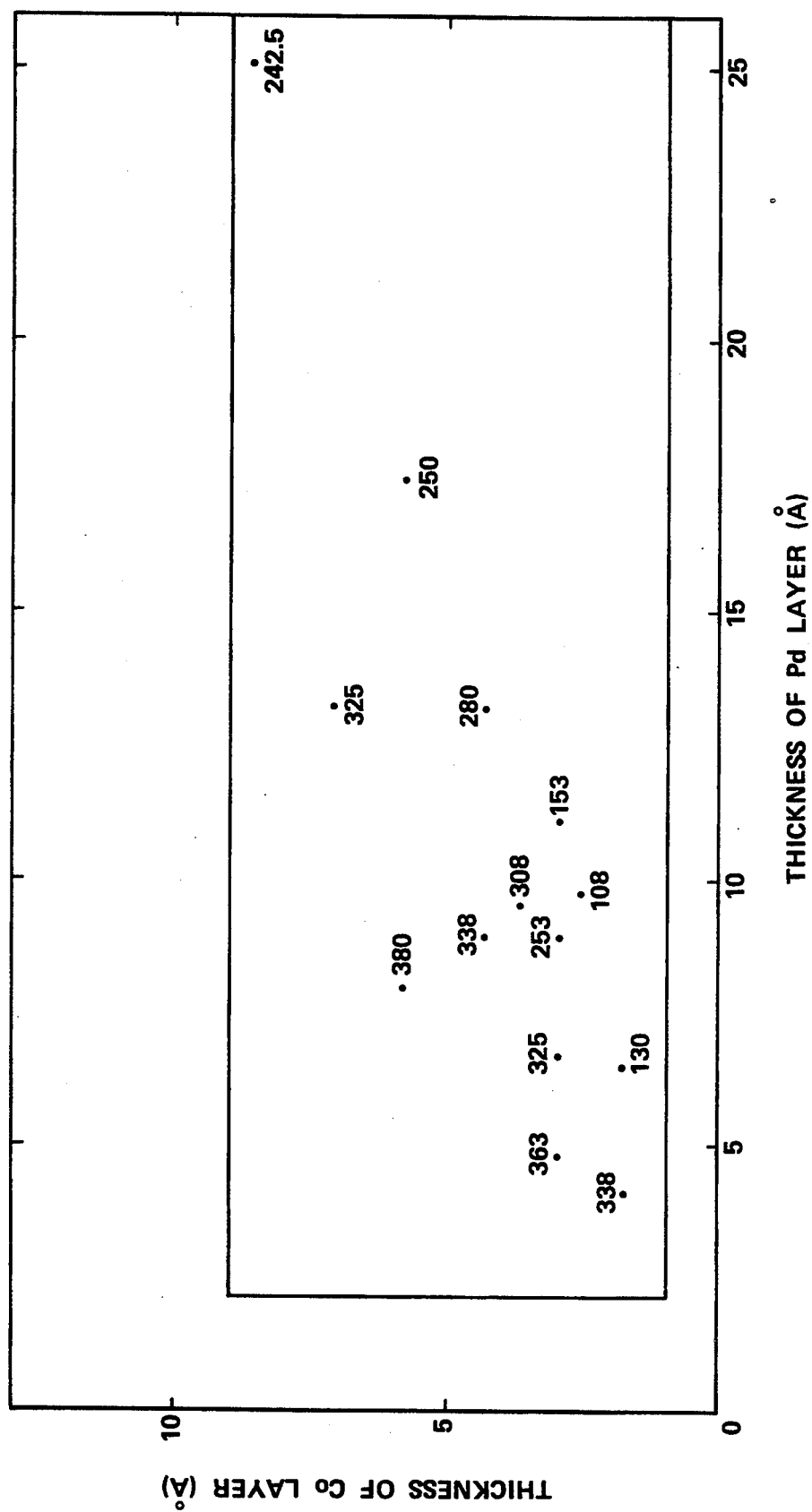
FIG. 23 is a characteristic diagram showing the Curie point of the typical Co-Pd type recording layer.

FIG. 23 shows the measured results of the Curie point of several recording layers. In may be seen that the Curie point was distributed over a range of about 100° to 500° C. and that these recording layers can be used at a practical range of temperatures as the magneto-optical recording medium and can be set as desired in dependence upon the thickness of each atomic layer.

Other species of the elements may be optionally added to change the Curie point.

Figure 24:
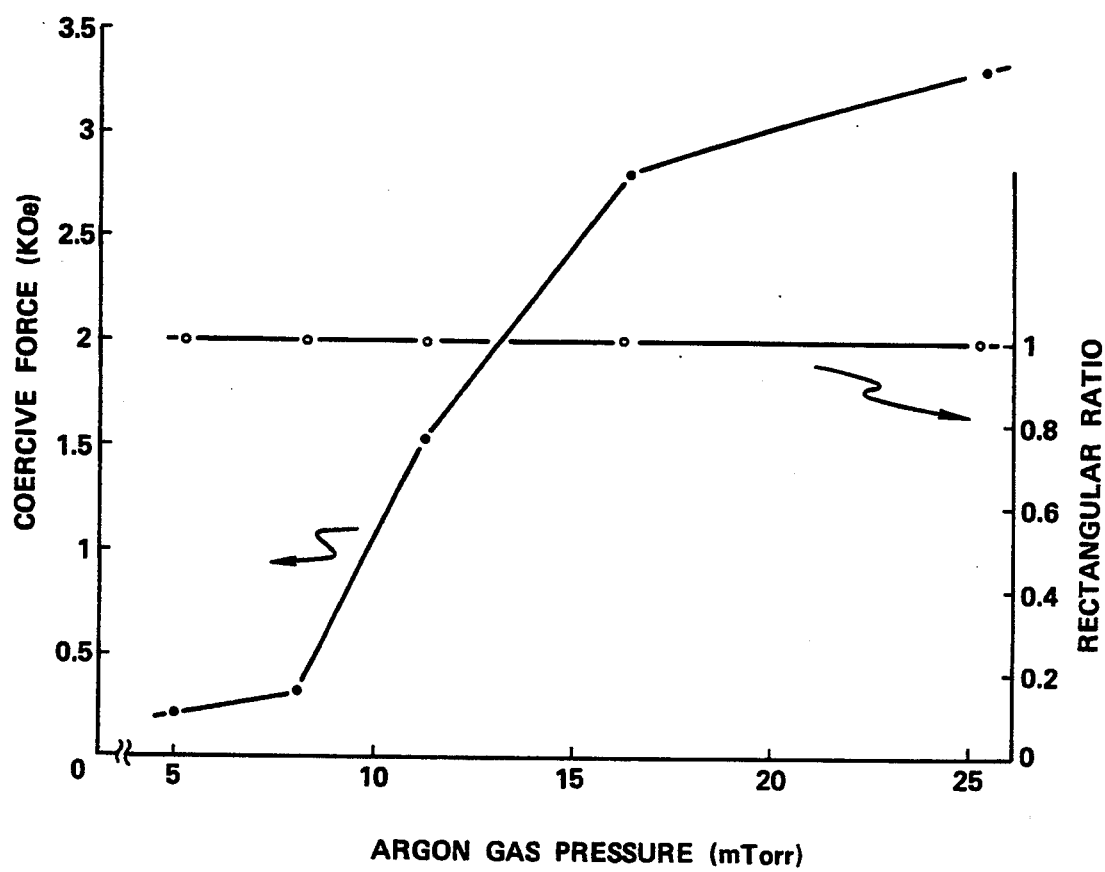
FIG. 24 is a graph showing the argon gas pressure dependency of the coercive force and the rectangular ratio of the recording layer formed by stacking a 3.8 Å Co layer and a 7.8 Å Pd layer.
Figure 25A:
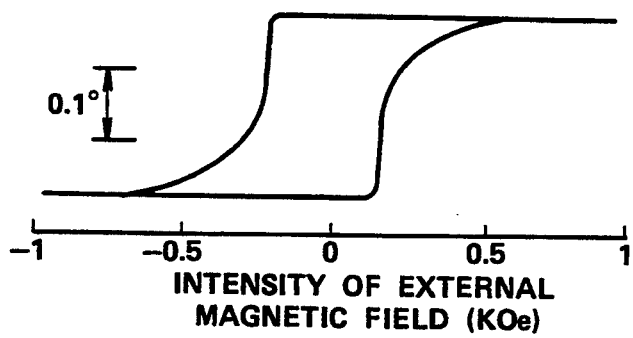
FIGS. 25A to 25C are characteristic curves showing the magnetic Kerr loops of the same recording layer under a typical argon gas pressure.
Figure 25B:
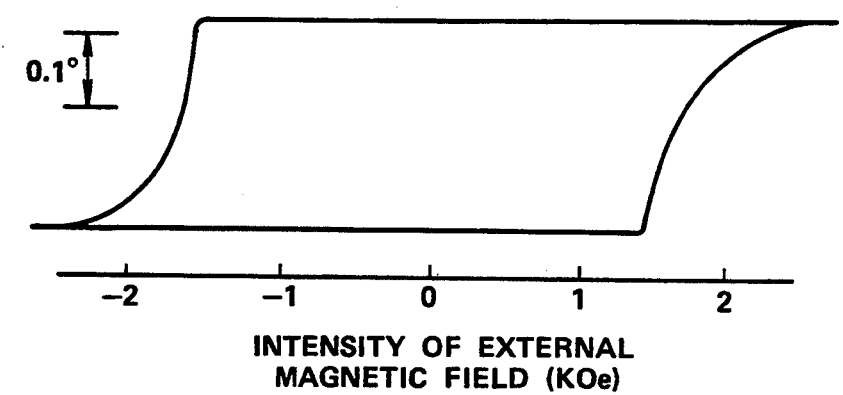
Figure 25C:
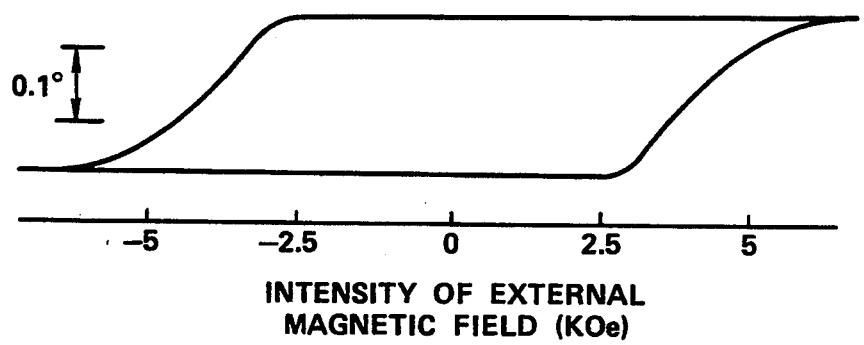

The state of the argon gas pressure dependency of the magneto-optical properties of the recording layer was then investigated. As an example, a number of recording layers, each having a total thickness of 150 Å and having respective atomic layers each having a thickness shown by a point i in FIG. 19 (Co=3.8 Å, Pd=7.8 Å), were produced by sputtering at various different argon gas pressures, and the magneto-optical properties thereof were measured to find the coercive force and the rectangular ratio. FIG. 24 shows the values of these parameters plotted against the argon gas pressure. In the figure, the black and white circle plottings indicate the coercive force and the rectangular ratio, respectively. FIGS. 21A to 21C illustrate magnetic Kerr curve under typical argon gas pressures of 5, 11 and 25 mTorr, respectively. Referring to FIGS. 24 and 25A to 25C, the coercive force is increased with increase in the argon gas pressure while the rectangular ratio is maintained so as to be equal to unity.

Figure 13:
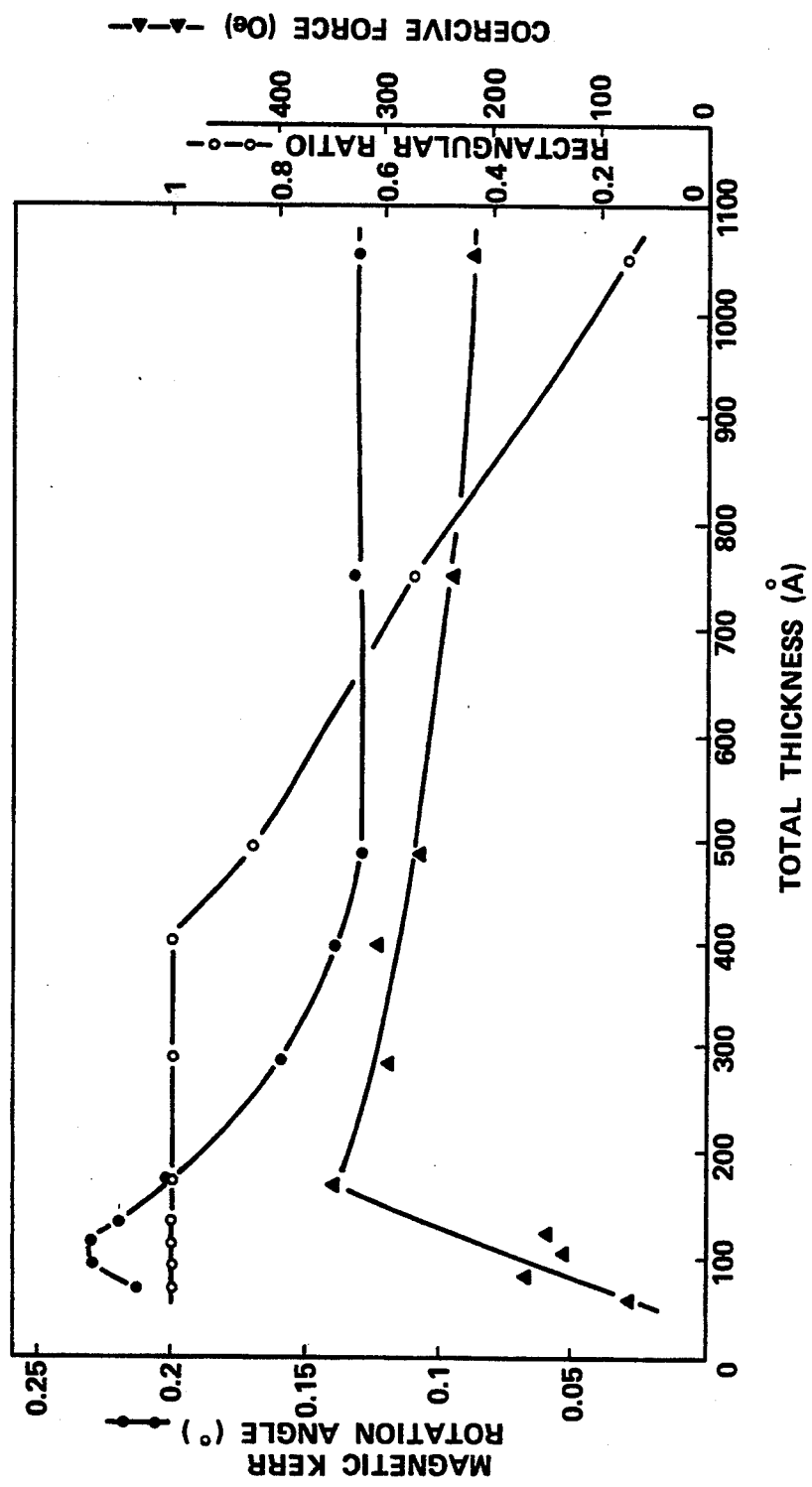
FIG. 13 is a characteristic diagram showing the total thickness dependency of the magnetic Kerr rotation angle, rectangular ratio and the coercivity of the same recording layer.

The total thickness dependency of the magneto-optical properties of the same recording later was then investigated. In consideration of the above test results, the argon gas pressure of 11 mTorr was adopted for sputtering. The results are shown in FIG. 13. In this figure, the magnetic Kerr rotation angle in (°), rectangular ratio or the coercive force in Oe, were plotted on the ordinate and the total thickness in Å was plotted on the abscissa. The black and white circle plottings indicate the magnetic Kerr rotation angle and the rectangular ratio, respectively, while the black triangle plottings indicate the coercive force. In FIG. 13, the rectangular ratio remains satisfactory up to about 400 Å and is gradually decreased beyond 400 Å. Both the coercive force and the magnetic Kerr rotation angle are changed in a manner of presenting local maximum values, so that, in consideration of various characteristics, the optimum total thickness may be said to lie in the vicinity of 150 Å. It is for this reason that the various test data are prepared in the present embodiment for the total thickness of 150 Å.

The total thickness dependency of the magneto-optical properties of another test recording layer was checked from the magnetic Kerr loop. The results are shown in FIGS. 27A and 27B. The test layer has the thickness of each atomic layer thereof represented by a point k (Co=2.5 Å, Pd=8.4 Å) in FIG. 19 and was produced at the argon gas pressure of 11 mtorr. FIGS. 27A and 27B show the cases wherein the total thicknesses of 200 Å and 500 Å, respectively. It is seen from these figures that the recording layer with the total thickness of 200 Å is superior to that with the total thickness of 500 Å.

Third Embodiment

The present embodiment is concerned with a Co-Pt-Pd type magneto-optical recording medium, the recording layer of which is the ternary metal film composed of Co, Pt and Pd.

In the ternary system, several stacking systems different from those for the binary system shown in the first and second embodiments may be adopted. One of such systems is to take advantage of the fact that Pt and Pd form a complete solid solution as shown in FIG. 28 and to stack a Pt-Pd alloy layer and a Co layer One upon the other. For preparing the recording medium by sputtering, for example, a simultaneous binary sputtering may be resorted to with the use of a Pt-Pd alloy target and a Co target. A Pd chip may simply be placed on a Pt target, or conversely, a Pt chip may be placed on a Pd target, in place of using a Pt-Pd alloy target.

Or alternatively, the respective metal layers may be stacked by simultaneous ternary sputtering, with the use of separate targets for the three components.

Figure 57A:
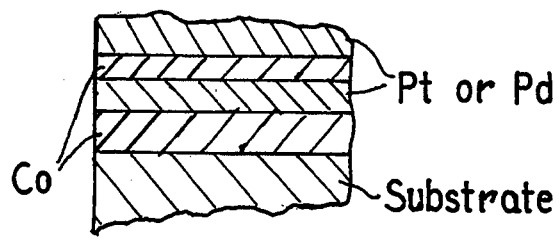
FIGS. 57A–57D are partial cross sectional views of a magneto-optical recording medium according to the present invention with FIG. 57A illustrating a medium comprising a substrate having a stack of first and second layers with each first layer of Co being alternately stacked with a second layer of either Pt or Pd.
Figure 57B:
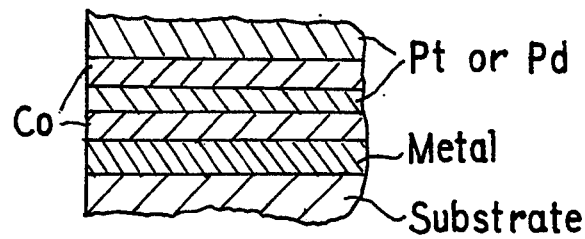
Figure 57C:
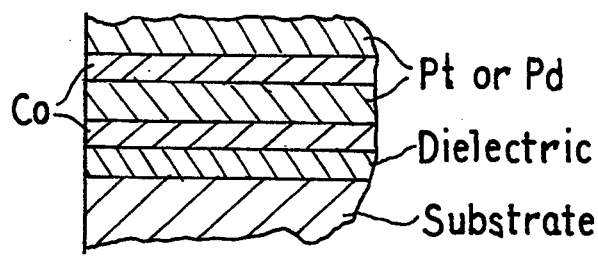
Figure 57D:
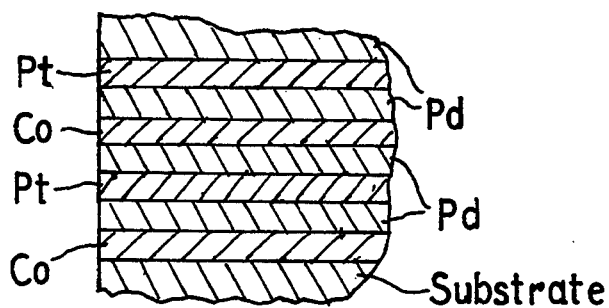

It is not absolutely necessary to use the same stacking layer number of the Pt and Pd layers. For example, a stacked structure (see FIG. 57D) such as Co-Pd-Pt-Pd . . . may be produced by simultaneous quaternary sputtering.

For sputtering, a d.c. sputtering with a power of 0.2 to 1 A and 300 V is employed for Co, whereas a d.c. sputtering with a power of 0.2 to 1 A and 300 V or an RF sputtering with a power of 200 to 500 W is used for the Pt-Pd alloy.

Figure 29B:
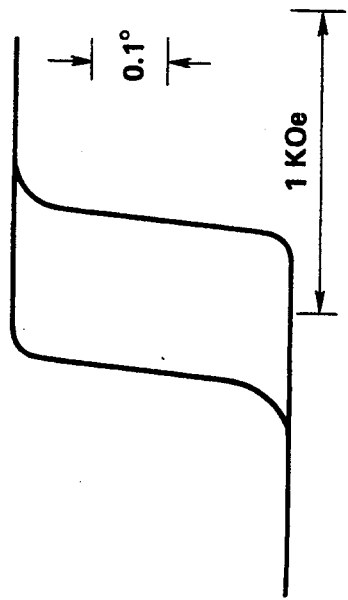
FIGS. 29A to 29C are characteristic diagrams showing magnetic Kerr loops of a typical Co-Pt-Pd type recording layer.
Figure 29A:
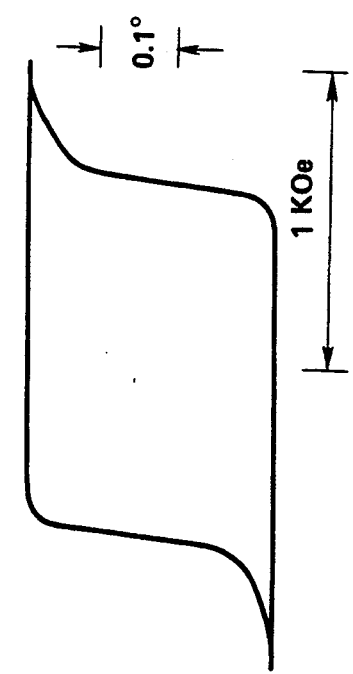
Figure 29C:
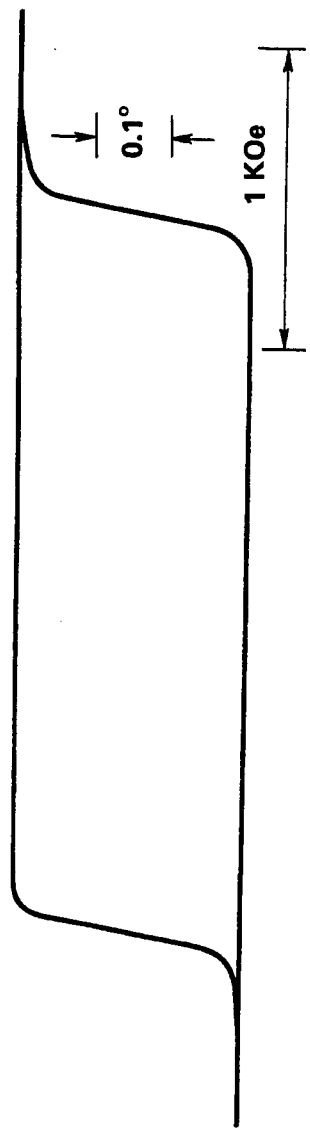

FIGS. 29A to 29C illustrate magnetic Kerr curves of recording layers prepared in the above described manner, that is, a recording layer obtained upon alternately stacking a 2.5 Å thick Co layer and a 7 Å thick Pt-Pd alloy layer by simultaneous binary sputtering to a total thickness of 100 Å, a recording layer obtained upon stacking a 2.5 Å Co layer, a 2.8 Å Pt layer and a 2.8 Å Pd layer by simultaneous ternary sputtering to a total thickness of 100 Å, and a recording layer obtained upon stacking a 2.5 Å Co layer, a 2.8 Å Pd layer, a 2.8 A Pt layer and a 2.8 Å Pd layer in this order by simultaneous quaternary sputtering to a total thickness of 100 Å.

In the Co-Pt type recording layer of the first embodiment, the coercive force is slightly low (about 200 Oe) but the magnetic Kerr rotation angle is larger (about 5°). On the other hand, in the Co-Pd type recording layer of the second embodiment, the coercive force is higher (over about 500 Oe) but the magnetic Kerr rotation angle is smaller (about 0.25 minute). However, as may be seen from FIGS. 29A to 29C, the magneto-optical properties can be significantly controlled by using a ternary system recording layer and changing the stacking system for the respective metal layers.

Fourth Embodiment

The present embodiment is concerned with a magneto-optical recording medium, the recording layer of which is formed by alternately stacking Co and Pt layers by simultaneous binary magnetron sputtering, with the use tentatively of various elements of the base coat or layer.

A target of an element for the base coat material, which is 100 mm in diameter, was placed in a chamber of a magnetron sputtering device, along with Co and Pt targets. A water-cooled glass substrate was placed on a rotary base plate for facing to these targets.

The water-cooled glass substrate was then placed facing to the target of the element of the under layer material for forming the metal under layer. The elements Cu, Rh, Pd, Ag, W, Ir, Pt and Au were employed. Besides these elements, studies were conducted on using the elements Ti, Al, Si, V, Cr, Mn, Ge, Y, Zr, Nb, Mn, Ge, Y, Zr, Nb, Mo, Sb, Gd and Ta.

A recording layer was then formed on the metal under layer by a simultaneous binary magnetron sputtering in the argon gas atmosphere at a gas pressure of 5 mTorr. The above described system makes it possible to determine the period of the multi layered as desired by changing the rotation speed of the rotary base plate mounting the water-cooled base plate or the power applied to each target. In the present embodiment, a d.c.

sputtering with a power of 0.40 A and 300 V and a RF sputtering with a power of 400 W were used for Co and Pt, respectively, and the rotation speed of the base was set to 16 r.p.m., to produce a Co-Pt type recording layer having a total thickness of 100 Å and the thickness for each atomic layer thereof represented by a point h (Co=4.3 Å, Pt=5.6 Å) in FIG. 5, to prepare a number of samples of the magneto-optical recording medium. The period of the produced metal thin film was found from the peak angle of the X-ray small angle scattering.

For comparison, a sample devoid of the metal under layer, that is, a sample in which the recording layer was directly formed on the glass substrate, was also prepared.

The coercive force of the samples having various base coats thus prepared is shown in Table 1. Bars entered in the column of the coercive force in the table indicate that the sample shows no properties of perpendicular magnetization.

TABLE 1

| Base Coat Elements | Coercive Force (Oe) | Base Coat Elements | Coercive Force (Oe) |
| --- | --- | --- | --- |
| Pd | 440 | Ge | 113 |
| Ag | 450 | Y | 69 |
| W | 419 | Zr | 105 |
| Pt | 453 | Nb | 70 |
| Ti | 150 | Mo | 108 |
| Al | 100 | Sb | 98 |
| Si | — | Gd | 156 |
| V | — | Ta | 110 |
| Cr | — | none | 125 |
| Mn | — | | |

It is seen from the above Table 1 that the sample devoid of the metal under layer has a coercive force of 125 Oe. The elements capable of increasing the coercive force beyond this value when used as the metal under layer include Pd, Ag, W, Pt, Ti and Gd, of which Ti and Gd show only poor results. Besides the elements shown in the table, Cu, Rh, Ir and Au are capable of increasing the coercive force. Above all, Pd, Ag, W, Pt and Au are most preferred in this respect.

Figure 30:
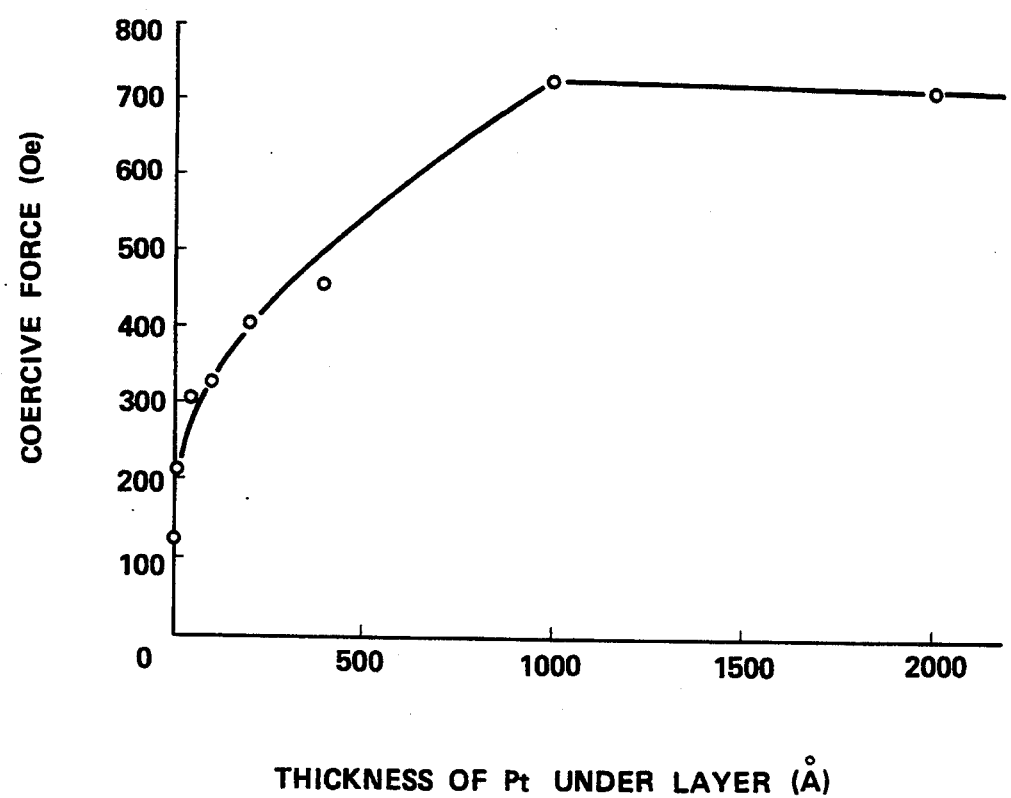
FIG. 30 is a characteristic diagram showing the relation between the coercive force and the thickness of the Pt under layer in the magneto-optical recording medium having a Co-Pt type multi layered metal film as the recording layer.

For the element Pt, capable of increasing the coercive force most pronouncedly, the relation between the coercive force and the under layer thickness was checked. The results are shown in FIG. 30, wherein the coercive force in Oe and the under layer thickness in Å are plotted on the ordinate and the abscissa, respectively. It is seen from this figure that the coercive force is increased by a factor of about two (210 Oe) with a small under layer thickness of 10 Å and by a factor of about seven (725 Oe) with the under layer thickness of 1000 Å.

The magnetic Kerr loops of typical ones of samples having the metal under layers of various thicknesses are shown in FIGS. 31A to 31C. FIGS. 31A, 31B and 31C show the properties of a sample having no under layer, a sample having a 50 Å thick Pt under layer and a sample having a 200 Å Pt under layer, respectively. The ordinate and the abscissa in the figure denote the magnetic Kerr rotation angle in $\theta_k$ (°) by a relative scale and the intensity of the external magnetic field in kOe, respectively. As may be seen from these figures, not only the coercive force but the rectangular ratio is improved by the provision of the under layer.

Fifth Embodiment

The present embodiment is concerned with a magneto-optical recording medium, the recording layer of which is a thin metal film obtained by alternately stacking Co and Pd layers by simultaneous binary sputtering, wherein studies are made of various element to be used as the under layer material.

A target of an element fox the metal under layer material, which is 100 mm in diameter, was placed in a chamber of a magnetron sputtering device, along with Co and Pd targets. A water-cooled glass substrate was placed on a rotating base plate for facing to these targets.

Then, in accordance with the procedure depicted in the fourth embodiment, a 400 Å thick metal under layer was formed on the water-cooled glass substrate. The elements same as those of the fourth embodiment were used.

The simultaneous binary magnetron sputtering was then performed in an argon atmosphere of a gas pressure equal to 11 mTorr to form a recording layer on the metal under layer. In the present embodiment, a d.c. sputtering with a power of 0.35 A and 300 V and a RF sputering with a power of 350 W were used for Co and Pd, respectively, and the rotation speed of the base was set to 16 r.p.m., to produce a Co-Pd type recording layer having a total thickness of 100 Å and the thickness for each atomic layer thereof represented by a point 1 (Co=3.5 Å, Pd=5 Å) in FIG. 19, for preparing a number of samples of the magneto-optical recording medium.

For comparison, a sample devoid of the metal under layer, that is, a sample in which the recording layer was directly formed on the glass substrate, was also prepared.

The coercive force of the samples having various under layers thus prepared is shown in Table 2.

TABLE 2

| Base Coat Elements | Coercive Force (Oe) | Base Coat Elements | Coercive Force (Oe) |
| --- | --- | --- | --- |
| Pd | 3750 | Ge | 88 |
| Ag | 3675 | Y | 200 |
| W | 538 | Zr | 212 |
| Pt | 3000 | Nb | 300 |
| Ti | 400 | Mo | 250 |
| Al | 345 | Sb | 120 |
| Si | 450 | Gd | 350 |
| V | 400 | Ta | 250 |
| Cr | 300 | none | 825 |
| Mn | 200 | | |

It is seen from the above Table 2 that the sample devoid of the metal under layer has a coercive force of 825 Oe. The elements capable of increasing the coercive force beyond this value when used as the under layer include Pd, Ag and Pt. Besides the elements shown in the table, Cu, Rh, Ir and Au are capable of increasing the coercive force. Above all, Pd, Ag, Pt and Au are most preferred, in this respect.

Figure 32:
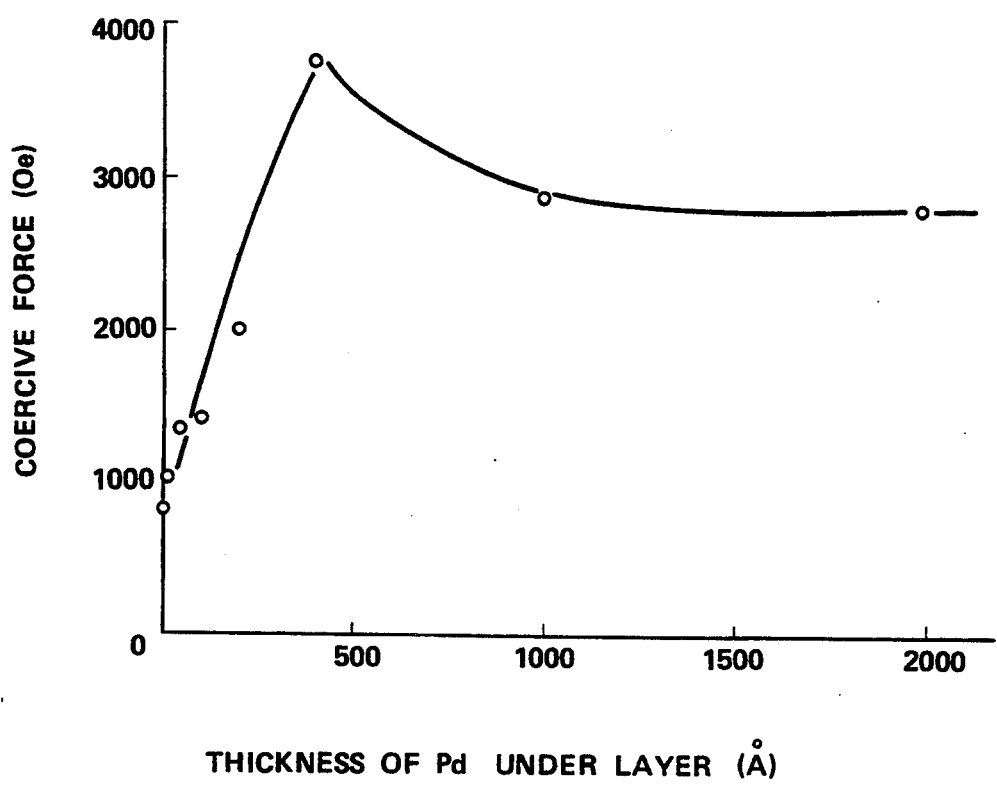
FIG. 32 is a characteristic diagram showing the relation between the coercive force and the thickness of the Pd under layer in a magneto-optical recording medium having the Co-Pd type multi layered metal film as the recording layer.

For the element Pd, capable of increasing the coercive force most pronouncedly, the relation between the coercive force and the under layer thickness was checked. The results are shown in FIG. 32, wherein the ordinate and the abscissa denote the coercive force in Oe and the under layer thickness in Å, respectively. As may be seen from this figure, the coercive force starts to be increased at a small thickness of 10 Å, reaching a value of 3750 Oe which is about four times at 400 Å.

Figure 33A:
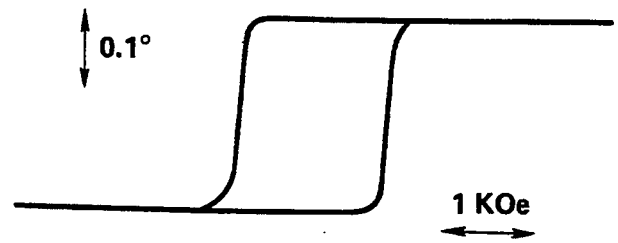
FIGS. 33A to 33C show magnetic Kerr loops showing the relation between the magneto-optical characteristics and the thickness of the Pd under layer in a magneto-optical recording medium having a Co-Pd type multi layered metal film as the recording layer.
Figure 33B:
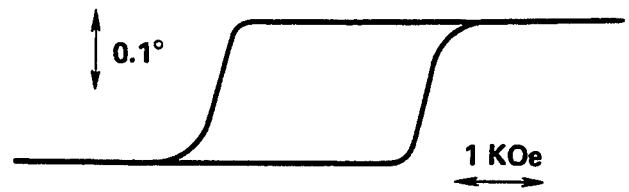
Figure 33C:
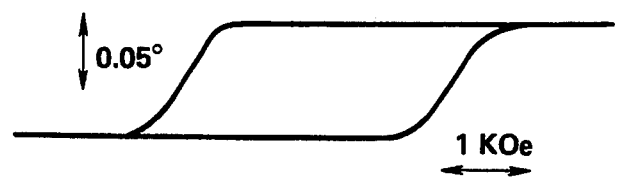

The magnetic Kerr loops of the typical samples having the metal under layer of various thicknesses are shown in FIGS. 33A to 33C. FIGS. 33A, 33B and 33C show the properties of a sample having no under layer, a sample having a 50 Å thick Pd under layer and a sample having a 200 Å Pd under layer, respectively. The ordinate and the abscissa in the figure denote the magnetic Kerr rotation angle in $\theta_k(°)$ by a relative scale and the intensity of the external magnetic field in kOe, respectively. As may be seen from these figures, the coercive force may be improved by providing the metal under layer.

Sixth Embodiment

The present embodiment is concerned with a magneto-optical recording medium in which a Co-Pt type multi layered film is formed on the glass substrate with the interposition of a $Si_3N_4$ dielectric under layer.

A sintered $Si_3N_4$ target, 100 mm in diameter, was placed in a chamber, and a glass substrate was placed on a base fitted with a water-cooling device and provided facing to the target. The reactional sputtering was then performed in an argon gas atmosphere containing 1% nitrogen gas at a gas pressure of 2.5 mTorr for depositing $Si_3N_4$ under layers to various thicknesses.

Then, Co and Pt targets, each 100 mm diameter, were placed in the same chamber. The glass substrate, with the $Si_3N_4$ under layer formed thereon, was placed on a rotary base plate fitted with a water-cooling unit and provided facing to these targets, in order to carry out a simultaneous binary magnetron sputtering in an argon gas environment maintained at a gas pressure of 5 mTorr. A d.c. sputtering with a making power of 0.40 A and 300 W and a RF sputtering with a making power of 360 W were used for Co and Pt, respectively, and the rotation speed of the base was set to 16 r.p.m. to form a Co-Pt type multi layered film having a total thickness of 100 Å.

The period of the produced multi layered film was found from the peak angle in the X-ray small angle scattering.

Figure 34A:
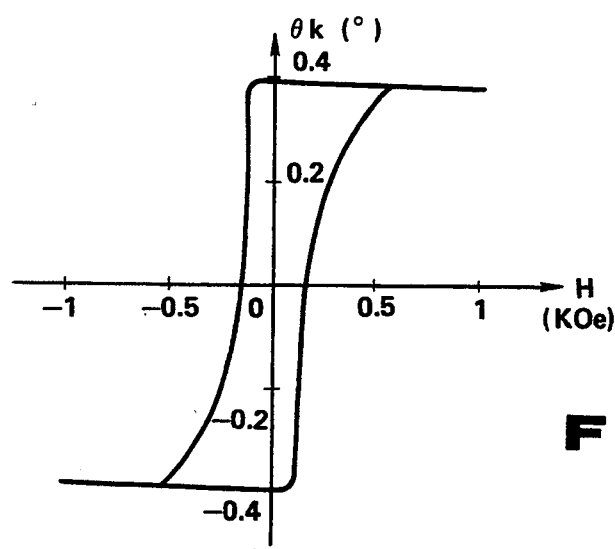
FIGS. 34A to 34C show magnetic Kerr loops showing the magneto-optical characteristics of the magneto-optical recording medium having a Co-Pt type multi layered film is formed on a glass substrate with the interposition of $Si_3N_4$ under layers of variable thicknesses.
Figure 34B:
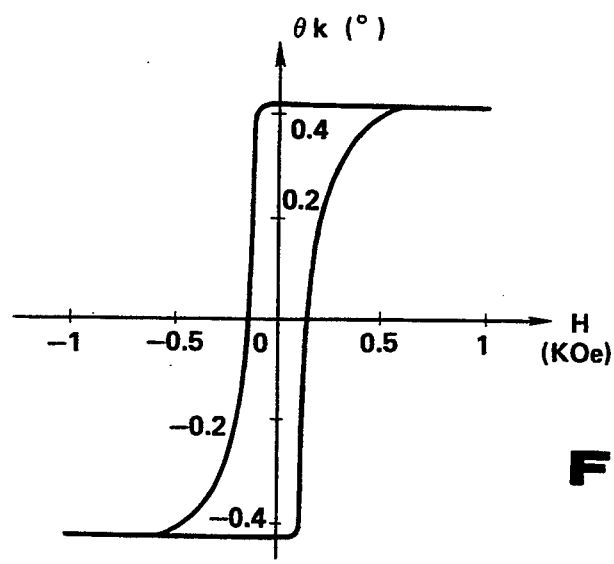
Figure 34C:
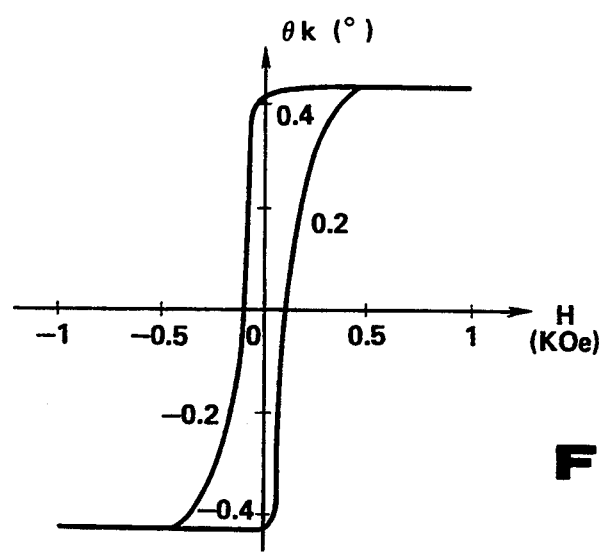

The magneto-optical properteis at 780 mm of the so-produced magneto-optical recording medium samples were measured from the side of the glass substrate by a Kerr loop measurement system. The results are shown in FIGS. 34A and 34B for the $Si_3N_4$ under layer thicknesses of 550 Å and 1750 Å, respectively. The magneto-optical properties of an magneto-optical recording medium, prepared in the similar manner but without using the dielectric under layer, is shown for comparison in FIG. 34C. In these figures, the ordinate and the abscissa denote the magnetic Kerr rotation angle $\theta_k$ in (°) and the intensity of the external magnetic field in kOe, respectively. It is apparent from comparison of these figures that both the coercive force and the rectangular ratio are improved when the recording medium is provided with the $Si_3N_4$ under layer than when the recording medium is not provided with the under layer.

For more detailed inspection of the effect of the thickness of the $Si_3N_4$ under layer on the magneto-optical properties, reference is had to FIG. 35, wherein changes in the coercive force and the magnetic Kerr rotation angle caused by the thickness of the $Si_3N_4$ under layer are illustrated. In the figure, the ordinate and the abscissa indicate the coercive force in Oe and the under layer thickness in Å, respectively, whereas black and white circle plottings denote the coercive force and the magnetic Kerr rotation angle, respectively. It is seen from this figure that the coercive force becomes locally maximum at the under layer thickness of 550 Å corresponding to the case shown in FIG. 34A, and that the magnetic Kerr rotation angle is changed periodically with respect to the $Si_3N_4$ under layer thickness and a difference of the order of 25% exists between the minimum and the maximum values within the measured range, thus indicating that the magnetic Kerr rotation angle may be increased by optimizing the base coat thickness.

Seventh Embodiment

The present embodiment is concerned with a magneto-optical recording medium similarly including a $Si_3N_4$ under layer and a Co-Pt type multi layered film, with the aforementioned glass substrate being replaced by a polycarbonate substrate.

The magneto-optical recording medium was prepared in the following manner. By a reactional sputtering in an argon gas atmosphere containing a 1% nitrogen gas, maintained at a gas pressure of 2.5 mTorr, a 700 Å thick $Si_3N_4$ under layer was deposited on the polycarbonate substrate. Then, in an argon gas atmosphere of a gas pressure of 5 mTorr, a Co layer was formed on the substrate by d.c. sputtering with a power of 0.3 A and 300 W, and a Pt layer was then formed thereon by RF sputtering with a power of 300 W, to form a Co-Pt type multi layered film having a total thickness of 100 Å, to produce the magneto-optical recording medium. For comparison, the magneto-optical recording medium devoid of the $Si_3N_4$ under layer was similarly prepared.

FIGS. 36A and 36B show magnetic Kerr loops when the magneto-optical properties of these samples of the magneto-optical recording medium are measured from the substrate side. In FIGS. 36A and 36B, the recording medium is provided and not provided with the $Si_3N_4$ under layer, respectively. It is seen from these figures that the perpendicular magnetic properties are not exhibited when the under layer is not formed on the polycarbonate substrate, and that these properties are exhibited only when the under layer is formed on the substrate.

Figure 37:
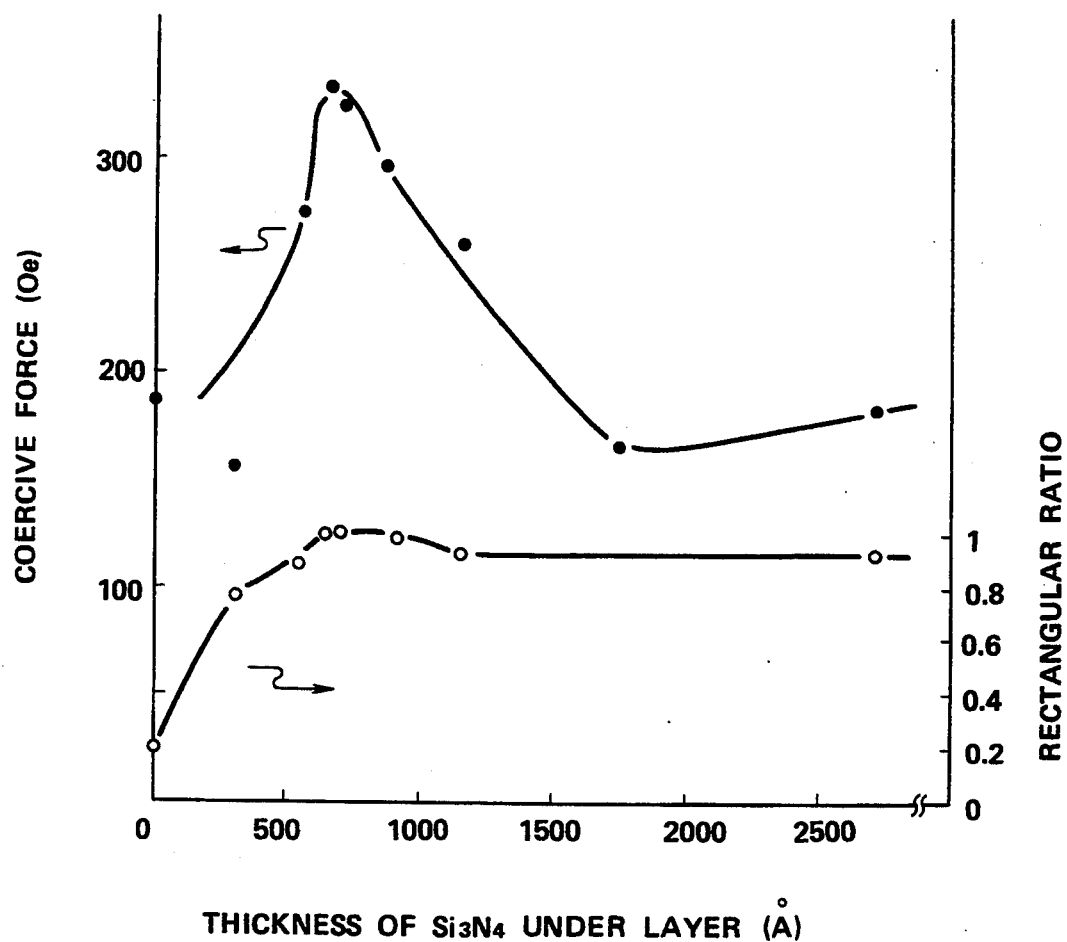
FIG. 37 is a characteristic diagram showing changes in the coercive force and the rectangular ratio with the thickness of the $Si_3N_4$ under layer in the same magneto-optical recording medium.

FIG. 37 shows changes in the coercive force and magnetic Kerr rotation angle caused with the $Si_3N_4$ under layer thickness. In this figure, the ordinate and the abscissa denote the coercive force in Oe or rectangular ratio and the $Si_3N_4$ under layer thickness in A, whereas the black and white circle plottings denote the coercive force and the rectangular ratio, respectively. It is seen from this figure that the coercive force becomes locally maximum in the vicinity of the under layer thickness of 700 Å in correspondence with the case shown in FIG. 36A, and that the rectangular ratio may assume a substantially complete value for the similar under layer thickness region, and a desirable value close to unity for a under layer thickness region larger than 700 Å.

Figure 38:
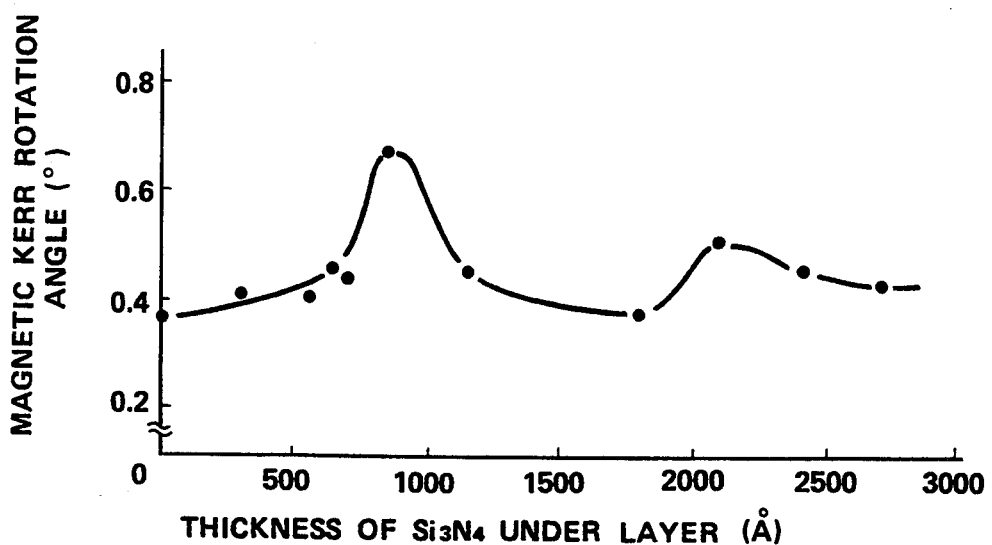
FIG. 38 is a characteristic diagram showing changes in the magnetic Kerr rotation angle with the thickness of the $Si_3N_4$ under layer in the same magneto-optical recording medium.
Figure 39A:
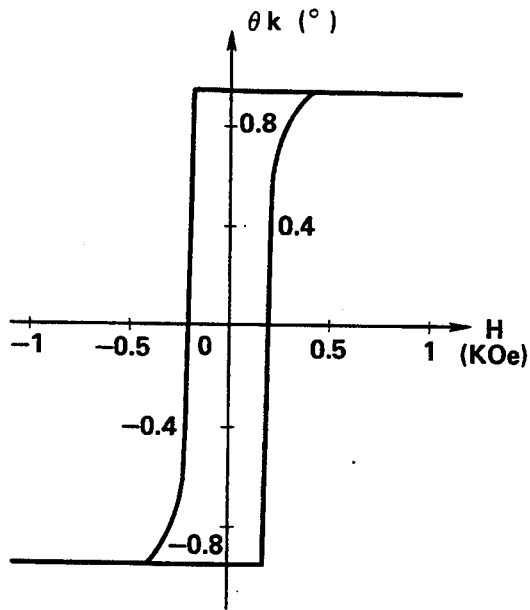
Figure 39B:
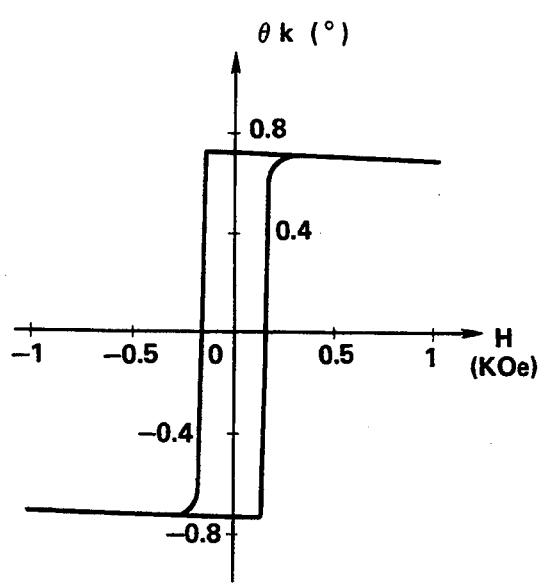
Figure 39C:
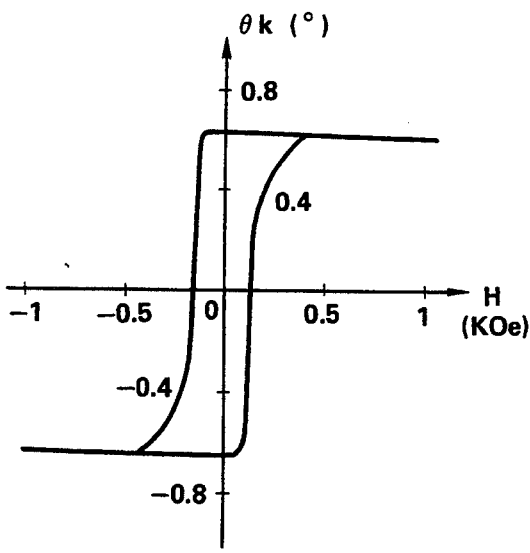
Figure 39D:
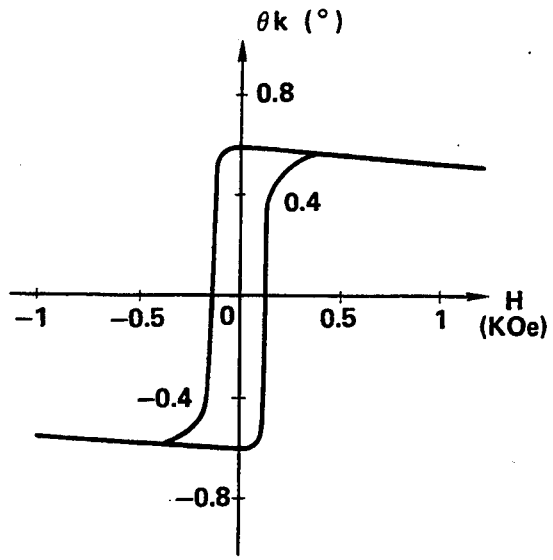

FIG. 38 shows changes in the magnetic Kerr rotation angle caused by the $Si_3N_4$ under layer thickness. In this figure, the ordinate and the abscissa denote the magnetic Kerr rotation angle in (°) and the thickness of the $Si_3N_4$ under layer in Å, respectively. Periodic changes in the magnetic Kerr rotation angle with respect to the under layer thickness may be observed herein as in the case shown in FIG. 35.

Eight Embodiment

The above described sixth and seventh embodiments are concerned with the magneto-optical recording medium having the $Si_3N_4$ under layer. The present embodiment is concerned with a magneto-optical recoding medium wherein a Co-Pt type multi layered film is formed on a glass substrate with the interposition of a dielectric under layer formed of nitride dielectric materials.

The nitride dielectric materials employed in the present embodiment are ZrN, BN, AlN and TiN. The magneto-optical recording medium employing these materials were prepared in the following manner. By a reactional sputtering in an argon gas atmosphere containing a 1% nitrogen gas, at a gas pressure of 2.5 mTorr, a ZrN, BN or an AlN under layer was deposited on each of the glass substrates to various thicknesses. Then a Co layer was formed on the substrates by d.c. sputtering with a making power of 0.35 A and 300 V in a 5 mTorr argon gas atmosphere, and then a Pt layer was formed on each of the substrates by RF sputtering with a making power of 380 W, to form a Co-Pt type multi layered film with a total thickness of 100 Å, to produce the magneto-optical recording medium. For comparison, the magneto-optical recording medium devoid of the dielectric under layer was similarly produced.

The magnetic Kerr loops, when the magneto-optical properties of these magneto-optical recording medium samples were measured from the substrate side, are shown in FIGS. 39A, 39B, 39C and 39D for the cases in which a 480 Å ZrN under layer, a 400 Å BN under layer and a 700 Å AlN under layer are provided, and no under layer is provided, respectively. The coercive force and the magnetic Kerr rotation angle, when the under layer is not provided, amount to 112 Oe and 0.61°, respectively. The coercive force, rectangular ratio and the magnetic Kerr rotation angle are improved by providing the under layer, above all, by providing the ZrN under layer.

Figure 40:
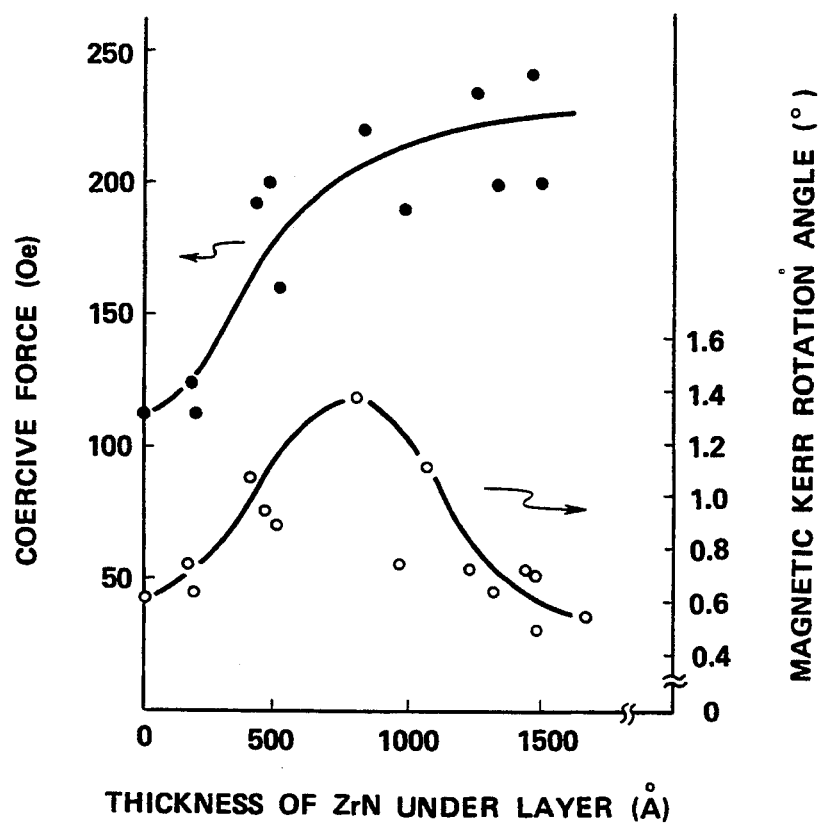
FIG. 40 is a characteristic curve showing changes in the coercive force and the magnetic Kerr rotation angle with the thicknesses of a ZrN under layer in a magneto-optical recording medium having the ZrN under layer.
Figure 41:
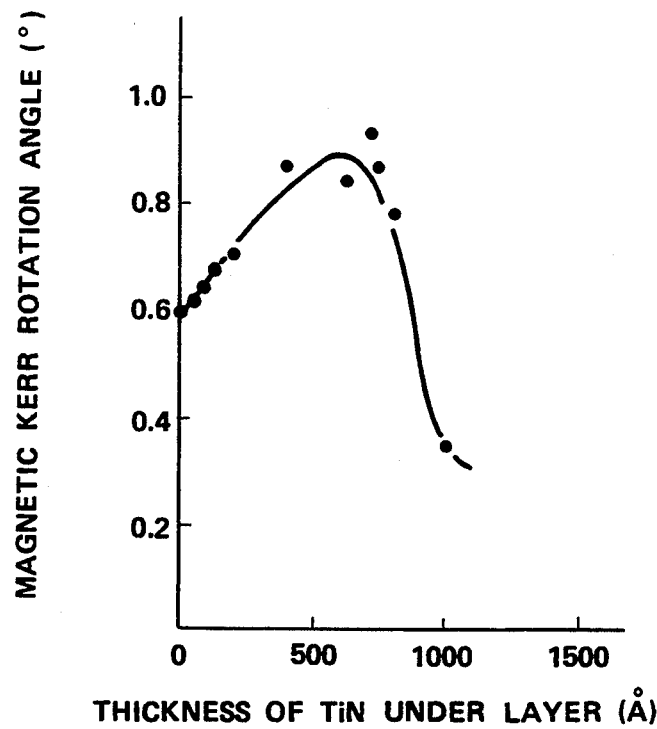
FIG. 41 is a characteristic diagram showing changes in the coercive force with the thickness of the TiN under layer in the magneto-optical recording medium having the TiN under layer in place of the ZrN under layer.

For the case in which ZrN is used as the dielectric under layer, changes in the coercive force and the magnetic Kerr rotation angle caused by the under layer thickness were investigated. The results are shown in FIG. 40, wherein the ordinate and the abscissa denote the coercive force in Oe or the magnetic Kerr rotation angle in (°) and the ZrN under layer thickness in Å, respectively, whereas the black circle and white circle plottings denote the coercive force and the magnetic Kerr rotation angle, respectively. It is seen from this figure that the coercive force is increased with increase in the under layer thickness and tends to be saturated in the vicinity of 1000 Å whereas the magnetic Kerr rotation angle becomes locally maximum in the vicinity of the under layer thickness of 800 Å. The tendency for the magnetic Kerr rotation angle to become locally maximum in the vicinity of the under layer thickness of 800 Å was observed when employing a TiN under layer under otherwise the same conditions, as shown in FIG. 41.

Ninth embodiment

In the above described sixth to eighth embodiments, the Co-Pt multi layered films are unexceptionally employed as the recording layer. The present Embodiment is concerned with a magneto-optical recording medium in which a Co-Pd type multi layered film is formed on the glass substrate with the interposition of a ZnN under layer.

This magneto-optical recording medium was prepared in the following manner. In accordance with the procedure depicted in the eighth embodiment, ZrN under layers were formed to various thicknesses on the glass substrates. Then, Co and Pd layers were alternately stacked on the glass substrate by d.c. sputtering with a power of 0.35 A and 300 V for Co and an RF sputtering with a power of 380 W for Pd, under an argon atmosphere maintained at the gas pressure of 11 mTorr, so as to form a Co-Pd type multi layered film to a total thickness of 100 Å to produce a magneto-optical recording medium. For comparison, a magneto-optical recording medium devoid of the ZrN under layer was also produced.

Figure 42A:
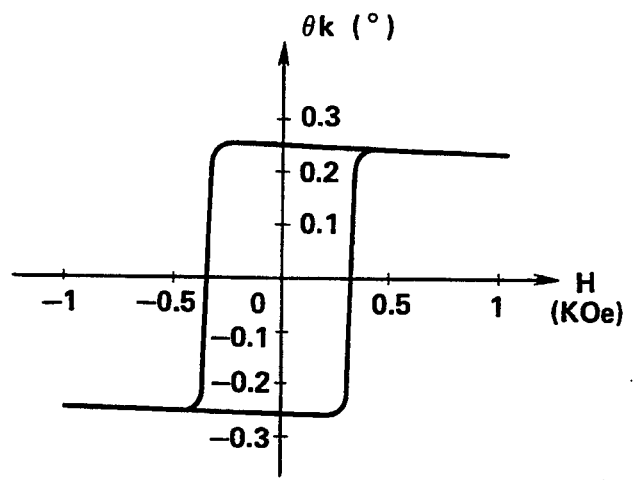
FIGS. 42A and 42B show magnetic Kerr loops showing changes in magneto-optical properties caused by the presence or absence of the ZrN under layer in the magneto-optical recording medium having a Co-Pd type multi layered film on a glass substrate.
Figure 42B:
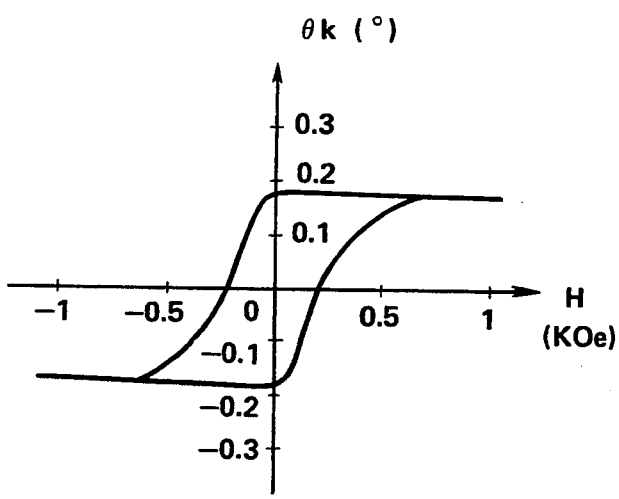

The magnetic Kerr loops when the magneto-optical properties of these magneto-optical recording media are measured from the substrate side, are shown in FIGS. 42A and 42B for the cases in which a 200 Å thick ZrN under layer is provided and in which a ZrN under layer is not provided, respectively. It is seen from comparison of these figures that the coercive force and the magnetic Kerr rotation angle are 225 Oe and 0.17°, respectively, i when the ZrN under layer is not provided, whereas both the coercive force and the magnetic Kerr rotation angle as well as the rectangular ratio are improved by providing the ZrN under layer.

Figure 43:
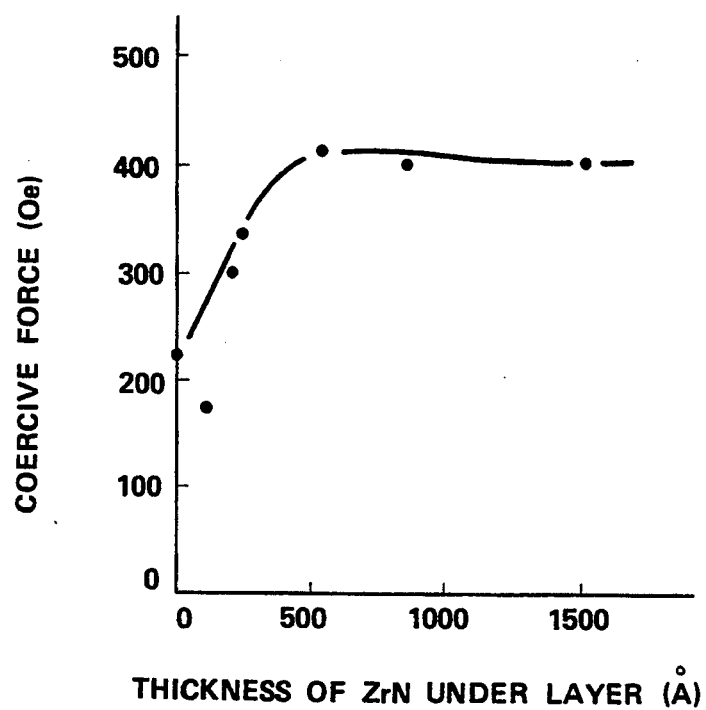
FIG. 43 is a characteristic diagram showing changes in coercive force caused with the thickness of the ZrN under layer in the same magneto-optical recording medium.

FIG. 43 shows changes in the coercive force with ZrN under layer thicknesses. As may be seen from this figure, the coercive force reaches a saturation in the vicinity of the base coat thickness of 500 Å and the saturation value is about twice the value for the case of not providing the ZrN base coat.

Figure 44:
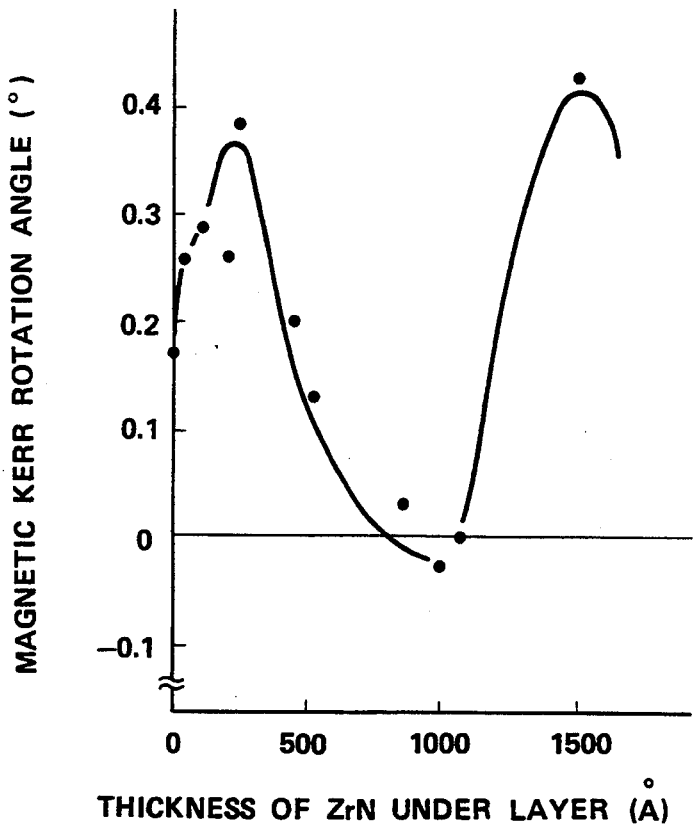
FIG. 44 is a characteristic diagram showing changes in the magnetic Kerr rotation angle caused with the thickness of the ZrN under layer in the same magneto-optical recording medium.

FIG. 44 shows changes in the magnetic Kerr rotation angle with the ZrN under layer thicknesses. It is seen from this figure that the magnetic Kerr rotation angle is periodically changed with respect to the ZrN under layer thickness with the enhancement effect being more than twice at the peak value that attained when not providing the ZrN under layer. However, an optimum under layer thickness need be investigated for practical applications, since the magnetic Kerr rotation angle may assume a negative value after zero crossing so far as a certain under layer region (so-called inversion phenomenon of the magnetic Kerr loops) is concerned.

Figure 45:
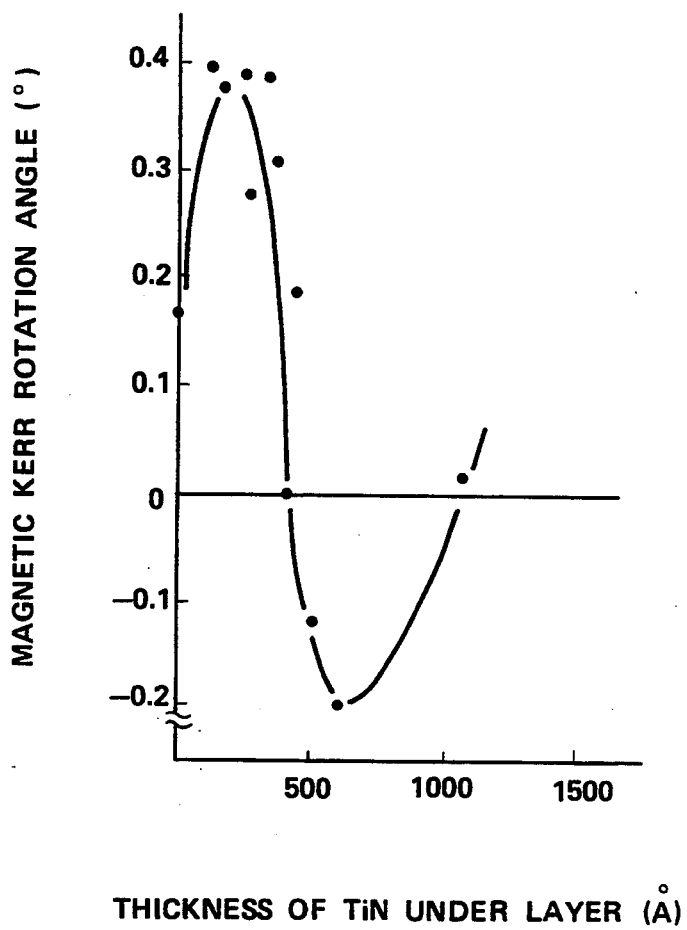
FIG. 45 is a characteristic diagram showing changes in the magnetic Kerr rotation angle caused with the thickness of the TiN under layer in the above magneto-optical recording medium having the TiN under layer in place of the ZrN under layer.
Figure 46A:
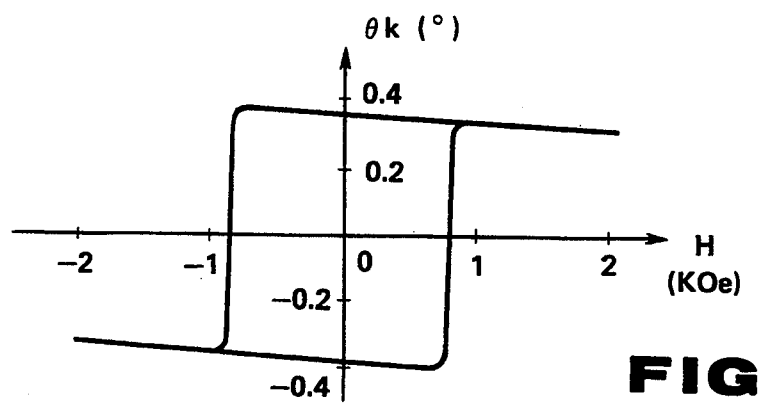
Figure 46B:
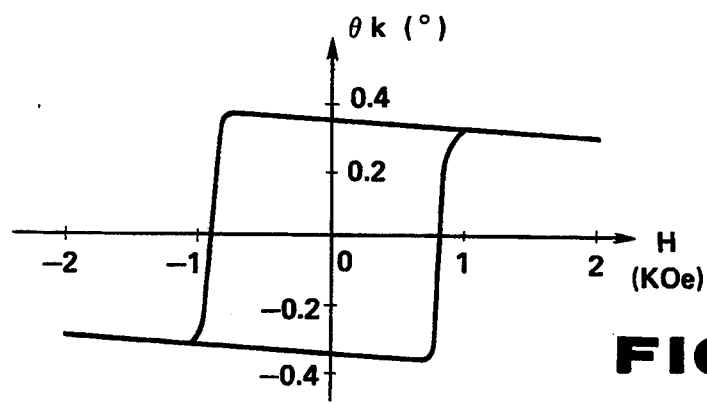
Figure 46C:
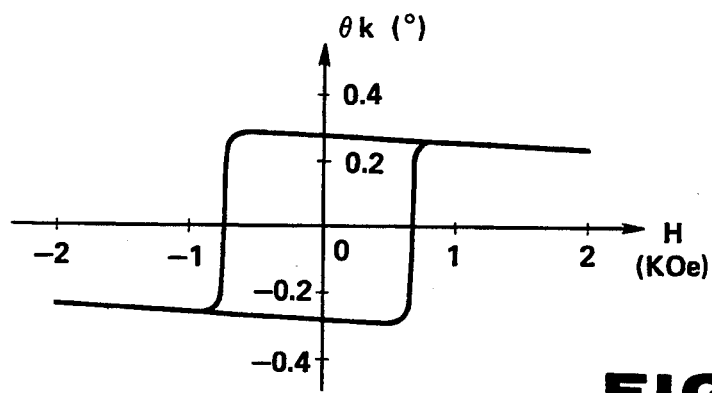
Figure 46D:
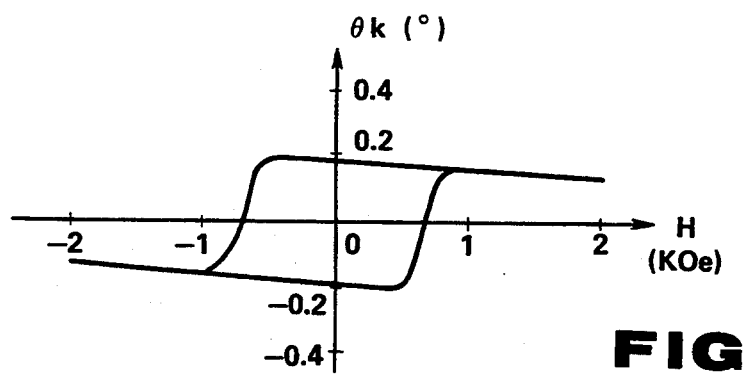

The inversion phenomenon of the magnetic Kerr loops has been observed in a more outstanding manner when the TiN under layer is used under the same conditions, as indicated in FIG. 45.

Tenth Embodiment

The ninth embodiment is concerned with the magneto-optical recording medium having ZrN under layer. The present embodiment is concerned with a magneto-optical recording medium in which a Co-Pd type multi layered film is formed on the glass substrate through the interposition of a under layer of a nitride dielectric material.

The nitride dielectric materials employed in the present embodiment are $Si_3N_4$, AlN and BN. The magneto-optical recording mediums employing these materials were prepared in the following manner. First, in accordance with the procedure shown in the above described fourth embodiment, $Si_3N_4$, AlN or BN under layers were deposited to various thicknesses on glass substrates. Then, using an argon atmosphere at the gas pressure of 11 mTorr, a d.c. sputtering with a power of 0.35 A and 300 V and a RF sputtering with a power of 360 W were performed for Co and Pd targets, respectively, for sequentially stacking Co and Pd layers on each of the glass substrates to form a Co-Pd type multi layered film with a total thickness of 100 Å to produce a magneto-optical recording medium. For comparison, a magneto-optical recording medium devoid of the under layer was also produced.

The magnetic Kerr loops when the magneto-optical properties of the magneto-optical recording medium samples are measured from the substrate side, are shown in FIGS. 46A to 46D, for the cases in which a 1300 Å $Si_3N_4$ under layer, a 300 Å AlN under layer and a 1200 Å BN under layer are provided and no under layer is provided, respectively. The coercive force and the magnetic Kerr rotation angle for the case of not providing the under layer amount to 675 Oe and 0.195°, respectively. On the other hand, the coercive force, rectangular ratio and the magnetic Kerr rotation angle are improved when using the under layer, above all, the $Si_3N_4$ under layer.

FIGS. 47 and 48 show changes in the magnetic Kerr rotation angle caused by the $Si_3N_4$ under layer thickness and those caused by the AlN under layer thickness, respectively. It is apparent from these figures that an optimum under layer thickness exists for each of the under layers. The enhancement effect at the peak value amounts to twice or more that attained when not providing the under layer.

Eleventh Embodiment

The above described sixth to tenth embodiments refer to the cases in which a nitride dielectric material is used as the under layer. An example of using the oxide dielectric material as the under layer will be explained hereinbelow.

The present embodiment is concerned with a magneto-optical recording medium wherein a Co-Pt type multi layered film is formed on a glass substrate with the interposition of a $Ta_2O_5$ under layer.

The magneto-optical recording medium was prepared in the following manner. First, using a $Ta_2O_5$ target, 100 mm across, an RF sputtering was carried out in an argon atmosphere with a gas pressure of 4 mTorr and with a making power of 300 W, for depositing a 1600 Å thick $Ta_2O_5$ under layer on a glass substrate. Then, in a 4 mTorr argon atmosphere and rotation speed of the rotary base plate of 16 r.p.m., Co and Pt layers were sequentially formed on the glass substrate by a d.c. sputtering with a power of 0.40 A and 300 V and an RF sputtering with a power of 350 W, respectively, to form a Co-Pt type multi layered film to a total thickness of 100 Å to produce the magneto-optical recording medium. For comparison, a magneto-optical recording medium devoid of the $Ta_2O_5$ under layer was similarly produced.

The magnetic Kerr loops when the magneto-optical properties of the respective samples were measured from the substrate side, are shown in FIGS. 49A and 49B, for the cases in which a 1600 Å $Ta_2O_5$ under layer is provided and no $Ta_2O_5$ film is provided, respectively. The magnetic Kerr rotation angle and the coercive force for the case of not providing the $Ta_2O_5$ under layer amount to 0.84° and 187.5 Oe, respectively. These parameters are improved to 0.98° and 225 Oe, respectively, by providing the $Ta_2O_5$ under layer.

Figure 50:
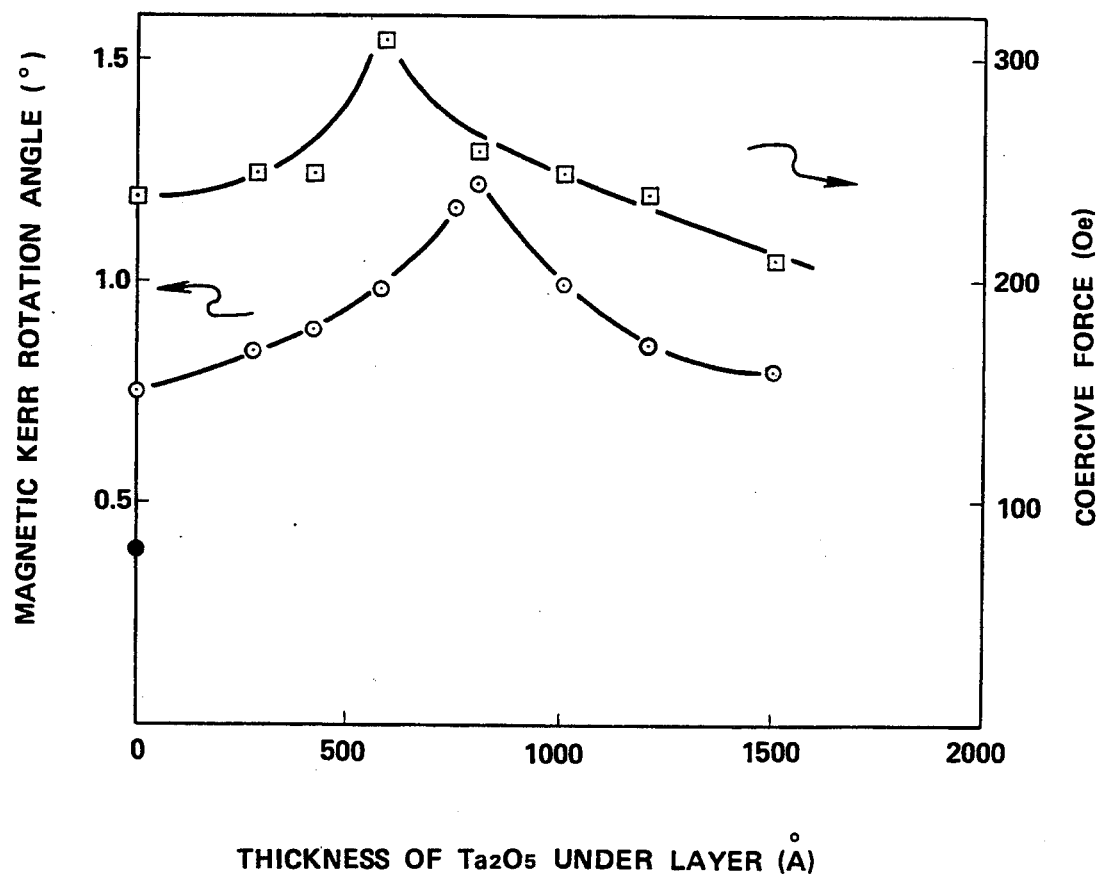
FIG. 50 is a characteristic diagram showing changes in the magneto-optical properties caused by the thickness of the $Ta_2O_5$ under layer in the magneto-optical recording medium having the Co-Pt type multi layered film formed on a glass substrate.

Then, investigations were made as to how the magnetic Kerr rotation angle and the coercive force are changed with the $Ta_2O_5$ under layer thickness. An RF sputtering was carried out with a power of 300 W in an argon atmosphere, at a gas pressure of 4 mTorr, for depositing $Ta_2O_5$ under layers to various thicknesses on the glass substrates. Then, Co and Pt layers were sequentially formed on the glass substrate by a d.c. sputtering with a power of 0.40 A and 300 V and an RF sputtering with a power of 450 W in a 4 mTorr argon atmosphere, to form a 100 Å thick Co-Pt type multi layered film to produce the magneto-optical recording medium, and the magneto-optical properties of the produced recording medium were measured. The results are shown in FIG. 50, wherein the ordinate and the abscissa denote the magnetic Kerr rotation angle $\theta_k(°)$ as measured from the substrate side or the coercive force in Oe and the $Ta_2O_5$ under layer thickness in Å, respectively, and wherein white circle and white square plottings indicate the magnetic Kerr rotation angle $\theta_k$ and the coercive force, respectively. A point F denotes the value of $\theta_k$ for the magnetic Kerr rotation angle of the magneto-optical recording medium devoid of the $Ta_2O_5$ under layer, when measured from the side of the recording layer. It is seen from the figure that, even in the absence of the $Ta_2O_5$ under layer, the magnetic Kerr rotation angle $\theta_k$ as measured from the substrate side is larger than the magnetic Kerr rotation angle $\theta_k$ as measured from the side of the recording layer, as a result of the enhancement effect combined with the refractivity index of the glass substrate. The magnetic Kerr rotation angle $\theta_k$ as measured from the substrate side becomes locally maximum in the vicinity of the $Ta_2O_5$ under layer thickness of ca. 800 Å. The coercive force is increased up to about 600 Å of the $Ta_2O_5$ under layer thickness more acutely than when the under layer is not provided, however, the coercive force is decreased for larger under layer thicknesses.

In the preceding description, the rectangular shape of the magnetic Kerr loop has been evaluated on the basis of rectangularity. In the present embodiment, it is now attempted to evaluate the rectangular shape by a value $\Delta H$ thought to be a measure of the anisotropic energy. The value $\Delta H$ is represented by the difference between the intensity of the magnetic field H1 when the magnetic Kerr rotation angle reaches saturation and the intensity H2 when the saturation magnetic Kerr rotation angle starts to be increased ($\Delta H = H_1 - H_2$). It is thought that the smaller the value $\Delta H$, the larger the energy of the perpendicular magnetic anisotropy or the better the uniformity of the anisotropic energy. The values $\Delta H$ in FIGS. 49A and 49B are equal to 540 Oe. Hence, above the evaluation method also leads to the conclusion that more favorable magneto-optical properties may be attained with the provision of the $Ta_2O_5$ under layer.

Twelfth embodiment

The present embodiment is concerned with a magneto-optical recording medium wherein an upper $Ta_2O_5$ dielectric layer is formed on the Co-Pt type multi layered film of the magneto-optical recording medium prepared in the eleventh embodiment.

The upper $Ta_2O_5$ dielectric layer was formed by a procedure similar to that for forming the $Ta_2O_5$ under layer, and finally a Pt reflective film was formed.

Figure 51:
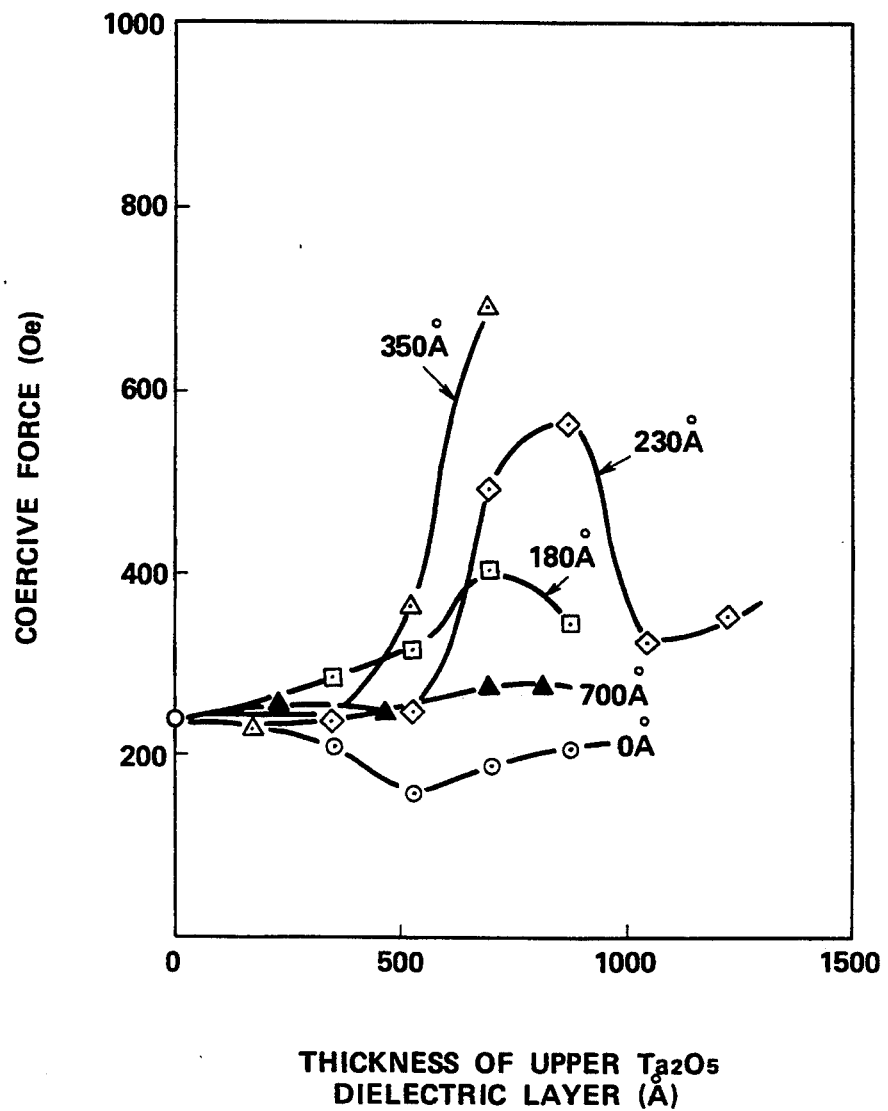
FIG. 51 is a characteristic diagram showing changes in coercivity with different combination of the film thicknesses of the $Ta_2O_5$ under layer and a dielectric layer thereabove in an magneto-optical recording medium having a Co-Pt type multi layered film formed on a glass substrate.
Figure 52:
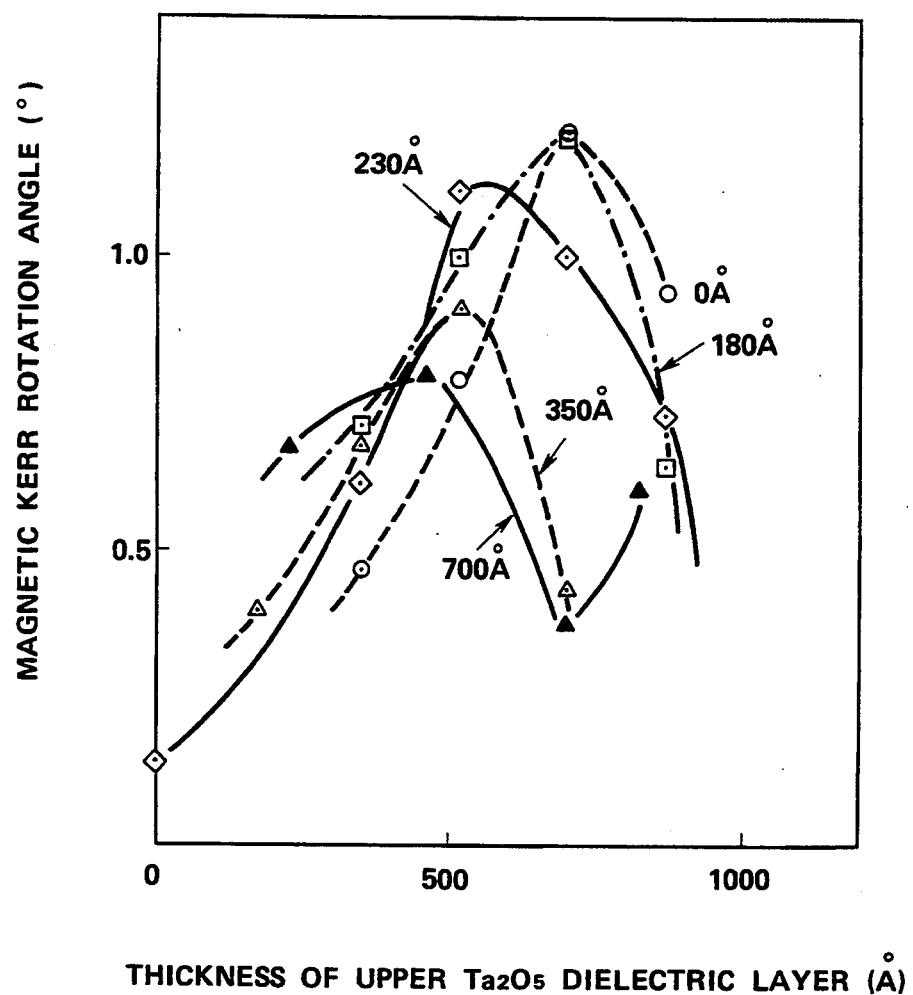
FIG. 52 is a characteristic diagram showing changes in the magnetic Kerr rotation angle in the same magneto-optical recording medium.
Figure 53A:
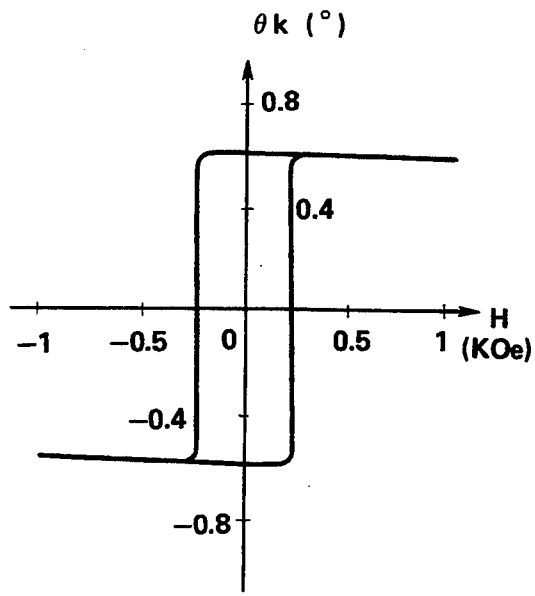
FIGS. 53A to 53D show magnetic Kerr loops showing magneto-optical properties of the magneto-optical recording medium having a Co-Pt type multi layered film formed on a polycarbonate substrate through the interposition of $Ta_2O_5$ under layer of various thickness.
Figure 53B:
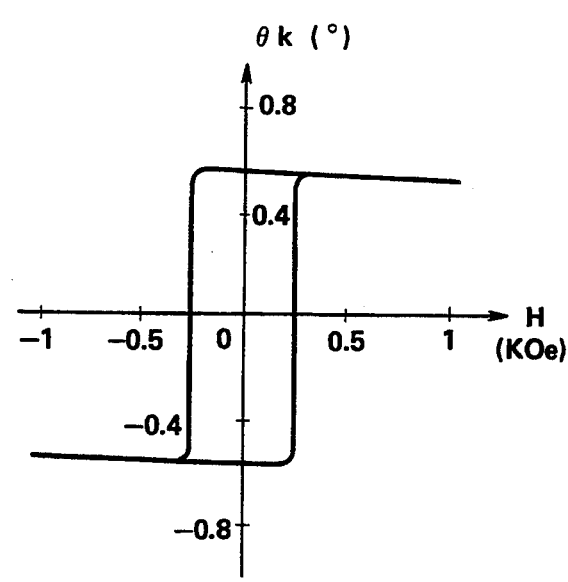
Figure 53C:
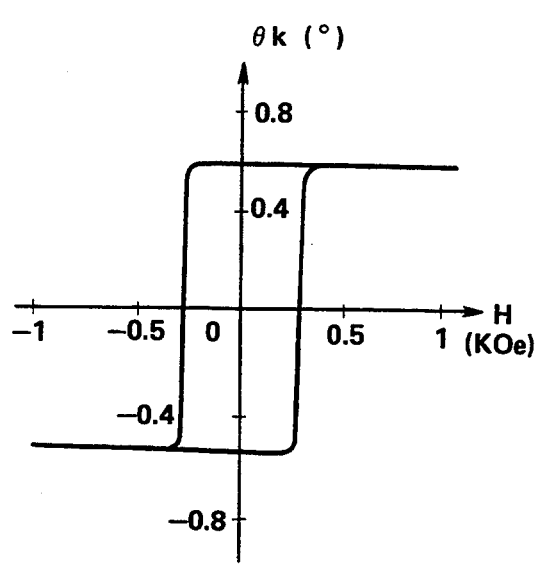
Figure 53D:
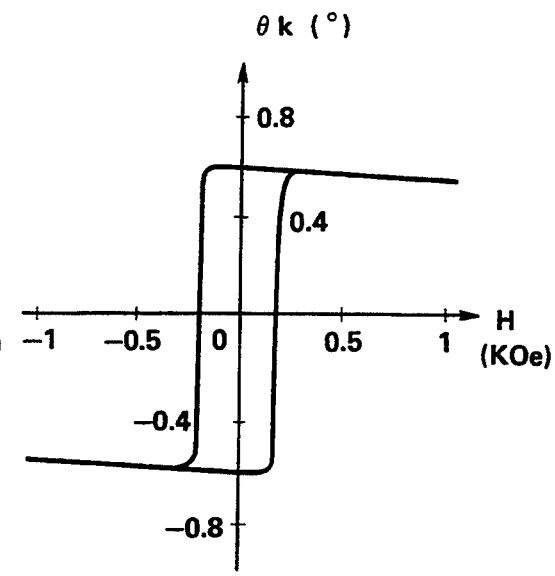

FIG. 51 shows the results of investigations into changes in the coercive force with various thicknesses of the $Ta_2O_5$ under layer and the upper $Ta_2O_5$ dielectric layer of the magneto-optical recording medium. In the figure, the ordinate and the abscissa stand for the coercive force in Oe and the thickness of the upper $Ta_2O_5$ dielectric layer in Å. The curves in the figure stand for different thicknesses of the $Ta_2O_5$ under layer, white circle plotting denote the case of not providing the $Ta_2O_5$ under layer, the rectangle, rhombus, white triangle and black triangle plottings denote the cases of the $Ta_2O_5$ under layer thicknesses of 180 Å, 230 Å, 350 Å and 700 Å, respectively. FIG. 52 shows the results of investigations into changes in the magnetic Kerr rotation angle $\theta_k$ on the substrate side with various thicknesses of the $Ta_2O_5$ under layer and the upper $Ta_2O_5$ dielectric layer of the magneto-optical recording medium. In the drawing, the ordinate and the abscissa represent the magnetic Kerr rotation angle $\theta_k(°)$ and the thickness of the upper $Ta_2O_5$ dielectric layer in Å. The meanings of the respective curves are the same as in the case of FIG. 51.

It is seen from FIGS. 51 and 52 that the coercive force is changed multifariously by different combination of the thickness of the $Ta_2O_5$ under layer and the upper $Ta_2O_5$ dielectric layer. The coercive force tends to be lowered in its entirety when only the upper $Ta_2O_5$ dielectric layer is provided with omission of the $Ta_2O_5$ under layer. Conversely, when the $Ta_2O_5$ under layer of some thickness is provided, the coercive force is seen to be increased when the thickness of the upper $Ta_2O_5$ dielectric layer becomes equal to or larger than that of the $Ta_2O_5$ under layer. Above all, the coercive force is increased acutely to 410 Oe, 570 Oe and 700 Oe for the $Ta_2O_5$ under layer thickness of 180 Å, 230 Å and 350 Å, respectively. On the other hand, the magnetic Kerr rotation angle $\theta_k$ is also changed in dependence upon the thickness of $Ta_2O_5$ under layer. The so-called enhancement effect presents itself for both of these parameters up to a predetermined thickness of the upper $Ta_2O_5$ dielectric layer. Hence, with appropriate selection of the thicknesses of the $Ta_2O_5$ under layer and the upper $Ta_2O_5$ dielectric layer, it becomes possible to increase the coercive force and the magnetic Kerr rotation angle simultaneously.

Thirteenth embodiment

The present embodiment is concerned with a magneto-optical recording medium wherein a polycarbonate substrate is employed in place of the glass substrate in the eleventh embodiment.

The magneto-optical recording medium was produced in the following manner. First, $Ta_2O_5$ under layers were formed to various thicknesses by a procedure similar to that of the eleventh embodiment except that a polycarbonate substrate was used as the substrate. Then, Co and Pt layers were sequentially stacked on the substrate by a d.c. sputtering with a power of 0.40 A and 300 V and an RF sputtering with a power of 450 W, respectively, under argon atmosphere at the gas pressure of 4 mTorr and at the substrate rotation of 16 r.p.m., so as to form a Co-Pt type multi layered film having a total thickness of 100 Å to form a magneto-optical recording medium. For comparison, a magneto-optical recording medium devoid of the $Ta_2O_5$ under layer was also prepared.

The magnetic Kerr loops when the magneto-optical properties of these magneto-optical recording medium are measured from the substrate side, are shown in FIGS. 53A to 53D, for the cases of providing $Ta_2O_5$ under layers with thicknesses of 30, 130 and 220 Å and not providing the $Ta_2O_5$ under layer, respectively. The coercive force when the $Ta_2O_5$ under layer is not provided is 180 Oe. The coercive force of the magneto-optical film is increased with increase in the thickness of the $Ta_2O_5$ under layer, such that the coercive force is equal to 230, 250 and 270 Oe when the $Ta_2O_5$ under layers with thicknesses of 30, 130 and 220 Å are used, respectively. This is possibly ascribable to the increase in the energy of the perpendicular magnetic anisotropy caused by the provision of the base coat.

Fourteenth Embodiment

The present embodiment is concerned with a magneto-optical recording medium wherein the Co-Pd multi layered film is used in place of the Co-Pt type multi layered film.

This magneto-optical recording medium was produced in the following manner. First, a 1000 Å $Ta_2O_5$ under layer was formed on the glass substrate by using a procedure similar to that of the eleventh embodiment. Then, Co and Pt layers were sequentially stacked on the glass substrate by a d.c. sputtering with a power of 0.35 A and 300 V and by an RF sputtering with a power of 330 W, respectively, in an argon atmosphere at the gas pressure of 12 mTorr and at the 16 r.p.m. of the rotating base plate, so as to form a Co-Pd type multi layered film to a total thickness of 100 Å to produce a magneto-optical recording medium. For comparison, a magneto-optical recording medium devoid of the $Ta_2O_5$ under layer was also produced.

Figure 54A:
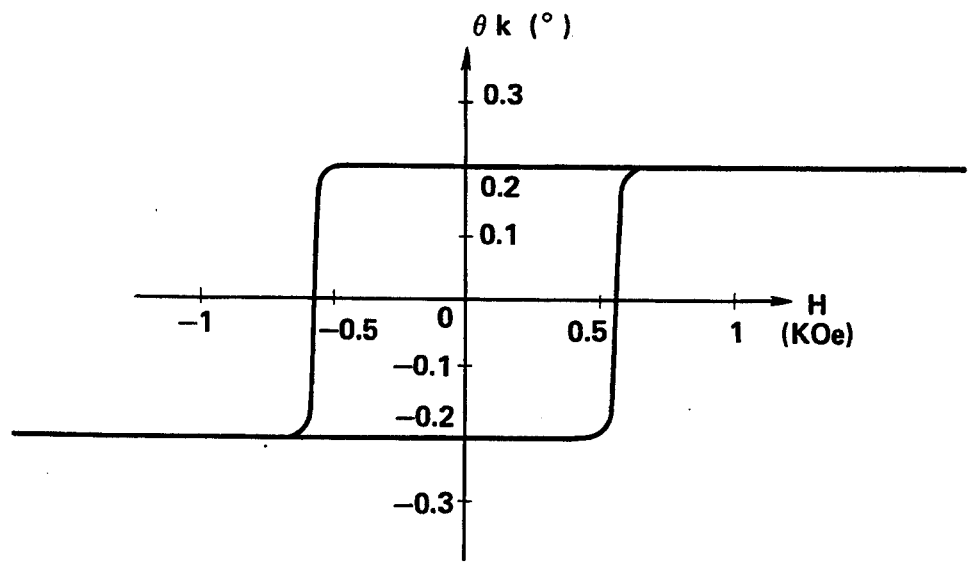
FIGS. 54A and 54B show magnetic Kerr loops showing changes in the magneto-optical characteristics caused by the presence or absence of the $Ta_2O_5$ under layer in the magneto-optical recording medium having a Co-Pd type multi layered film formed on a glass substrate.
Figure 54B:
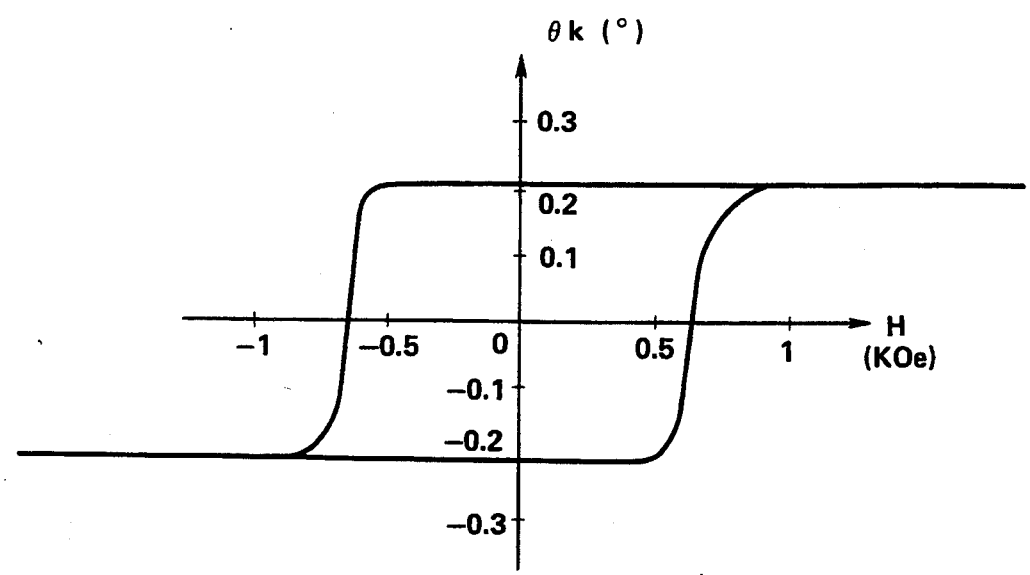
Figure 55A:
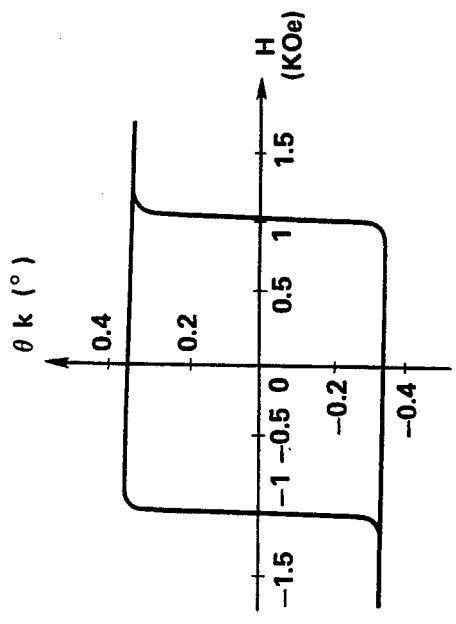
Figure 55B:
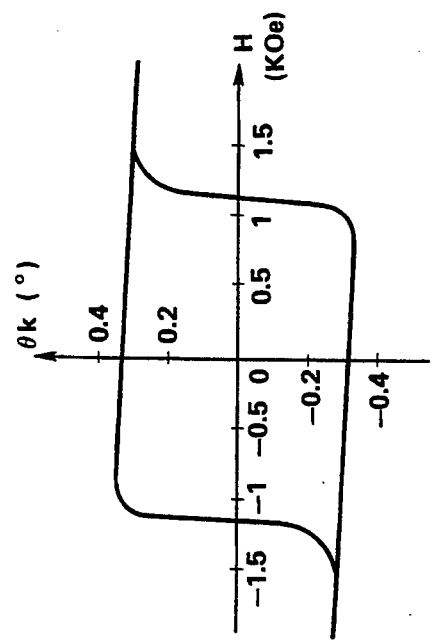
Figure 55C:
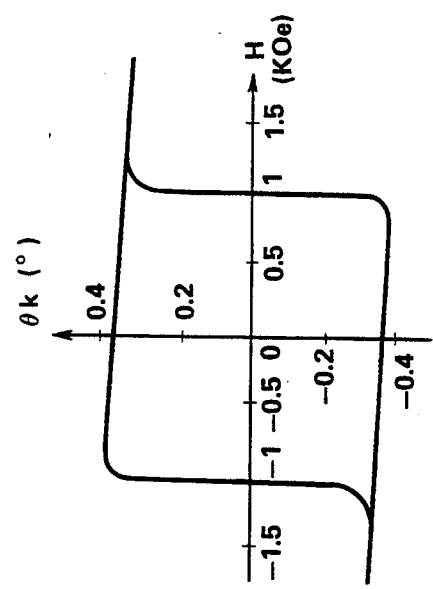
Figure 55D:
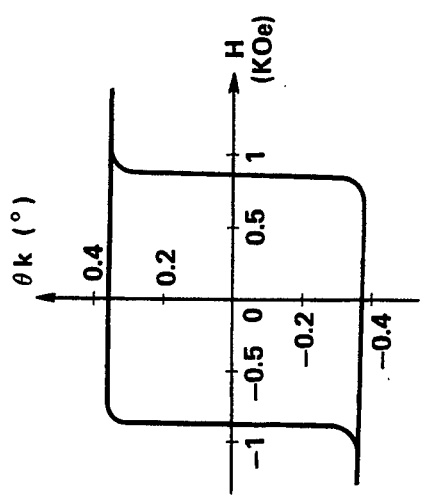
Figure 56A:
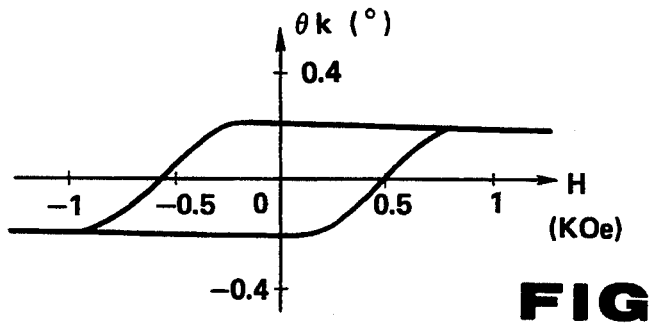
FIGS. 56A to 56C are characteristic diagrams showing a magneto-optical recording medium having a Co-Pd type multi layered film formed on a polycarbonate substrate through the interposition of $Al_2O_3$ under layers of various thicknesses.
Figure 56B:
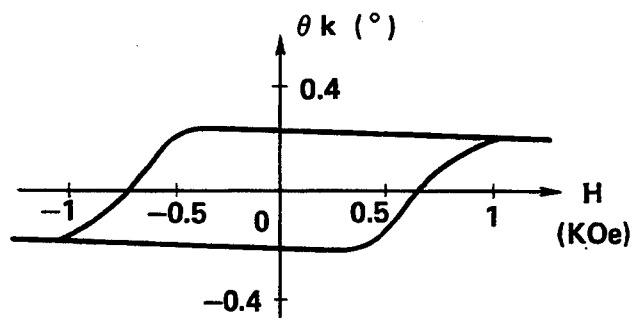
Figure 56C:
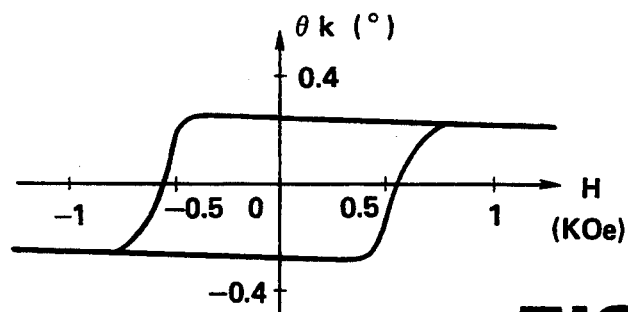
Figure 56D:
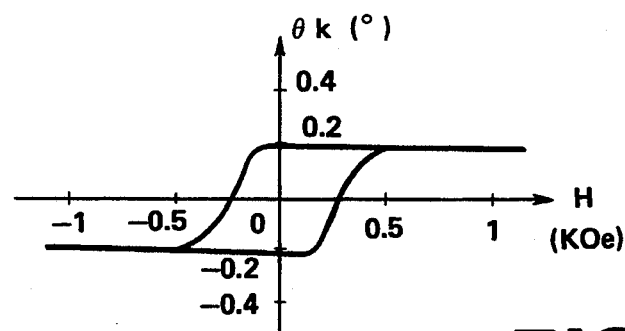

The magnetic Kerr loops, when the magneto-optical properties of these magneto-optical recording medium samples were measured from the substrate side, are shown in FIGS. 54A and 54B, for the case of providing the $Ta_2O_5$ under layer and the case of not providing the $Ta_2O_5$ under layer, respectively. The magnetic Kerr rotation angle, the coercive force and $\Delta H$ when the $Ta_2O_5$ under layer is not provided, are equal to 0.21°, 640 Oe and about 380 Oe, respectively. On the other hand, the magnetic Kerr rotation angle, coercive force and $\Delta H$ when the $Ta_2O_5$ under layer is provided, are equal to 0.21°, 570 Oe and about 75 Oe. When compared to the case of not providing the under layer, the coercive force is decreased slightly, however, $\Delta H$ is reduced to about one-fifth, in the latter case, thus indicating that the recording medium exhibits superior perpendicular magnetic anisotropy.

Fifteenth embodiment

The above described eleventh to fourteenth embodiments refer to the magneto-optical recording medium including the $Ta_2O_5$ under layer. The present embodiment is concerned with a magneto-optical recording medium wherein a Co-Pd type multi layered film is formed on the glass substrate with the interposition of an under layer of a further oxide dielectric material.

The oxide dielectric materials employed in the present embodiment are $SiO_2$ and $Al_2O_3$.

The magneto-optical recording medium employing these oxide materials was prepared in the following manner. Thus, $SiO_2$ under layers and $Al_2O_3$ under layers were deposited to various thicknesses on glass substrates by sputtering at the gas pressure of 4 mTorr in an argon gas atmosphere. Then, Co and Pd layers were sequentially stacked on these glass substrates by a d.c. sputtering with a making power of 0.35 A and 300 V and by an RF sputtering with a making power of 330 W, respectively, under a argon gas atmosphere with the gas pressure of 4 mTorr, so as to form a Co-Pd type multi layered film to a total thickness of 100 Å to produce a magneto-optical recording medium. For comparison, the magneto-optical recording medium devoid of the under layer was also prepared.

The magnetic Kerr loops when the magneto-optical properties of these magneto-optical recording media are measured from the substrate side are shown in FIGS. 55A to 55D, for the cases of providing a 500 Å $SiO_2$ under layer, a 20 Å $Al_2O_3$ under layer and a 60 Å $Al_2O_3$ under layer and the case of not providing the under layer, respectively.

The magnetic Kerr rotation angle and the coercive force when the under layer is not provided are equal to 0.32° and 110 Oe, respectively. The magnetic Kerr rotation angle and the coercive force, when the 500 Å $SiO_2$ under layer is provided, are equal to 0.38° and 1000 Oe, respectively. Thus, although the coercive force is slightly lowered, the magnetic Kerr rotation angle and the rectangular ratio are improved. Magnetic Kerr rotation angle and the rectangular ratio are also seen to be improved by providing the $Al_2O_3$ under layer.

Sixteenth Embodiment

The present embodiment is concerned with a magneto-optical recording medium wherein a polycarbonate substrate is employed in place of the glass substrate in the above described fifteenth embodiment and wherein a Co-Pd type multi layered film is formed with the interposition of the $Al_2O_3$ under layer.

This magneto-optical recording medium was produced in the following manner. Thus, $Al_2O_3$ under layers were deposited to various thicknesses on the polycarbonate substrates by sputtering in an argon gas atmosphere at a gas pressure of 4 mTorr. Then, Co-Pd multi layered films were formed each to a total thickness of 100 Å, by a procedure similar to that employed in the above described fifteenth embodiment, to produce magneto-optical recording media.

The magnetic Kerr loops, when the magneto-optical properties of these respective magneto-optical recording media are measured from the substrate side, are shown in FIGS. 56A to 57D, for the cases of providing a 20 Å $Al_2O_3$ under layer, a 100 Å $Al_2O_3$ under layer and a 150 Å $Al_2O_3$ under layer and not providing the $Al_2O_3$ under layer, respectively. It is seen from these figures that the coercive force is increased on providing the $Al_2O_3$ under layer, even with the under layer thickness as small as 20 Å, and that the rectangular properties are also improved with increase in the under layer thickness.

In the above sixth to sixteenth embodiments, the description has been made of the magneto-optical recording medium having the Co-Pt type multi layered film or the Co-Pd type multi layered film, as the recording layer. However, the present invention is not limited to these embodiments. For example, the effect of the dielectric under layer may be attained in the case of a magneto-optical recording medium, the recording layer of which is formed by a Co-Pd-Pt type multi layered film, in which Co, Pd and Pt layers or Co layer and Pd-Pt alloy layers are stacked with proper sequence and thicknesses.

We claim as our invention:

1. A magneto-optical recording medium comprising a substrate and a multi-layered film having magneto-optical recording properties and a perpendicular anisotropy being formed on the substrate, said multi-layered film having a plurality of first layers and layers of a second group of layers arranged in a stack being formed by alternate stacking of a single first layer with at least one layer from the second group, each first layer being formed of a layer consisting of Co and each of the layers of the second group being selected from a group consisting of a layer of Pt, and a layer consisting of alternate layers of Pt and Pd, said multi-layered film having a total thickness in the range of between 50 Å and 800 Å and each of said first layers having a thickness in the range of 1 Å to 9 Å.

2. A magneto-optical recording medium according to claim 1, further comprises a metal reflectional layer formed on said multi-layered film.

3. A magneto-optical recording medium according to claim 1, wherein each layer of said second layers is a Pt layer having a thickness of between 3 Å and 40 Å, and each first layer has a thickness of between 2 Å and 8 Å.

4. A magneto-optical recording medium according to claim 3, wherein the multi-layered film has a total thickness in the range of 50 Å to 400 Å.

5. A magneto-optical recording medium according to claim 1, which includes an underlayer being formed on the substrate between said substrate and said multi-layered film, said underlayer including at least one metal element selected from a group consisting of Cu, Rh, Pd, Ag, W, Ir, Pt and Au.

6. A magneto-optical recording medium according to claim 5, wherein said under layer has a thickness between 5 and 5000 Å.

7. A magneto-optical recording medium according to claim 6, wherein said under layer has a thickness between 5 and 500 Å.

8. A magneto-optical recording medium according to claim 1, which includes a dielectric underlayer being formed between said substrate and the multi-layered film.

9. A magneto-optical recording medium according to claim 8, said dielectric under layer is one of $Al_2O_3$, $Ta_2O_5$, MgO, $SiO_2$, $TiO_2$, $Fe_2O_3$, $ZrO_2$, $Bi_2O$, ZrN, TiN, $Si_3N_4$, AlN, AlSiN, BN, TaN and NbN.

10. A magneto-optical recording medium according to claim 8, further comprises a dielectric layer formed on said multi-layered film.

11. A magneto-optical recording medium according to claim 8, further comprises a metal under layer interposed between said dielectric under layer and said multi-layered film.

12. A magneto-optical recording medium according to claim 1, wherein adjacent single first layers are separated by both a layer of Pt and a layer of Pd.

13. A magneto-optical recording medium comprising a substrate and a multi-layered film having magneto-optical recording properties and a perpendicular anisotropy being formed on the substrate, said multi-layered film having a plurality of first layers and second layers arranged in a stack being formed by alternate stacking of a single first layer with a second layer, each first layer being formed of a layer consisting of Co and each second layer being selected from a group consisting of a layer of Pt, a layer of Pt-Pd alloy and a layer of alternate layers of Pt and Pd having a thickness in a range of between 2 Å and 40 Å, said multi-layered film having a total thickness in the range of between 50 Å and 800 Å and each of said first layers having a thickness in a range of 1 Å to 9Å.

14. A magneto-optical recording medium according to claim 13, which includes an underlayer being formed on the substrate between said substrate and said multi-layered film, said underlayer including at least one metal element selected from a group consisting of Cu, Rh, Pd, Ag, W, Ir, Pt and Au.

15. A magneto-optical recording medium according to claim 13, further comprises a metal reflectional layer formed on said multi-layered film.

16. A magneto-optical recording medium according to claim 13, which includes a dielectric underlayer being formed between said substrate and the multi-layered films, said dielectric underlayer is one of $Al_2O_3$, $Ta_2O_5$, MgO, $SiO_2$, $TiO_2$, $Fe_2O_3$, $ZrO_2$, $Bi_2O_3$, ZrN, TiN, $Si_3N_4$, AlN, AlSiN, BN, TaN and NbN.

* * * * *